United States Patent
Hasegawa

(10) Patent No.: US 7,840,309 B2
(45) Date of Patent: *Nov. 23, 2010

(54) GAIT GENERATING DEVICE OF LEGGED MOBILE ROBOT

(75) Inventor: Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 539 days.

This patent is subject to a terminal disclaimer.

(21) Appl. No.: 11/722,052

(22) PCT Filed: Sep. 28, 2005

(86) PCT No.: PCT/JP2005/017806

§ 371 (c)(1),
(2), (4) Date: Jun. 18, 2007

(87) PCT Pub. No.: WO2006/067904

PCT Pub. Date: Jun. 29, 2006

(65) Prior Publication Data

US 2008/0133057 A1 Jun. 5, 2008

(30) Foreign Application Priority Data

Dec. 24, 2004 (JP) .............................. 2004-372489

(51) Int. Cl.
*B25J 13/00* (2006.01)

(52) U.S. Cl. ........................ 700/258; 700/245; 700/252; 901/1; 901/47

(58) Field of Classification Search ................. 700/245, 700/252, 258; 901/1, 47
See application file for complete search history.

(56) References Cited

U.S. PATENT DOCUMENTS

| 6,289,265 | B1 * | 9/2001 | Takenaka et al. ............ 700/245 |
| 6,564,888 | B1 * | 5/2003 | Gomi et al. ................... 180/8.6 |
| 6,832,132 | B2 * | 12/2004 | Ishida et al. ................. 700/245 |
| 2002/0022907 | A1 * | 2/2002 | Takenaka et al. ............ 700/245 |
| 2004/0044440 | A1 * | 3/2004 | Takenaka ..................... 700/245 |

FOREIGN PATENT DOCUMENTS

| JP | 05-324115 | 12/1993 |
| JP | 10-086080 | 4/1998 |
| JP | 10-230485 | 9/1998 |
| JP | 11-048170 | 2/1999 |
| JP | 2002-326173 | 11/2002 |
| WO | 02/40224 | 5/2002 |
| WO | 03/057422 | 7/2003 |
| WO | 03/057424 | 7/2003 |

* cited by examiner

*Primary Examiner*—Khoi Tran
*Assistant Examiner*—Rodney King
(74) *Attorney, Agent, or Firm*—Rankin, Hill & Clark LLP

(57) ABSTRACT

When a new desired gait of a robot is generated, it is determined, on the assumption that the trajectory of an acting force between the robot and an object at a predetermined time point in the future changes to a trajectory different from a desired trajectory, whether a predetermined dynamical restrictive condition can be satisfied when a desired gait after the predetermined time point is generated. If the condition cannot be satisfied, then a moving schedule for the object is corrected, the desired trajectory or the like of the acting force between the robot and the object is re-determined, and a new desired gait is generated using the re-determined desired trajectory. With this arrangement, the gait of the robot to cause the robot to perform an operation for moving the object is generated such that the stability of the posture of the robot can be secured even if an acting force between the robot and the object in the future deviates from a desired value.

4 Claims, 23 Drawing Sheets

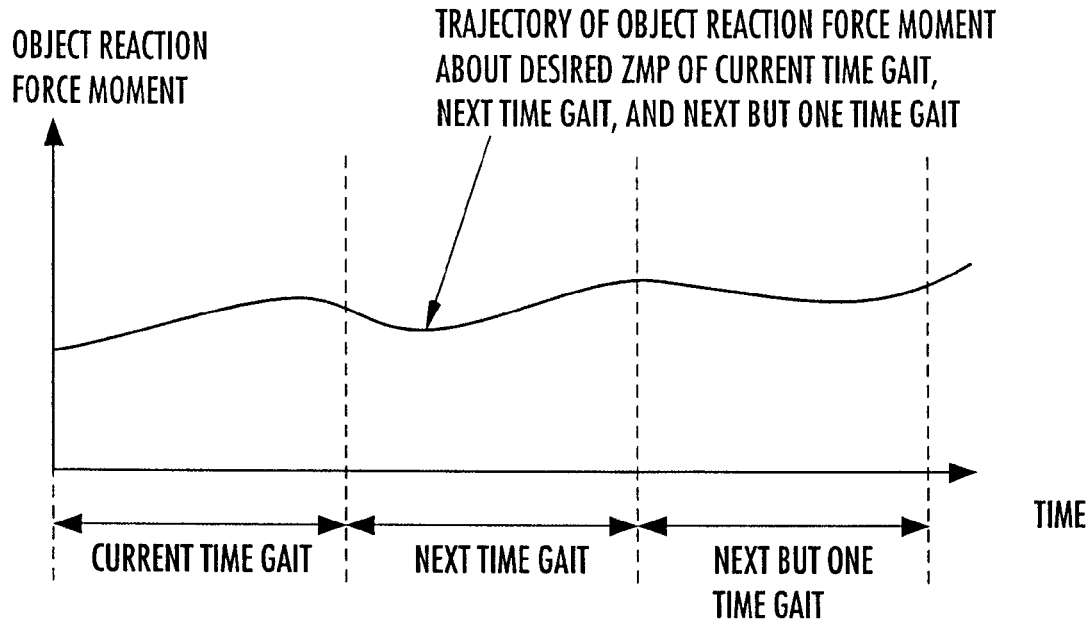
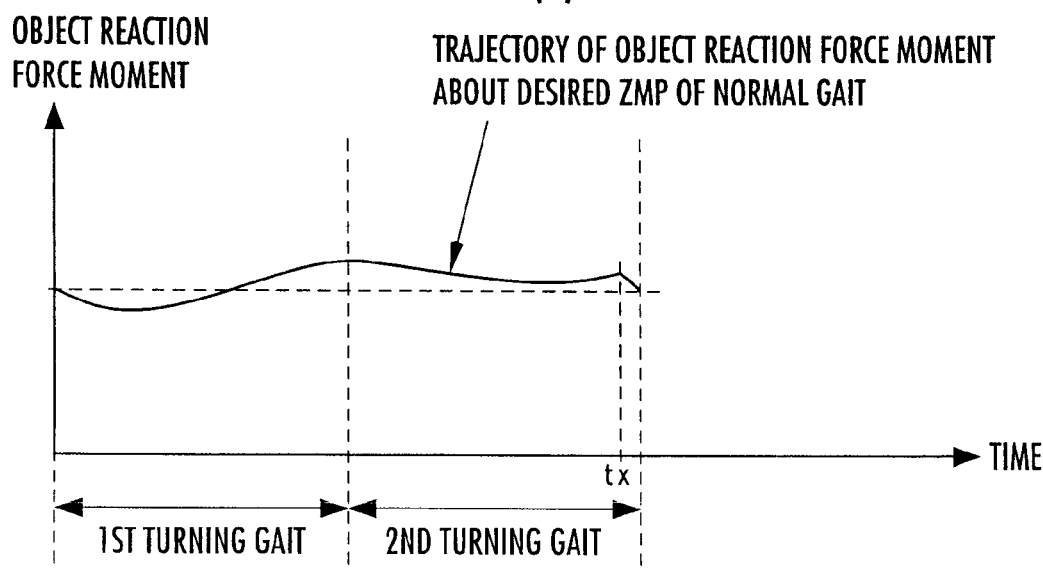

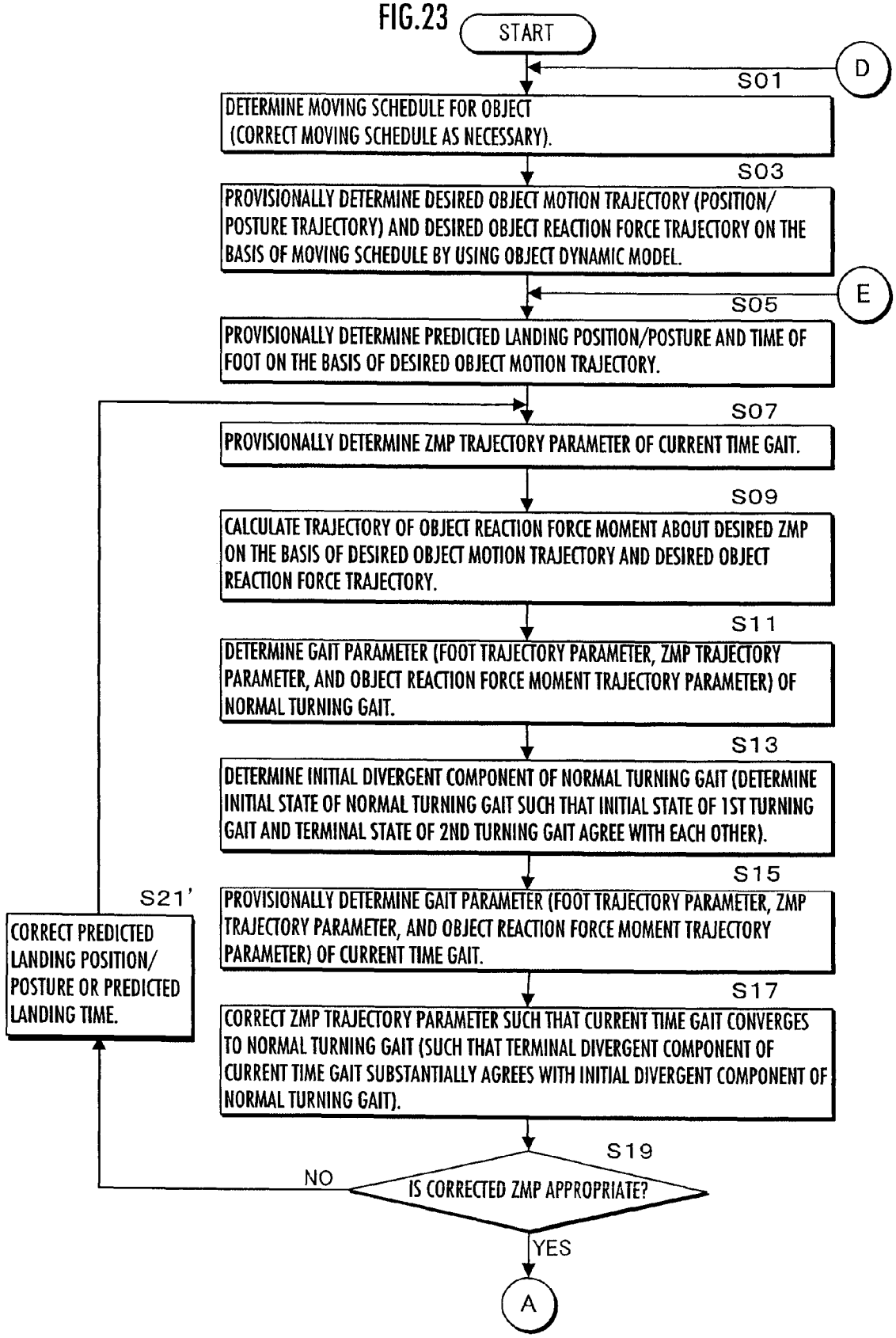

FIG.24

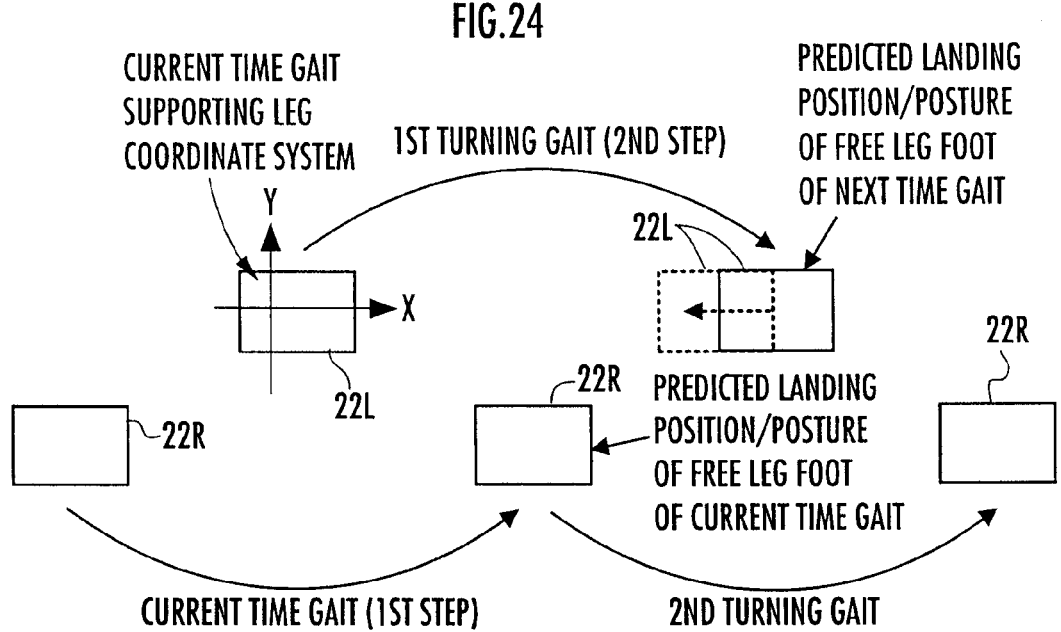

CURRENT TIME GAIT SUPPORTING LEG COORDINATE SYSTEM

1ST TURNING GAIT (2ND STEP)

PREDICTED LANDING POSITION/POSTURE OF FREE LEG FOOT OF NEXT TIME GAIT

PREDICTED LANDING POSITION/POSTURE OF FREE LEG FOOT OF CURRENT TIME GAIT

CURRENT TIME GAIT (1ST STEP)

2ND TURNING GAIT

FIG.25(a)

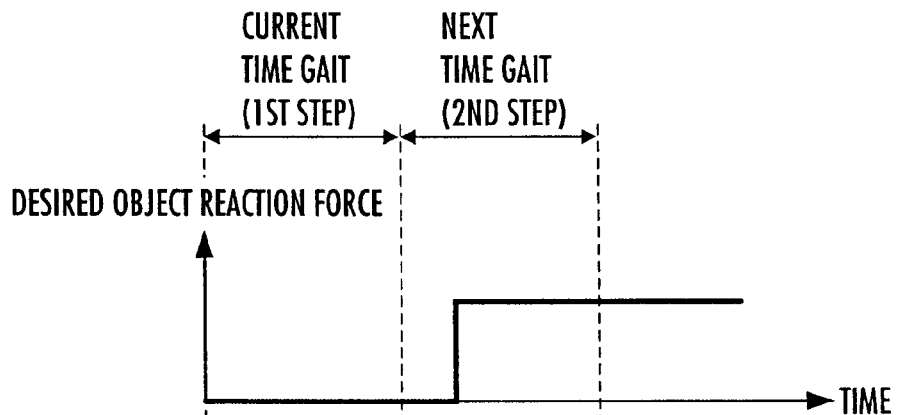

CURRENT TIME GAIT (1ST STEP)

NEXT TIME GAIT (2ND STEP)

DESIRED OBJECT REACTION FORCE

TIME

FIG.25(b)

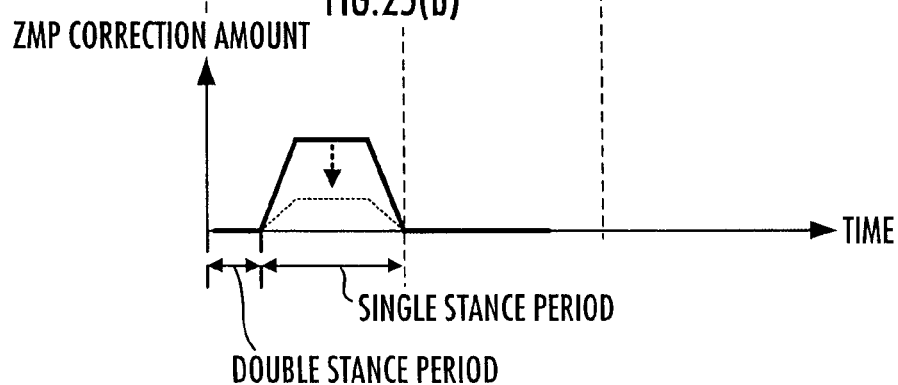

ZMP CORRECTION AMOUNT

TIME

SINGLE STANCE PERIOD

DOUBLE STANCE PERIOD

GAIT GENERATING DEVICE OF LEGGED MOBILE ROBOT

TECHNICAL FIELD

The present invention relates to a device which generates a desired gait for causing a legged mobile robot to perform an operation of moving an object.

BACKGROUND ART

When causing a legged mobile robot, such as a bipedal mobile robot, to perform an operation of, for example, moving a certain object by pushing, the robot is subjected not only to a floor reaction force from a floor with which a distal portion of a leg thereof is in contact but also to a reaction force from the object. The reaction force received by the robot from an object as described above will be referred to as an object reaction force in the present description.

As a technology for generating a gait of a robot or carrying out motion control thereof in a state wherein an object reaction force is acting on a legged mobile robot as described above, there has been known a technology disclosed in, for example, Japanese Patent Laid-Open Publication No. H10-230485 by the inventor of the present application (hereinafter referred to as patent document 1). According to the technology, a desired gait is generated such that a dynamical balance condition in which a component (horizontal component), excluding a vertical component, of a moment produced about a desired ZMP (a desired floor reaction force central point) by a resultant force of an inertial force produced due to a motion of a robot and the gravity and an object reaction force acting on the robot is zero (a floor reaction force acting on the desired floor reaction force central point and the aforesaid resultant force are balanced out) is satisfied. Furthermore, according to the technology, even if an external force acting on the robot turns into an unexpected external force (even if a difference between a desired external force and an actual external force increases to a certain extent), a desired gait of the robot is adjusted such that a position of the center of gravity of the robot is balanced with a position of the center of gravity that makes it possible to maintain the dynamic balance of the robot.

In the meantime, when generating a gait of a robot to cause the robot to perform the operation of moving an object as described above, it is necessary to determine beforehand the trajectory (time series) of the desired values of acting forces applied from the robot to the object or the trajectory (time series) of the desired values of the aforesaid object reaction forces. An object reaction force is obtained by reversing the sign (direction) of an acting force applied from the robot to the object; hence, hereinafter, the trajectory of the desired values of the object reaction force will be representatively determined beforehand in the explanation herein.

In this case, the trajectory of the desired values of the object reaction force (hereinafter referred to as the desired object reaction force) is determined on the basis of, for example, a moving schedule for an object (a schedule of, for example, a timing and a method for moving an object).

However, an actual object reaction force acting on the robot does not necessarily always agree with a desired object reaction force. For instance, when starting from certain scheduled time an operation of moving an object by engaging a hand of the robot with the object, the desired object reaction force will suddenly change from zero to a certain value ($\neq 0$) at the scheduled time; however, there is a case where an actual object reaction force does not change at the scheduled time due to a shift in a positional relationship between the actual robot and the object. In such a case, a gait generated on the basis of a desired object reaction force trajectory is a gait that has been generated, expecting that the object reaction force changes at the aforesaid scheduled time; therefore, if an actual object reaction force does not change at the scheduled time, then the stability of the robot tends to be impaired. Further, there are many cases where even if an attempt is made to correct the posture of a robot on the basis of the difference between an actual object reaction force and a desired object reaction force, as in the aforesaid patent document 1, at the scheduled time, the posture of the robot cannot be immediately corrected to a stable posture.

The present invention has been made with a view of the above background, and it is an object thereof to provide a gait generating device of a legged mobile robot that is capable of generating a gait for causing a robot to perform an operation of moving an object, considering a case where a future acting force between the robot and the object deviates from a desired value, and of generating a gait of a robot such that the stability of a posture of the robot can be secured even if the acting force deviates from a desired value.

DISCLOSURE OF INVENTION

To fulfill such an object, according to a first invention of a gait generating device of a legged mobile robot in accordance with the present invention, there is provided a device for generating a desired gait of a legged mobile robot, which is equipped with a plurality of legs extended from a body thereof, to cause the robot to perform an operation of moving an object, the gait generating device including:

a first acting force trajectory determining means for provisionally determining, when generating a new desired gait, a first trajectory of a desired acting force between the robot and an object, which is a trajectory of a desired value of an acting force between the robot and the object in the new desired gait, on the basis of at least a moving schedule for the object;

a first leg motion parameter determining means for provisionally determining a first leg motion parameter, which defines a motion of a leg of the robot in the new desired gait, on the basis of at least the schedule for moving the object;

a second acting force trajectory setting means for setting a second trajectory of a desired acting force between the robot and the object, which is a trajectory of a desired value of an acting force between the robot and the object after a predetermined time point, assuming that, with respect to the provisionally determined first trajectory of a desired acting force between the robot and the object, an actual trajectory of an acting force between the robot and the object has changed to a trajectory that is different from the first trajectory of a desired acting force between the robot and the object at a predetermined time point or after in the future; and a discriminating means for discriminating whether or not a second leg motion parameter that enables a desired gait of the robot after the predetermined time point to satisfy a predetermined dynamical restrictive condition can be set if a desired gait of a robot up to the predetermined time point is generated using the first leg motion parameter and the first trajectory of the desired acting force between the robot and the object and if a desired gait of the robot after the predetermined time point following the desired gait up to the predetermined time point is generated using the second leg motion parameter and the second acting force between the robot and the object, taking the second leg motion parameter, which is a leg motion parameter defining the motion of a leg of the robot after the predetermined time point, as a variable that can be variably set;

wherein in the case where the discriminating means determines that the desired gait of the robot after the predetermined time point permits setting of the second leg motion parameter that allows the predetermined dynamical restrictive condition to be satisfied, then the new desired gait is generated using the first leg motion parameter and the first trajectory of the desired acting force between the robot and the object, or in the case where the discriminating means determines that the desired gait of the robot after the predetermined time point does not permit setting of the second leg motion parameter that allows the predetermined dynamical restrictive condition to be satisfied, then the moving schedule for the object is corrected and the first leg motion parameter and the first trajectory of the desired acting force between the robot and the object are re-determined using at least the corrected moving schedule, and the new desired gait is generated using the first leg motion parameter and the first trajectory of the desired reaction force between the robot and the object, which have been re-determined.

According to the first invention, the discriminating means determines whether or not the desired gait of the robot after the predetermined time point, that is, the desired gait of the robot which is generated in an assumption that the trajectory of the acting force between the robot and the object has become a second trajectory of a desired acting force between the robot and the object, which is different from the first trajectory of the desired acting force between the robot and the object, at the predetermined time point permits setting of a second leg motion parameter that allows the dynamical restrictive condition to be satisfied (hereinafter, the second leg motion parameter may be referred to as a proper second leg motion parameter herein). If the discrimination indicates that a proper second leg motion parameter can be set, then it means that a desired gait that allows the dynamical restrictive condition to be satisfied can be generated by adjusting a leg motion parameter, i.e., a leg motion, even if the trajectory turns into a second trajectory of a desired acting force between the robot and the object, in which an actual acting force between the robot and the object is different from the first desired acting force between the robot and the object after the predetermined time point. Hence, in this case, according to the first invention, the new desired gait is generated using the first leg motion parameter and the first trajectory of the desired acting force between the robot and the object.

Meanwhile, if the discrimination by the discriminating means indicates that a proper second leg motion parameter cannot be set, then it is impossible to generate a desired gait which satisfies the dynamical restrictive condition if the trajectory turns into a second trajectory of a desired acting force between the robot and the object, in which an actual acting force between the robot and the object is different from the first desired acting force between the robot and the object after the predetermined time point, thus making it difficult to secure stability of the robot. Hence, in this case, according to the first invention, the schedule for moving the object is corrected, and the first leg motion parameter and the first trajectory of a desired acting force between the robot and the object are re-determined using at least the corrected moving schedule. Then, the new desired gait is generated using the first leg motion parameter and the first trajectory of a desired acting force between the robot and the object which have been re-determined.

Thus, even if the trajectory turns into a second trajectory of a desired acting force between the robot and the object, in which an actual acting force between the robot and the object is different from the first desired acting force between the robot and the object after the predetermined time point, a desired gait that allows the dynamical restrictive condition to be satisfied can be generated by adjusting a leg motion parameter, i.e., a motion of a leg.

Therefore, according to the first invention, a gait for causing a robot to perform an operation of moving an object is generated, considering a case where a future acting force between the robot and the object deviates from a desired value, and a gait of a robot can be generated such that the stability of a posture of the robot can be secured even if the acting force deviates from a desired value.

In the first invention, to generate a new desired gait, a trajectory of a desired position (desired ZMP) of a ZMP (Zero Moment Point) at which the horizontal component of a moment generated by the resultant force of an inertial force produced due to a motion of the robot, an acting force applied to the robot from the object, and the gravity acting on the robot becomes zero may be determined on the basis of, for example, a leg motion parameter, then the desired gait may be generated using a dynamic model of the robot such that the desired ZMP is satisfied (such that the horizontal component of the moment about the desired ZMP becomes zero). At this time, when determining a desired ZMP trajectory, the desired ZMP trajectory is preferably determined such that a new desired gait converges to a virtual cyclic gait. Further, the legged mobile robot may be a robot having two or more legs.

In the first invention, preferably, the predetermined time point is, for example, a time point at which the magnitude of the acting force of the first trajectory of a desired acting force between the robot and the object provisionally determined by the aforesaid first acting force trajectory determining means or the magnitude of the changing velocity of the acting force exceeds a predetermined threshold value, and the second trajectory of a desired acting force between the robot and the object is a trajectory in which the magnitude of an acting force between the robot and the object or the magnitude of the changing velocity of the acting force after the predetermined time point takes a value that is smaller than the aforesaid predetermined threshold value (a second invention).

More specifically, if an actual acting force between the robot and the object does not change according to the first trajectory of a desired acting force between the robot and the object at a time point when the first trajectory of a desired acting force between the robot and the object changes relatively suddenly (a time point at which the moving velocity of the object is relatively suddenly changed, such as a time point at which the robot starts to move the object), then it frequently becomes difficult to generate a desired gait that allows the aforesaid dynamical restrictive condition to be satisfied (a gait that allows the stability of the robot to be secured). Hence, as in the second invention, the aforesaid predetermined time point is determined and then the second trajectory of a desired acting force between the robot and the object is determined, thereby making it possible to successfully obtain the advantages explained in the aforesaid first invention.

Further, in the first invention or the second invention described above, the predetermined dynamical restrictive condition preferably includes at least a condition in which a ZMP determined by a resultant force of an inertial force produced by a motion of a desired gait of the robot, the gravity acting on the robot, and an acting force applied to the robot from the object lies within a predetermined permissible range (a third invention).

According to the third invention, the range within which the ZMP (the point at which the horizontal component of the moment generated by the aforesaid resultant force becomes zero) lies is restricted, so that it is possible to properly determine whether or not a desired gait that allows the stability of the robot to be secured (a gait that causes the ZMP to lie within a predetermined permissible range) can be generated in a case where a trajectory turns into a second trajectory of a desired acting force between the robot and the object in which an actual acting force between the robot and the object is different from the first desired acting force between the robot and the object after the aforesaid predetermined time point.

BEST MODE FOR CARRYING OUT THE INVENTION

The following will explain a gait generating device of a legged mobile robot according to an embodiment of the present invention with reference to the accompanying drawings. A bipedal mobile robot will be taken as an example of a legged mobile robot.

FIG. 1 is a schematic diagram providing a general view of a bipedal mobile robot as a legged mobile robot according to the embodiment.

As shown in the figure, a bipedal mobile robot (hereinafter referred to as "the robot") 1 is equipped with a pair of right and left legs (leg links) 2, 2 extended downward from a body (a base body of the robot 1) 3. The two legs 2, 2 share the same construction, each having six joints. The six joints are comprised of, in the following order from the body 3 side, joints 10R, 10L (the symbols R and L are the symbols meaning that they correspond to a right leg and a left leg, respectively: the same will apply hereinafter) for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2, and the body 3 is installed at the uppermost top of the two legs 2, 2 through the intermediary of the three joints 10R(L), 12R(L) and 14R(L) of the hip of each leg 2. A control unit 60 and the like, which will be discussed in detail hereinafter, is housed in the body 3. For the sake of convenience of illustration, the control unit 60 is shown outside the body 3 in FIG. 1.

In each leg 2 having the construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arms (arm links) 5, 5 is attached to both sides of an upper portion of the body 3, and a head 4 is disposed at a top end of the body 3. Both arms 5, 5 share the same construction and each of them has seven joints. More specifically, each arm 5 is provided with a shoulder joint composed of three joints 30R(L), 32R(L), and 34R(L), an elbow joint composed of a joint 36R(L), a wrist joint composed of three joints, namely, 38R(L), 40R(L) and 42R(L), and a hand portion (hand) 44R(L) connected to the wrist joint. The head 4 is not directly associated with the topic of the present invention, so that detailed explanation thereof will be omitted.

The construction described above imparts six degrees of freedom to the foot 22R(L) of each leg 2 relative to the body 3. During a travel, such as walking, of the robot 1, desired motions of the two feet 22R and 22L can be accomplished by driving 6*2=12 joints of the two legs 2, 2 together ("*" in this description denotes multiplication for scalar calculation, while it denotes an outer product in vector calculation) at appropriate angles. This arrangement enables the robot 1 to arbitrarily move in a three-dimensional space. Furthermore, each arm 5 is given seven degrees of freedom relative to the body 3 and capable of performing a desired operation, such as pushing a carriage, which will be discussed later, by driving 7*2=14 joints of the two arms 5, 5 together at appropriate angles.

As shown in FIG. 1, a publicly known six-axis force sensor 50 is provided under the ankle joints 18R(L), 20R(L) and between the ankle joints and the foot 22R(L) of each leg 2. The six-axis force sensor 50 detects primarily whether the foot 22R(L) of each leg 2 is in contact with the ground and a floor reaction force (ground contact load) acting on each leg 2, and outputs detection signals of components in three directions Fx, Fy and Fz of a translational force of the floor reaction force and components in three directions Mx, My and Mz of a moment to the control unit 60. A six-axis force sensor 52 similar to the six-axis force sensor 50 is provided between the hand portion (hand) 44R(L) of each arm 5 and the wrist joints 38R(L), 40R(L), and 42R(L), and detection signals of components in three directions of a translational force and components in three directions of a moment of an external force acting on the hand portion 44R(L) are output from the six-axis force sensor 52 to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis-direction accelerometer and a three-axis-direction gyro sensor, which are not shown, and the detection signals of these sensors are used to detect posture angles (inclination angles and yaw angles) of the body 3 and angular velocities thereof and also to estimate its own position/posture of the robot 1. Although detailed structures are not shown, each joint of the robot 1 is provided with an electric motor 64 (refer to FIG. 2) for driving the joint and an encoder (rotary encoder) 65 (refer to FIG. 2) for detecting a rotational amount of the electric motor 64 (a rotational angle of each joint). Detection signals of the encoder 65 are output from the encoder 65 to the control unit 60.

Furthermore, although not shown, an elastic member, such as a spring, is installed between each foot 22R(L) and the six-axis force sensor 50, and an elastic member, such as rubber, is bonded to the bottom surface of the foot 22R(L). These elastic members constitute a compliance mechanism, which elastically deforms when each leg 2 is subjected to a floor reaction force.

FIG. 2 is a block diagram showing the construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the six-axis force sensor 52 of each arm 5, the posture sensor 54 (an accelerometer and a rate gyro sensor), etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates a desired gait, calculates a joint angle displacement command (a command value of a displacement angle of each joint or a rotational angle of each electric motor 64), and sends the calculated command to the RAM 84. The second calculator 92 reads the joint angle displacement command from the RAM 84 and an actual measurement value of a joint angle detected on the basis of an output signal of the encoder 65 to calculate a manipulated variable required for driving each joint and outputs the calculated manipulated variable to the electric motor 64 for driving each joint through the intermediary of the D/A converter 96 and a servo amplifier 64a.

FIG. 3 is a block diagram providing a general view of the functional construction of a control device of a legged mobile robot according to an embodiment in the present description. A portion enclosed by the dashed line in this FIG. 3 is constituted of the processing functions (primarily the functions of the first calculator 90 and the second calculator 92) implemented by the control unit 60. In the following explanation, the symbols R and L will be omitted as long as it is not particularly necessary to discriminate right and left of the legs 2 and the arms 5.

The following will explain the functional construction of the control unit 60, which is comprised of a gait generating device 100, an object reaction force balance controller 102, a leg main controller 104, and an arm main controller 106. In the embodiment in this description, the processing by the object reaction force balance controller 102, the leg main controller 104, and the arm main controller 106, excluding the processing by the gait generating device 100, is the same as the one previously proposed by the present applicant in Japanese Patent Laid-Open Publication No. H10-230485 (Patent Document 1 mentioned above). Hence, in the following explanation of the present embodiment, the explanation will be focused primarily on the gait generating device 100, while the explanation of the object reaction force balance controller 102, the leg main controller 104, and the arm main controller 106 will be simply a schematic explanation.

The gait generating device 100 generates a desired gait of the robot 1 freely and in real time and outputs the desired gait. A desired gait output by the gait generating device 100 is composed of a desired body position/posture trajectory (a desired position trajectory and a desired posture trajectory of the body 3), a desired foot position/posture trajectory (a desired position trajectory and a desired posture trajectory of each foot 22), a desired hand position/posture trajectory (a desired position trajectory and a desired posture trajectory of the hand 44 of each arm 5), a desired total floor reaction force central point trajectory (the trajectory of a desired position of a total floor reaction force central point), a desired total floor reaction force trajectory, and a desired object reaction force trajectory. If a portion that can be moved relative to the body 3 is provided in addition to the legs 2 and the arms 5, then a desired position/posture trajectory of the movable portion is added to a desired gait. In the following explanation, the "desired" will be frequently omitted unless there is a danger of misunderstanding.

Here, the meanings and definitions of terms related to desired gaits generated by the gait generating device 100 will be explained. The "trajectory" in a gait means a temporal change pattern (time series pattern).

The "position" of each portion of the robot 1, such as a foot position or a body position, means the position of a certain representative point fixedly set on the portion. For example, in the present embodiment, the representative point of each foot 22 is the point at which a perpendicular line extended from the center of the ankle joint of the leg 2 provided with the foot 22 down to the bottom surface of the foot 22 intersects with the bottom surface, and the position of the representative point is the foot position. Further, a "posture" means a spatial orientation. Specifically, for example, a body posture is expressed by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis), and a foot posture is represented by means of a two-axis spatial azimuth fixedly set on each foot 22.

Components of a gait other than the components related to a floor reaction force and an object reaction force, i.e., a gait related to a motion of the robot 1, such as foot position/posture or body position/posture, will be generically referred to as "motion." A motion trajectory may be constant (temporally unchanged) or substantially constant. For instance, if the robot 1 is maintained in a state wherein both feet 22 and 22 thereof have been landed and remain stationary, then the foot position/posture trajectory will be constant.

An object reaction force in a gait means a reaction force of a force applied to an object from the robot 1 (a force acting on the robot 1 from an object) when causing the robot 1 to move a certain object. Thus, a desired object reaction force trajectory corresponds to the trajectory of a desired acting force between a robot and an object in the present invention. In an embodiment of the present description, an explanation will be given, taking a case where the robot 1 carries out an operation of pushing a certain object 120 while walking with the hands 44R, 44L of both arms 5, 5 engaged with predetermined portions of the object 120 (a carriage in the illustrated example) as an example, as shown in, for example, FIG. 4. A force received by the robot 1 from the object 120 is an object reaction force. The object reaction force is generally composed of a translational force component and a moment component. However, in the embodiment in the present description, the object reaction force means a translational force acting on the robot 1 from the object 120, and a moment about a certain point acting on the robot 1 due to the translational force is referred to as an object reaction force moment. Supplementally, an object reaction force is obtained by reversing the sign (direction) of a force to be applied to the object 120 from the robot 1, so that an acting force from the robot 1 to the object 120 may be used in place of an object reaction force.

In the present description, regarding a motion of the object 120, a position of the object 120 means a position of a representative point fixedly set on the object 120, as with a foot position or the like of the robot 1. Further, a posture of the object 120 means a spatial orientation of the object 120, as with a posture or the like of the foot 22 of the robot 1. And, a position and a posture of the object 120 are generically referred to as object motion in some cases.

Further, a floor reaction force (a floor reaction force composed of a translational force and a moment) acting on each foot 22 is referred to as "the floor reaction force of each foot" and a resultant force of "the floor reaction force of each foot" of all (two) feet 22R and 22L of the robot 1 is referred to as "the total floor reaction force." In the following explanation, however, each foot floor reaction force will be hardly referred to, so that "the floor reaction force" will be handled as synonymous with "the total floor reaction force" unless otherwise specified.

A desired floor reaction force is generally expressed by a point of action and a translational force and a moment acting on the point. The point of action may be set at any point, so that there are countless conceivable expressions for the same desire floor reaction force. If a desired floor reaction force is expressed by taking a desired floor reaction force central point (a desired position of the central point of a total floor reaction force), in particular, as the point of action, then the moment component of the desired floor reaction force will be zero, excluding a vertical component (the moment about the vertical axis (Z-axis)). In other words, the horizontal component (the moment about the horizontal axis (the X-axis and a Y-axis)) of the moment of the desired floor reaction force about the desired floor reaction force central point will be zero. Hence, in the embodiment in the present description, the gait generating device 100 performs generation, taking the desired floor reaction force central point as the point of action of the desired total floor reaction force. Incidentally, the desired floor reaction force central point has the meaning as the point of action of the desired total floor reaction force, so that it may be said to be a component of the desired total floor reaction force in the basic sense. In the embodiment in the present description, however, a desired floor reaction force central point in a desired floor reaction force is closely related to the operational control of the robot 1. In FIG. 3, therefore, the desired floor reaction force central point, which is the point of action in the desired total floor reaction force, is shown separately from the desired total floor reaction force.

In the present description, ZMP (zero moment point) is used to mean a point at which the moment acting about the point due to a resultant force (or a floor reaction force that balances out the resultant force) of an inertial force produced by a motion of the robot and the gravity and an object reaction force acting on the robot is zero, excluding the vertical component thereof. In a gait that satisfies a dynamical balance condition, the ZMP calculated from a desired motion trajectory of the robot, the gravity, and a desired object reaction force agrees with a desired floor reaction force central point. In the present description, a desired ZMP is used instead of a desired floor reaction force central point in many cases.

Further, in the present description, a desired gait means a set of a desired motion, a desired floor reaction force (including a desired ZMP), and a desired object reaction force for a predetermined period. Especially, in the present embodiment, a desired gait (including a case where the desired gait is referred to simply as a gait) will mean a set of a desired motion, a desired floor reaction force (including a desired ZMP), and a desired object reaction force for the period of one step of the robot 1 unless otherwise specified. In this case, "one step" of a desired gait is used to mean the period from the instant when one leg 2 of the robot 1 lands to the instant when the other leg 2 lands. A series of gaits is formed of several gaits in connection (gaits for a predetermined period). In the explanation given hereinafter, a desired gait for one-step period may be referred to as a unit gait. Further, a one-step period in a state wherein the robot 1 is not traveling (a state wherein the contact of both feet 22 and 22 with the ground is maintained) means a certain predetermined period (a period corresponding to a one-step period in a case where the robot 1 travels).

A two-leg supporting period in a gait refers to a period during which the robot 1 supports its own weight by both legs 2, 2 (a period during which both legs 2, 2 are supporting legs), and a one-leg supporting period refers to a period during which the robot 1 supports its own weight only by one leg 2 (a period during which only one leg 2 is a supporting leg). In other words, a desired gait (unit gait) in the present embodiment is a desired gait for a period from the instant when a double stance begins to the instant when a one-leg supporting period ends. The leg 2 that supports the self-weight of the robot 1 is called a supporting leg. Both legs 2, 2 become the supporting legs in the two-leg supporting period, while one leg 2 becomes the supporting leg in the one-leg supporting period. Further, in the one-leg supporting period, the leg 2 not supporting the self-weight of the robot 1 (the leg 2 that is not a supporting leg) is called a free leg. In the explanation to be given hereinafter, a supporting leg in a desired gait will mean the leg 2 that lands at the beginning of the two-leg supporting period (the leg 2 that becomes a supporting leg in the one-leg supporting period following the two-leg supporting period) unless otherwise specified. Further, the foot 22 of the leg 2 on the supporting leg side and the foot 22 of the leg 2 on the free leg side will be referred to as the supporting leg foot 22 and the free leg foot 22, respectively. In addition, for convenience sake, even in a state wherein the robot 1 is not traveling (a state wherein the contact of both feet 22, 22 with the ground is maintained), one leg 2 is defined as a supporting leg, and the other leg 2 as a free leg.

Further, a desired gait (unit gait) to be newly generated by the gait generating device 100 or a desired gait (unit gait) that is being generated is called a current time's gait, a desired gait that is one step before the current time's gait is called a last time's gait, a desired gait that is one step following the current time's gait is called a next time's gait, and the further next desired gait is called the next but one time's gait.

A desired gait is described by means of a supporting leg coordinate system as a global coordinate system. In the present embodiment, the supporting leg coordinate system is a global coordinate system (a coordinate system fixed to a floor) in which the point at which a perpendicular line extended to a floor surface from the center of the ankle joints 18 and 20 of the supporting leg intersects with the floor surface in a state wherein substantially the entire bottom surface of the supporting leg foot 22 is in contact (close contact) with the floor surface (this point agreeing with the representative point of the foot 22 in a state wherein substantially the entire bottom surface of the supporting leg foot 22 is in contact with the floor surface in an example of the present embodiment in the present description) while the supporting leg foot 22 is in a horizontal posture (more generally, a posture parallel to the floor surface) is defined as the origin, and a horizontal plane that passes the origin is defined as an XY plane. In this case, the X-axis direction and the Y-axis direction indicate the longitudinal direction and the lateral direction, respectively, of the supporting leg foot 22. In the present description, the X-axis, the Y-axis, and the Z-axis mean three axes of the supporting leg coordinate system unless otherwise specified. The origin of the supporting leg coordinate system does not necessarily have to agree with the representative point of the foot 22 in the state wherein substantially the entire bottom surface of the supporting leg foot 22 is in contact with the floor surface, and it may alternatively be set at a point on the floor surface that is different from the representative point.

The matters explained above apply not only to a first embodiment to be explained below but also apply to each embodiment explained in the present description.

First Embodiment

The following will explain in detail a gait generating device 100 according to a first embodiment of the present invention. FIG. 5 to FIG. 8 show flowcharts that illustrate the processing by the gait generating device 100. The calculation processing function of the gait generating device 100 includes a first acting force trajectory determining means, a first leg motion parameter determining means, a second acting force trajectory determining means, and a discriminating means in the present invention.

The gait generating device 100 sequentially carries out the processing shown in the flowcharts of FIG. 5 to FIG. 8 at a predetermined calculation processing cycle.

First, in S01, a moving schedule for an object 120 is determined. The moving schedule to be determined here includes at least a moving schedule for the object 120 for a predetermined future period (for a plurality of steps of the robot 1) from the current time. The moving schedule is decided basically according to a moving requirement of the object 120 (a design requirement on a method and timing for moving the object 120), and it is constituted of a position/posture trajectory (a time series of position and posture) of the object 120 or a parameter or a function or the like that defines the trajectory. For instance, if a moving requirement for the object 120 is to move the object 120 at a constant velocity in the X-axis direction at certain time t0, then the moving schedule is decided as illustrated by a graph g1 of FIG. 9. The graph g1 shows time-dependent changes of an object position (a position in the X-axis direction) in the moving schedule. In this case, for instance, the time series of the position of the object 120 at each time (time at each certain time interval) after the current time may be decided as the moving schedule, or time t0 and the inclination of the graph g1 (moving velocity of the object 120) may be decided as the elements (the parameters) that define the moving schedule or a function expression of the graph g1 may be decided as the element (the parameter) that defines the moving schedule. Incidentally, the moving requirement is supplied to the gait generating device 100 from outside, as necessary, or stored and retained in a storage means, which is not shown, of the control unit 60 beforehand.

Supplementally, the moving schedule decided in S01 is not necessarily decided according to a moving requirement; it is corrected as appropriate when necessary, which will be discussed hereinafter.

The procedure then proceeds to S03 wherein a desired object motion trajectory (a desired object position/posture trajectory) and a desired object reaction force trajectory are provisionally determined using an object dynamic model on the basis of the moving schedule decided in S01 as described above.

The processing of this S03 and the object dynamic model used in the processing will now be explained with reference to the block diagram of FIG. 10. FIG. 10 is the block diagram showing the calculation processing for determining a desired object position trajectory and a desired object reaction force trajectory of a desired object motion trajectory in S03. The portion enclosed by the dashed line in the block diagram provides the object dynamic model showing a relationship between forces acting on the object 120 and motions of the object 120. In the present embodiment, for the convenience of understanding, the explanation will be given by taking, as an example, a case where the object 120 is moved on a substantially horizontal floor.

The object dynamic model shown in FIG. 10 is a dynamic model (forward dynamic model) that receives a force (more specifically, a translational force in the horizontal direction) to be applied to the object 120 as an input and outputs a position of the object 120. To be more specific, the object dynamic model determines a motional acceleration of the object 120 by multiplying an input value of a translational force in the horizontal direction to be applied to the object 120 (the value determined by an adder 204, which will be discussed later) by a reciprocal 1/M of a mass M of the object 120 by a multiplier 206, then the obtained result is sequentially integrated (double-integrated) by integrators 208 and 210 thereby to output a position of the object 120 (a position on the object dynamic model). In other words, in the present embodiment, the object dynamic model shown in FIG. 10 is constructed on the basis of a dynamic equation that a translational force acting on the object 120 is equal to a product of an acceleration and a mass of the object 120. An output of the integrator 208 means a moving velocity of the object 120 on the object dynamic model and this will be hereinafter referred to as an object model velocity.

The calculation processing in S03 that uses such an object dynamic model will be specifically explained with reference to FIG. 10. First, a desired object velocity, which is a desired velocity at each instant (at each time) of the object 120 based on the moving schedule determined in S01 described above, and the object model velocity previously determined by the integrator 208 are input to a subtractor 200, which determines a difference therebetween (=the desired object velocity−the object model velocity). Here, the desired object velocity is a value obtained as a first-order differential value of a position trajectory of the object 120 in the moving schedule or a component of the moving schedule. In the example of the moving schedule shown in FIG. 9 described above, the inclination of the graph g1 may be directly used as the desired object velocity, and in this case, the desired object velocity will continually take a constant value. Then, the time series of the desired object velocity for a predetermined future period (for a plurality of steps of the robot 1) from the current time is sequentially input to the subtractor 200. The object model velocity input to the subtractor 200 is the value output from the integrator 208 when a desired object velocity immediately preceding the desired object velocity to be newly input is supplied to the subtractor 200.

Subsequently, the difference is multiplied by a predetermined gain Kv by a multiplier 202 to determine a required value of a translational force that should be applied to the object 120 from the robot 1. This means that, in the present embodiment, the required value of the translational force is determined by a feed-back control law such that the difference between the object desired velocity and the object model velocity converges to zero (such that the object model velocity follows the object desired velocity). As the feed-back control law, a proportional control law is used in this example. Then, a time series of the result obtained by reversing the sign of the determined required value of the translational force is output as a desired object reaction force trajectory.

Further, the determined required value of the translational force and an estimated disturbance force, which is an estimated value of a disturbance force applied to the actual object 120 from a source other than the robot 1 (e.g., a frictional force acting on the object 120 from a floor), are supplied to the adder 204, and the sum of the required value of the translational force and the estimated disturbance force is determined by the adder 204 as an input value of the translational force for the object dynamic model. Here, the estimated disturbance force is determined by the processing in S61, which will be described later, for each calculation processing cycle of the gait generating device 100. As an estimated disturbance force to be input to the adder 120, the value determined at the previous calculation processing cycle of the gait generating device 100 is used. Then, the input value of the translational force determined as described above is supplied to the object dynamic model so as to determine the position of the object 120 as described above, and the time series of the determined position is output from the integrator 210 as a desired object position trajectory.

An initial value of an output of the integrator 208 of the object dynamic model (an initial value of the gait generating device 100 at each calculation processing cycle) is set to a value at time associated with a previous calculation processing cycle (the current time at the previous calculation processing cycle) in the time series of an object model velocity determined by carrying out the processing of S03 at the previous calculation processing cycle of the gait generating device 100. Further, an initial value of an output of the integrator 210 is set to a value at time associated with a previous calculation processing cycle (the current time at the previous calculation processing cycle) in the time series of a desired object position determined by carrying out the processing of S03 at the previous calculation processing cycle of the gait generating device 100.

A desired object posture trajectory in a desired object motion trajectory is determined such that, for example, it substantially agrees with the direction of a desired object velocity.

Supplementally, as long as a moving schedule and an estimated disturbance force are maintained to be constant, a desired object motion trajectory and a desired object reaction force trajectory remain to be constant; therefore, the processing in S03 does not necessarily have to be implemented for each calculation processing cycle of the gait generating device 100. Hence, for example, the processing in S03 may be carried out for each step of the robot 1 or once every more than one calculation processing cycle of the gait generating device 100, or when a moving schedule has been changed in S01 or if an estimated disturbance force has incurred a relatively significant change.

By the processing in S03 explained above, a desired object motion trajectory and a desired object reaction force trajectory for a predetermined future period from the current time are provisionally determined.

The processing in S03 provisionally determines a desired object reaction force trajectory as described above, so that it includes the function as the first acting force trajectory determining means in the present invention.

Supplementally, in the present embodiment, the inverted dynamic model has been used as the object dynamic model; however, a forward dynamic model may be used to provisionally determine a desired object position trajectory and a desired object reaction force trajectory. In this case, a desired object velocity based on, for example, a moving schedule, is integrated so as to generate a desired object position trajectory and an estimated disturbance force is subtracted from a result obtained by multiplying the differential value (first-order differential value) of the desired object velocity by the mass of the object 120. Then, the trajectory obtained by reversing the sign of the subtraction result may be generated as the desired object reaction force trajectory.

Subsequently, the procedure proceeds to S05 wherein predicted landing positions/postures and predicted landing time of the free leg foot 22 of the robot 1 are provisionally determined on the basis of the desired object motion trajectory provisionally determined as described above. The predicted landing positions/postures and the predicted landing time provisionally determined here are the predicted landing positions/postures and the predicted landing time of the free leg foot 22 for a plurality of steps (for at least two steps) of the robot 1, including the predicted landing position/posture and the predicted landing time of the free leg foot 22 in the current time's gait, which is the desired gait to be created now. In other words, the predicted landing position/posture and the predicted landing time to be provisionally determined include at least the predicted landing position/posture and the predicted landing time of the free leg foot 22 for the current time's gait and the predicted landing position/posture and the predicted landing time of the free leg foot 22 for the next time's gait. In this case, the predicted landing position/posture and the predicted landing time of the free leg foot 22 are determined such that, for example, the landing position/posture of the free leg foot 22 at predicted landing time have a predetermined relative position/posture relationship with the object position/posture at that time in relation to the desired object motion trajectory determined in S03.

However, the predicted landing position/posture and the predicted landing time of the free leg foot 22 do not have to be necessarily determined such that they follow desired object position/posture. For example, if the object 120 is moved by pushing in a state wherein the robot 1 does not travel (a state wherein the contact of both feet 22, 22 with the ground is maintained), and after the movement is started, the hands 44 of the arms 5, 5 are disengaged from the object 120, then the predicted landing position/posture of the free leg foot 22 in each gait will be maintained to be constant as time elapses. In other words, the predicted landing position/posture and the predicted landing time of the free leg foot 22 are generally determined not only on the basis of a desired object motion trajectory but also a design requirement on the type of motion of the robot 1 to move the object 120.

More detailedly, the predicted landing position/posture of the free leg foot 22 are the position/posture of the free leg foot 22 in a state wherein substantially the entire bottom surface of the free leg foot 22 is brought into contact with a floor surface by landing the heel of the free leg foot 22 and rotating it in the pitch direction without slippage while the free leg foot 22 is held in contact with the floor. Hence, in the present embodiment, the predicted landing position/posture of the free leg foot 22R or 22L define the position/posture on a supporting leg coordinate system in a unit gait from the landing instant to the landing of the next free leg foot 22L or 22R. Thus, determining the predicted landing position/posture of the free leg foot 22 automatically determines the position/posture on the supporting leg coordinate system in each unit gait according to the technique for setting the supporting leg coordinate system described above. Specifically, the supporting leg coordinate system in each unit gait will be a coordinate system in which the origin thereof is the point at which a perpendicular line extended from the center of the ankle joint of the leg 2 having the foot 22 to a floor surface intersects with the floor surface in a state wherein the free leg foot 22 of a unit gait immediately preceding the aforesaid unit gait has been matched to the predicted landing position/posture.

Subsequently, the procedure proceeds to S07 wherein a ZMP trajectory parameter that defines a desired ZMP trajectory of the current time's gait is provisionally determined. The ZMP trajectory parameter provisionally determined here is determined such that the desired ZMP (hereinafter referred to as the provisional desired ZMP) of the current time's gait defined thereby exists substantially around the center of a ground contact plane of the supporting leg foot 22 in the current time's gait (a so-called supporting polygon that includes the ground contact plane of both feet 22 in a two-leg supporting period) that is determined by the predicted landing position/posture and the predicted landing time provisionally determined in S05 and that it does not suddenly change. In other words, the ZMP trajectory parameter is determined such that the provisional desired ZMP in the current time's gait exists at a position where the stability allowance of the robot 1 is maximized within the ground contact plane (or the supporting polygon) of the robot 1 and that it does not suddenly change. The provisional desired ZMP determined according to such guidelines exhibits, for example, a pattern as shown in FIG. 11(a). FIG. 11(a) shows the pattern of the position of the provisional desired ZMP in the X-axis direction. In the case of this example, the positions and the times of the break points in the provisional desired ZMP pattern (trajectory) are provisionally determined as ZMP trajectory parameters.

Subsequently, the procedure proceeds to S09 wherein the trajectory of an object reaction force moment (the time series of instantaneous values of an object reaction force moment in the current time's gait) about the provisional desired ZMP determined by the currently provisionally determined ZMP trajectory parameters is calculated on the basis of the desired object motion trajectory and the desired object reaction force trajectory that are currently provisionally determined. More specifically, first, the motion trajectories (position/posture trajectories) of portions of the object 120 with which the hands 44R, 44L of the two arms 5, 5 of the robot 120 are to engage are determined on the basis of the desired object motion trajectory. The positions/postures of the portions are to have a predetermined position/posture relationship relative to the position/posture of the object 120. Then, the hand position/posture trajectories of the robot 1 (defining the trajectory of the point of action of an object reaction force relative to the robot 1) are determined such that they match the motion trajectories (position/posture trajectories) of the portions. Subsequently, the object reaction force moment about the provisional desired ZMP at each time (time at each certain time interval) is calculated from the determined hand position/posture trajectories, the desired object reaction force trajectory, and the provisional desired ZMP trajectory. And, the time series of the calculated object reaction force moment is obtained as the object reaction force moment trajectory. In a case where the robot 1 is moved close to the object 120 from a location that is apart from the object 120 and then the hands 44R, 44L are engaged with the object 120 to start the operation of pushing the object 120, the object reaction force trajectory and eventually the object reaction force moment trajectory until the time at which the hands 44R, 44L are engaged with the object 120 (the time being decided as appropriate) will be zero.

Subsequently, the procedure proceeds to S11 wherein a gait parameter of a normal turning gait as a cyclic gait following the current time's gait is determined. The gait parameter includes a foot trajectory parameter, which defines a foot position/posture trajectory in a normal turning gait, a ZMP trajectory parameter, which defines a desired ZMP trajectory, and an object reaction force trajectory parameter, which defines a desired object reaction force moment trajectory.

Before specifically explaining these gait parameters, an overview of a normal turning gait will be explained. In the following explanation, "start" and "end" of a gait means the start time and the end time, respectively, of each gait or an instantaneous gait at the start time or the end time.

A normal turning gait means a cyclic gait that does not cause discontinuity in a motion state (a state, such as foot position/posture or body position/posture) of the robot 1 at a boundary of a gait (a boundary of a gait for each step in the present embodiment) when the gait is repeated.

In the present embodiment, a normal turning gait, which is a cyclic gait, is a gait for two steps of the robot 1. In other words, a gait composed of a first turning gait following the current time's gait and a second turning gait following the first turning gait is defined as the gait for one cycle of the normal turning gait, and the gait for one cycle is repeated. Here, the term "turning" is used, because setting a turning rate to zero means moving straight, so that moving straight can be also included in turning in a broad sense. Hereinafter, a normal turning gait may be abbreviated to a normal gait.

To supplement the explanation of a normal gait, in a bipedal mobile robot as the robot 1, a normal gait for one cycle is composed of gaits for at least two steps (two successive unit gaits). It is also possible to set a complicated normal gait that has gaits for three steps or more defined as the gaits for one cycle. However, as will be discussed hereinafter, a normal gait is used only to determine a divergent component at the end of the current time's gait (the details thereof will be discussed later). For this reason, using the normal gait having the gaits for three steps or more as one cycle would provide low effect, while the processing for generating the gaits would be complicated. Thus, the gaits for one cycle of normal gaits in the present embodiment are composed of gaits for two steps (first and second turning gaits). In the following explanation of the normal gaits, for the convenience of explanation, the normal gaits composed of gaits for two steps are regarded as the gaits for one step. The normal gaits are virtual gaits temporarily assumed (in the calculation processing by the gait generating device 100) to determine a divergent component at the end of the current time's gait by the gait generating device 100, and they are not directly output from the gait generating device 100.

The term "divergence" means that the horizontal position of the body 3 of the bipedal mobile robot 1 shifts to a position apart from the positions of both feet 22, 22. A value of a divergent component is a numeral value that indicates the degree of distance of the horizontal position of the body 3 of the bipedal mobile robot 1 apart from the positions of both feet 22, 22 (more specifically, the origin of a supporting leg coordinate system set on the ground contact surface of the supporting leg foot 22).

In the present embodiment, gaits are generated using divergent components as indicators such that desired gaits are continuously generated without developing the divergence. More specifically, a divergent component at the start of a normal gait following a current time's gait is determined, and then the current time's gait is generated (a gait parameter that defines the current time's gait is determined) such that a divergent component at the end of the current time's gait matches the divergent component at the start of the normal gait (more generally, the body position/posture of the current time's gait converge to the body position/posture of the normal gait). Then, the divergent component at the start of the normal gait is determined on the basis of the gait parameter determined in S11 such that a condition of a normal gait that a motion state of the robot 1 at the start of the normal gait (the start of the first turning gait) agrees with that at the end thereof (the end of the second turning gait)(this will be hereinafter referred to as a boundary condition of a normal gait) is satisfied on a dynamic model of the robot 1. The basic guideline for generating gaits described above is the same as that previously proposed in PCT international publication WO/02/40224A1 by the present applicant. Therefore, in the following explanation regarding the normal gaits, technical matters that are different from the matters described in PCT international publication WO/02/40224A1 will be mainly explained, and detailed explanation of similar technical matters may be omitted.

Returning to the explanation of S11, the foot trajectory parameter of the gait parameter of the normal gait is composed of the positions/postures of the supporting leg foot 22 and the free leg foot 22, respectively, at the start and the end of the first turning gait and the second turning gait, respectively, the gait cycle of each turning gait, and the like, and it is determined such that the foot position/posture trajectory is connected in the order of the current time's gait, the first turning gait, and the second turning gait. The following will explain a specific setting method with reference to FIG. 12.

The free leg foot position/posture at the start of a first turning gait are to be the supporting leg foot position/posture at the end of the current time's gait observed from the supporting leg coordinate system of the next time's gait. The supporting leg foot position/posture at the end of the current time's gait are the position/posture of the supporting leg foot 22 obtained when the supporting leg foot 22 at the start of the current time's gait is rotated in the pitch direction until substantially the entire bottom surface of the supporting leg foot 22 is brought in contact with a floor without slippage while the supporting leg foot 22 at the start of the current time's gait is held in contact with the floor (they agree with the predicted landing position/posture of the free leg foot 22 of the last time's gait). The position/posture on a next time's gait supporting leg coordinate system are determined on the basis of the predicted landing position/posture of the free leg foot 22 of the current time's gait, as shown in FIG. 12.

The supporting leg foot position/posture at the start of the first turning gait are to be the free leg foot position/posture at the end of the current time's gait observed from the supporting leg coordinate system of the next time's gait. The free leg foot position/posture at the end of the current time's gait are determined to be the position/posture based on the predicted landing position/posture of the free leg foot 22 of the current time's gait (or the next time's gait supporting leg coordinate system determined based thereon). Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while it is held in contact with a floor provide the predicted landing position/posture of the free leg foot 22 of the current time's gait.

The free leg foot position/posture at the end of the first turning gait are to be the free leg foot position/posture at the end of the next time's gait observed from the supporting leg coordinate system of the next time's gait. The free leg foot position/posture at the end of the next time's gait are determined to be the position/posture based on the predicted landing position/posture of the free leg foot 22 of the next time's gait (or the next but one time's gait supporting leg coordinate system determined based thereon) in the same manner as the technique for determining the free leg foot position/posture at the end of the current time's gait.

The supporting leg foot position/posture at the end of the first turning gait are the position/posture of the supporting leg foot 22 obtained when the supporting leg foot 22 whose position/posture have been matched with the next time's gait supporting leg coordinate system is rotated in the pitch direction until substantially the entire bottom surface of the supporting leg foot 22 is brought in contact with a floor without slippage while the supporting leg foot 22 is held in contact with the floor (the position/posture agree with the predicted landing position/posture of the free leg foot 22 of the current time's gait).

The free leg foot position/posture at the start of the second turning gait are to be the supporting leg foot position/posture at the end of the first turning gait observed from the supporting leg coordinate system of the next but one time's gait. The supporting leg foot position/posture at the start of the second turning gait are to be the free leg foot position/posture at the end of the first turning gait observed from the next but one time's gait supporting leg coordinate system.

The free leg foot position/posture at the end of the second turning gait is determined such that the position/posture thereof observed from the next but one time's gait supporting leg coordinate system agree with the free leg foot position/posture at the end of the current time's gait observed from the current time's gait supporting leg coordinate system. The supporting leg foot position/posture at the end of the second turning gait is determined such that the position/posture thereof observed from the next but one time's gait supporting leg coordinate system agree with the supporting leg foot position/posture at the end of the current time's gait observed from the current time's gait supporting leg coordinate system.

The gait cycles of the first turning gait and the second turning gait are set to be the same as the next time's gait cycle (this being the difference between the predicted landing time of the free leg foot 22 of the current time's gait and the predicted landing time of the free leg foot 22 of the next time's gait). The gait cycles of the first turning gait and the second turning gait do not necessarily have to be the same with each other; however both cycles are preferably decided on the basis of at least the next time's gait cycle. Motion parameters (including time parameters, such as two-leg supporting period time) of the current time's gait, the first turning gait, and the second turning gait other than those described above are appropriately determined on the basis of the aforesaid determined parameters such that a gait condition (e.g., whether the velocity of an actuator falls within a permissible range, whether a movable angle is exceeded, or whether there is interference with a floor) is satisfied.

A ZMP trajectory parameter of the gait parameter of a normal gait is determined such that the ZMP trajectory defined by the ZMP trajectory parameter leads to an increased stability allowance of the robot 1 and does not suddenly change, as in the case where a desired ZMP trajectory parameter has been provisionally determined in S07 described above, on the basis of the foot trajectory parameters of a normal gait (e.g., the positions/postures of the supporting leg foot 22 and the free leg foot 22 at the starts and the ends, respectively, of the first turning gait and the second turning gait, and the two-leg supporting period time).

Further, an object reaction force moment trajectory parameter of a normal gait is determined such that a cyclic condition is satisfied. For example, it is assumed that an object reaction force moment trajectory associated with a current time's gait, a next time's gait, and a next but one time's gait is as shown in FIG. 13(a). Here, the object reaction force moment trajectory of the current time's gait is the trajectory determined in S09. The object reaction force moment trajectory of the next time's gait is the trajectory calculated in the same manner as that in S09 on the basis of the object reaction force trajectory and the desired object motion trajectory of the next time's gait determined in S03 and the ZMP trajectory defined by the ZMP trajectory parameter of a normal turning gait (the ZMP trajectory in the first first turning gait of a normal turning gait). The object reaction force moment trajectory of the next but one time's gait is the trajectory calculated in the same manner as that in S09 on the basis of the desired object reaction force trajectory and the desired object motion trajectory of the next but one time's gait determined in S03 and the ZMP trajectory defined by the ZMP trajectory parameter of a normal turning gait (the ZMP trajectory in the first second turning gait of a normal turning gait).

At this time, the object reaction force moment trajectory parameter of the normal turning gait is determined such that the object reaction force moment trajectory of the normal turning gait will be, for example, the trajectory shown in FIG. 13(b). In this example, the object reaction force moment trajectory from the start to the end of the first turning gait of the normal turning gait is determined such that it continues to the object reaction force moment trajectory of the current time's gait and agrees with the object reaction force moment trajectory of the next time's gait. Further, the object reaction force moment trajectory of the second turning gait of the normal turning gait is determined such that it continues to the object reaction force moment trajectory of the first turning gait and agrees with the object reaction force moment trajectory of the next but one time's gait from the start of the second turning gait up to time tx immediately before the end thereof, while it continually changes to the same value as the value at the start of the first turning gait (the start of the normal turning gait) from the value at time tx from time tx to the end thereof. Time tx corresponds to, for example, the time at a break point of the ZMP trajectory of the normal turning gait.

If the difference between the value of an object reaction force moment at the start of the next time's gait and the value of an object reaction force moment of the next but one time's gait is not very large, then the value of the object reaction force moment at the start of the normal turning gait and the value of the object reaction force moment at the end thereof do not necessarily have to be the same.

Subsequently, the procedure proceeds to S13 wherein a divergent component at the start of the normal turning gait is determined. In this case, since the normal turning gait is a cyclic gait, the divergent component at the start of the normal turning gait is determined such that the initial state (including the divergent component at the start) of a motion of the first turning gait and the terminal state (including the divergent component at the end) of a motion of the second turning gait agree with each other on a predetermined dynamic model of the robot 1.

Before explaining in detail the processing in this S13, the dynamic model of the robot 1 used for the processing in this S13 and the dynamic calculation for determining a desired body position by using the dynamic model will be explained. The dynamic model is used for the processing in S13 and also for determining a current time's gait by the processing up to S37, which will be discussed later; it is a dynamic model that expresses simplified (approximate) dynamic behaviors of the robot 1 (a relationship between forces acting on the robot 1 and motions). Hereinafter, the dynamic model will be referred to as the robot simplified model. The basic structure of this robot simplified model is the same as that in PCT international publication WO/02/40224A1, but it differs from the one in the application in that an object reaction force moment is taken into account.

FIG. 14 shows the structure of the robot simplified model. As illustrated, the robot simplified model is a three-mass-point model and constructed such that the dynamics of the legs 2 and the dynamics of the body 3 do not interfere with each other, and the dynamics of the entire robot 1 is indicated by linear connections thereof.

The robot simplified model is constructed of an inverted pendulum A and two leg mass points 2m, 2m (a supporting leg mass point and a free leg mass point). Each leg mass point 2m is a mass point associated with each leg 2. Each of these leg mass points 2m is a fixed point in a local coordinate system arbitrarily set fixedly on the foot 22 of each corresponding leg 2, and the position thereof is uniquely determined on the basis of the position/posture of each foot. For example, each foot mass point 2m is set at the point that is shifted toward the center of the ankle joint from a representative point of the sole of the foot 22 to the ankle joint side by a predetermined distance.

The inverted pendulum A is constituted of a free supporting point a, which horizontally moves, a mass point b, and a mass-free, length-variable link c that connects the supporting point a and the mass point b. In this case, it is assumed that even if the link c inclines, the link c expands or contracts so as to maintain a height h of the mass point b observed from the supporting point a at a constant value.

The mass point b of the inverted pendulum A (hereinafter referred to simply as the inverted pendulum mass point b) corresponds to a mass point of the body 3 of the robot 3, and therefore, the inverted pendulum mass point b may be hereinafter referred to as the body mass point b. A position of the inverted pendulum mass point b will be hereinafter abbreviated to an inverted pendulum position. The mass of the body mass point b includes the mass of the body 3 and the masses of the arms 5, 5 and the head 4.

The horizontal position of the body 3 of the robot 1 is geometrically determined from the horizontal position of the inverted pendulum mass point b. Specifically, for example, the horizontal position (an XY coordinates observed in the supporting leg coordinate system) of the representative point of the body 3, i.e., the horizontal component of the body position, agrees with the horizontal position of the inverted pendulum mass point b. In other words, as shown in FIG. 14, the representative point of the body 3 and the inverted pendulum mass point b are on the same vertical line.

The ZMP of the inverted pendulum A is located at the position of the free supporting point a (no moment is generated about the supporting point a); therefore, the position of the supporting point a of the inverted pendulum A will be hereinafter referred to as the inverted pendulum ZMP and denoted by ZMPpend.

To represent the robot simplified model by mathematical expressions, the variables and parameters related to the model will be defined as follows.

msup: Mass of supporting leg mass point $2m$; mswg: Mass of free leg mass point $2m$; mb: Mass of inverted pendulum mass point b; mtotal: Total mass of the robot 1 (=msup+mswg+mb); mfeet: Total mass of both legs 2, 2 (=msup+mswg); xsup: Position of supporting leg mass point $2m$; xswg: Position of free leg mass point $2m$; xb: Position of inverted pendulum (Position of the body mass point b); and h: Height of inverted pendulum (Height from the supporting point a to the inverted pendulum mass point b of the inverted pendulum A).

Hereinafter, xb, xsup, and xswg will be expressed by three-dimensional vectors (XYZ coordinate vectors) unless otherwise specified. When X takes an arbitrary variable, dX/dt denotes a first-order differential of X and d2X/dt2 denotes a second-order differential of X. "g" denotes a gravitational acceleration constant. G denotes a gravitational acceleration vector whose X component, Y component, and Z component are 0, 0, and −g, respectively.

In the robot simplified model shown in FIG. 14, the moment acting about a certain point of action P due to a total inertial force of both leg mass points $2m$, $2m$ (a resultant force of the inertial force due to the motions of both leg mass points $2m$, $2m$ and gravity) is defined as a leg total inertial force moment about point P, and a coordinate (position) of the point of action P is denoted by xp.

Expression 01 given below is a dynamic definitional equation of the leg total inertial force moment about the point P.

Leg total inertial force moment about point $P =$   Expression 01

$msup(xsup - xp) * G - msup(xsup - xp) * d\ 2xsup/dt2 +$ $mswg(xswg - xp) * G -$ $mswg(xswg - xp) * d\ 2xswg/dt2$ The leg ZMP is denoted by ZMPfeet and defined by Expression 02. However, the height of the leg ZMP (Z component of ZMPfeet) is the same as the height of the aforesaid point P. This leg ZMP is a value that is associated, in a quasi manner, with the resultant force of the inertial force generated by motions of the two legs 2, 2 and gravity.

Leg total inertial force moment about point $P = m\text{feet} * (ZMP\text{feet} - xp) * G$                 Expression 02

The aforesaid point of action P is set such that the approximation accuracy of the robot simplified model is enhanced. For example, the point of action P related to the current time's gait is set such that it linearly moves at constant velocity from the origin of the supporting leg coordinate system of the last time's gait to the origin of the supporting leg coordinate system of a current time's gait during a two-leg supporting period and that it is maintained at the origin of the supporting leg coordinate system of the current time's gait during a one-leg supporting period following the two-leg supporting period. The same applies to the point of action P related to the first turning gait and the second turning gait of a normal turning gait.

Further, the result obtained by dividing an object reaction force moment about a desired ZMP by the total mass mtotal of the robot 1 is defined as the object reaction force ZMP, and this is denoted as ZMPobj. More specifically, ZMPobj is defined by the following Expression 03.

ZMPobj=Object reaction force moment about desired ZMP/mtotal                 Expression 03

At this time, a linear relationship of the following Expression 04 approximately holds among the desired ZMP, the leg ZMP (ZMPfeet), the inverted pendulum ZMP (ZMPpend), and the object reaction force ZMP.

$ZMP\text{pend} = m\text{total}/mb * \text{desired}ZMP - m\text{feet}/mb * ZMP\text{feet} - m\text{total}/mb * ZMP\text{obj}$                 Expression 04

Expression 04 is a relational expression on a sagittal plane (XZ plane), and on a lateral plane (YZ plane), the sign of a third term of the right side in Expression 03 is reversed from "−" to "+."

Further, a differential equation denoting a behavior of the inverted pendulum A is represented by the following Expression 05.

Horizontal component of $d^2xb/dt^2 = g/h * $ (Horizontal component of $xb$ − Horizontal component of $ZMP\text{pend}$)                 Expression 05

Expressions 01 to 05 given above are the expressions that describe the dynamics of the robot simplified model shown in FIG. 14.

Using the robot simplified model makes it possible to determine a desired body position from desired foot position/posture, an object reaction force moment about a desired ZMP, the desired ZMP, and a desired body posture by the following dynamical calculation.

The dynamic calculation will be explained with reference to the block diagram of FIG. 15. FIG. 15 is the block diagram showing the dynamical calculation. The leg ZMP (ZMPfeet) is calculated according to Expressions 01 and 02 given above by a leg ZMP calculator 220 from the trajectories of desired positions/postures of both feet (desired positions/postures of the supporting leg foot 22 and the free leg foot 22) and the point of action P set as described above.

Further, the object reaction force moment about the desired ZMP is multiplied by 1/mtotal by a multiplier 222 to calculate the object reaction force ZMP (ZMPobj). Then, the result obtained by multiplying the calculated ZMPfeet by mfeet/mtotal by a multiplier 224 and the ZMPobj are subtracted from the desired ZMP by a subtractor 226, and a multiplier 228 multiplies the result of the subtraction by mtotal/mb, thereby carrying out the calculation of the right side of Expression 04 mentioned above. Thus, the inverted pendulum ZMP(ZMPpend) is calculated. Incidentally, ZMPpend determined according to the aforesaid calculation processing is on the sagittal plane. To calculate ZMPpend on the lateral plane, the calculation result of the multiplier 222 with a reversed sign may be input to the subtractor 226.

By supplying the ZMPpend calculated as described above to the inverted pendulum A, the inverted pendulum horizontal position xb is calculated according to Expression 05 given above. Further, based on the inverted pendulum horizontal position xb and the desired body posture, a desired body position is determined by a body position determiner 230. In this case, the body position determiner 230 defines the inverted pendulum horizontal position xb as the desired body horizontal position. Further, a desired body vertical position is determined on the basis of a desired body posture or the like by the body height determining technique previously proposed by the present applicant in, for example, Japanese Patent Laid-Open Publication H10-86080. Incidentally, in the present embodiment, the desired body posture of the robot 1 is, for example, a vertical posture.

Returning to the explanation of FIG. 5, the processing in S13 will be explained in detail below.

The processing in S13 determines the divergent component at the start of a normal gait on the basis of the aforesaid robot simplified model. If the divergent component in the gait is denoted by q and the horizontal velocity of the mass point b of the inverted pendulum A (or the body horizontal velocity) is denoted by vb, then q is defined by the following Expression 06 in the present embodiment.

$q = xb + vb/\omega 0$                 Expression 06 where $\omega 0$ denotes a natural frequency of the inverted pendulum A, that is, a square root of g/h.

The technical meaning of the divergent component defined as described above has been explained in detail in PCT international publication WO/02/40224A1, so that the explanation thereof will be omitted herein.

When the divergent component q is defined as described above, if the dynamic equation of the inverted pendulum A (the above Expression 05) is broken up, a solution is given to q, and the above Expression 04 is applied to the solution result, then the following Expression 07 is obtained. The desired ZMP is denoted as ZMPtotal.

$$q[k] - \exp(\omega 0 k \Delta t) * q[0] + \exp(\omega 0 k \Delta t) * (\exp(-\omega 0 \Delta t) - 1) *$$
$$\Sigma(\exp(-i\omega 0 \Delta t) * m\text{total}/mb * ZMP\text{total}[i]) -$$
$$\exp(\omega 0 k \Delta t) * (\exp(-\omega 0 \Delta t) - 1) *$$
$$\Sigma(\exp(-i\omega 0 \Delta t) * m\text{feet}/mb * ZMP\text{feet}[i]) -$$
$$\exp(\omega 0 k \Delta t) * (\exp(-\omega 0 \Delta t) - 1) *$$
$$\Sigma(\exp(-i\omega 0 \Delta t) * m\text{total}/mb * ZMP\text{obj}[i])$$

Expression 07 where exp( ) means an exponential function of the base e of a natural logarithm. Further, $\Delta t$ denotes time interval of a discrete system, and k denotes the number of steps ($k\Delta t$ means time). Further, $\Sigma$( ) of Expression 07 means cumulative adding calculation from i=0 to i=k−1.

Expression 07 is an expression that describes the divergent component q on the sagittal plane, and the expression that describes the divergent component q on the lateral plane is an expression obtained by reversing all signs of a fourth term of the right side of Expression 07 from "−" to "+".

Here, attention will be focused on a divergent component at the start of a normal turning gait (the start of the first turning gait) (hereinafter referred to as the initial divergent component) and a divergent component at the end (the end of the second turning gait) (hereinafter referred to as the terminal divergent component); q[0] (a divergent component at time 0) denotes the initial divergent component, and q[k] (a divergent component at time kΔt) denotes a terminal divergent component.

At this time, a first term of the right side of Expression 07 denotes the terminal divergent component generated by the initial divergent component. A second term of the right side denotes the terminal divergent component generated by a desired ZMP pattern. A third term of the right side denotes the terminal divergent component generated by motions of both legs 2, 2 (motions of both leg mass points 2m, 2m). A fourth term of the right side denotes the terminal divergent component generated by an object reaction force moment pattern. Hereinafter, the second term of the right side will be denoted by Wzmptotal, the third term of the right side will be denoted by Wfeet, and the fourth term of the right side will be denoted by Wobj. More specifically, Wzmptotal, Wfeet, and Wobj are defined by the following expressions 08a, 08b, and 08c.

$$Wzmptotal = \exp(\omega 0 k \Delta t)*(\exp(-\omega 0 \Delta t)-1)* \Sigma(\exp(-i\omega 0 \Delta t)*mtotal/mb*ZMPtotal[i]) \quad \text{Expression 08a}$$

$$Wfeet = -\exp(\omega 0 k \Delta t)*(\exp(-\omega 0 \Delta t)-1)* \Sigma(\exp(-i\omega 0 \Delta t)*mfeet/mb*ZMPfeet[i]) \quad \text{Expression 08b}$$

$$Wobj = -\exp(\omega 0 k \Delta t)*(\exp(-\omega 0 \Delta t)-1)* \Sigma(\exp(-i\omega 0 \Delta t)*mtotal/mb*ZMPobj[i]) \quad \text{Expression 08c}$$

Incidentally, Expression 08c is an expression that defines Wobj on the sagittal plane, and Wobj on the lateral plane is obtained by reversing the sign of the right side of Expression 08c.

Rewriting the above Expression 07 by using these Wzmptotal, Wfeet, and Wobj provides the following Expression 09.

$$q[k] = \exp(\omega 0 k \Delta t)*q[0] + Wzmptotal + Wfeet + Wobj \quad \text{Expression 09}$$

In the present embodiment, the initial divergent component that satisfies a boundary condition of a normal turning gait is analytically determined according to the above Expressions 08a, 08b, 08c, and 09 such that the initial divergent component observed in the supporting leg coordinate system of the normal turning gait following a current time's gait (the supporting leg coordinate system of the next time's gait (X'Y' coordinate system) shown in FIG. 12) agrees with the terminal divergent component of the normal turning gait (the normal turning gait following the current time's gait) observed from the supporting leg coordinate system of the gait following the normal turning gait (the supporting leg coordinate system of the next but two time's gait (X'''Y''' coordinate system) shown in FIG. 12).

Here, if the terminal divergent component of the normal turning gait observed from the supporting leg coordinate system of the gait following the normal turning gait (the supporting leg coordinate system of the next but two time's gait (X'''Y''' coordinate system) shown in FIG. 12) is denoted by q'[k], then the following Expression 10 must hold to satisfy the boundary condition of the normal turning gait.

$$q[0] = q'[k] \quad \text{Expression 10}$$

Further, if a rotating matrix for coordinate-converting a value described in the supporting leg coordinate system of the gait following the normal turning gait (the supporting leg coordinate system of the next but two time's gait (X'''Y''' coordinate system) shown in FIG. 12) into a value described in the supporting leg coordinate system of the normal turning gait (the supporting leg coordinate system of the next time's gait (X'Y' coordinate system) shown in FIG. 12) is denoted by M, and a parallel movement vector of a coordinate origin is denoted by B, then the following Expression 11 is obtained.

$$q[k] = Mq'[k] + B \quad \text{Expression 11}$$

Thus, the following Expression 12 is derived from these Expressions 10 and 11.

$$q[k] = Mq[0] + B \quad \text{Expression 12}$$

This Expression 12 indicates the condition to be satisfied by the initial divergent component q[0] and the terminal divergent component q[k] in order to satisfy the boundary condition of the normal gait.

And, the following Expression 13 is derived from this Expression 12 and the above Expressions 08a to 08c and 09.

$$q[0] = \text{inv}(M - \exp(\omega 0 k \Delta t)I)(Wzmptotal + Wfeet + Wobj - B) \quad \text{Expression 13}$$

In Expression 13, inv( ) indicates an inverted matrix of the matrix in the parenthesis, and I denotes a unit matrix.

In the present embodiment, based on this Expression 13, the initial divergent component q[0] that satisfies the boundary condition of the normal turning gait is determined.

Specifically, based on the ZMP trajectory parameter of the normal turning gait determined in S11 described above, ZMPtotal[i](i=0, 1 . . . , k−1), which denotes an instantaneous value of a desired ZMP at each time iΔt(i=0, 1 . . . , k−1) of a normal turning gait, is determined, and the determined value is used to carry out the calculation of the right side of Expression 08a mentioned above, thereby calculating Wzmptotal. Incidentally, Wzmptotal may be calculated by algorithm that utilizes the fact that a desired ZMP trajectory is a kinked-line trajectory, as explained in the PCT international publication WO/02/40224A1.

Further, based on the foot trajectory parameter of the normal turning gait determined in the above S11, the instantaneous values of the foot position/posture at each time iΔt(i=0, 1 . . . , k−1) of a normal turning gait are determined, and the determined values are applied to an expression that represents the above Expressions 01 and 02 in terms of discrete systems, thereby determining ZMPfeet[i]. Incidentally, the foot position/posture are calculated for each foot 22 by using, for example, the finite-duration setting filter proposed by the present applicant in U.S. Pat. No. 3,233,450. In this case, the foot position/posture trajectory to be calculated will be a trajectory in which the free leg foot 22 in each of the first turning gait and the second turning gait of a normal turning gait rises at the start time of a one-leg supporting period and moves toward a predicted landing position of the free leg foot 22, and the free leg foot 22 lands at the heel thereof at a position corresponding to the predicted landing position at predicted landing time of the free leg foot 22. Then, the right side of the above Expression 08b is calculated using the ZMPfeet1[i] determined as described above, thereby calculating Wfeet. Supplementally, if the predicted landing position/posture of the free leg foot 22 are the same landing position/posture of the supporting leg foot 22 in the preceding gait, then the foot position/posture trajectory will be a trajectory in which the landing position/posture are maintained to be constant. Alternatively, however, a foot position/posture trajectory in which the free leg foot 22 is raised once and then put back to its original landing position/posture may be generated.

Further, based on an object reaction force moment trajectory parameter of the normal turning gait determined in the above S11, an object reaction force moment about a desired ZMP at each time $i\Delta t(i=0, 1 \ldots, k-1)$ of a normal turning gait is determined, and the result is divided by mtotal to determine ZMPobj[i]. The determined ZMPobj[i] is used to calculate the right side of the above Expression 08c, thereby calculating Wobj.

The interval time $\Delta t$ used in the calculation of Wzmptotal, Wfeet, and Wobj is preferably the same as the calculation processing cycle of the gait generating device 100; however, it may be set to be longer than that to shorten the calculation processing time.

Then, from Wzmptotal, Wfeet, and Wobj determined as described above, the right side of the above Expression 12 is calculated so as to calculate the initial divergent component q[0] that satisfies the boundary condition of the normal turning gait.

The above has given the details of the processing in S13 in the present embodiment.

In the present embodiment, the initial divergent component q[0] has been analytically determined; alternatively, however, an initial divergent component of the normal turning gait that substantially agrees with a terminal divergent component of the normal turning gait observed from the supporting leg coordinate system of the gait that follows a normal turning gait following a current time's gait may be determined by an exploratory technique, as explained in, for example, the second embodiment in PCT international publication WO/02/40224A1.

Returning to the explanation of the flowchart of FIG. 5, after the processing in S13 is carried out as described above, the procedure proceeds to S15 wherein a gait parameter of a current time's gait is provisionally determined. The gait parameter includes a foot trajectory parameter that defines the foot position/posture trajectory in the current time's gait, a ZMP trajectory parameter that defines a desired ZMP trajectory, and an object reaction force trajectory parameter that defines a desired object reaction force moment trajectory. The foot trajectory parameter provisionally determined here corresponds to a first leg motion parameter in the present invention. Hence, the processing in S13 has a function as the first leg motion parameter determining means.

The foot trajectory parameter of the gait parameter of the current time's gait is composed primarily of the positions/postures of the supporting leg foot 22 and the free leg foot 22, respectively, at the start and the end of the current time's gait and a gait cycle of the current time's gait. In this case, the free leg foot position/posture at the start of the current time's gait are the free leg foot position/posture of the current time's gait at the end of the last time's gait (the supporting leg foot position/posture of the last time's gait) observed from the supporting leg coordinate system of the current time's gait. The supporting leg foot position/posture at the start of the current time's gait are the supporting leg foot position/posture of the current time's gait at the end of the last time's gait (the free leg foot position/posture of the last time's gait) observed from the supporting leg coordinate system of the current time's gait. The free leg foot position/posture at the end of the current time's gait are determined on the basis of the predicted landing position/posture of the free leg foot 22 of the current time's gait. Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while it is held in contact with a floor provide the predicted landing position/posture of the current time's gait. The supporting leg foot position/posture at the end of the current time's gait are the position/posture of the supporting leg foot 22 obtained when the supporting leg foot 22 is rotated in the pitch direction until substantially the entire bottom surface thereof is brought in contact with a floor without slippage while the supporting leg foot 22, whose position/posture have been matched with the supporting leg coordinate system of the current time's gait, is held in contact with the floor (the position/posture agree with the predicted landing position/posture of the free leg foot 22 of the last time's gait).

In the present embodiment, the supporting leg foot 22 at the end of the current time's gait has a posture that is substantially parallel to a floor surface; however, there is no need to always stick to this posture. For example, the heel of the supporting leg foot 22 may be off the floor surface at the end of a gait.

The ZMP trajectory parameter of the gait parameter of the current time's gait is set to be the same as the ZMP trajectory parameter provisionally determined in S07. Hence, a desired ZMP trajectory defined by this ZMP trajectory parameter has a pattern as shown in, for example, FIG. 11(*a*) mentioned above.

Further, the object reaction force moment trajectory parameter of the gait parameter of the current time's gait is determined such that the object reaction force moment trajectory defined thereby agrees with the trajectory associated with the current time's gait of the object reaction force moment trajectory calculated in S09 mentioned above.

Subsequently, the procedure proceeds to S17 wherein the ZMP trajectory parameter of the gait parameter provisionally determined in S15 is corrected such that the current time's gait converges to a normal turning gait. To be more specific, the ZMP trajectory parameter is corrected such that the divergent component at the end of the current time's gait substantially agrees with the divergent component at the start of the normal turning gait.

In the present embodiment, the provisional desired ZMP is corrected by adding the ZMP correction amount shown in FIG. 11(*b*) to the provisional desired ZMP so as to cause the divergent component at the end of the current time's gait to agree with the divergent component at the start of the normal turning gait. Thus, the desired ZMP as shown in FIG. 11(*c*) is obtained.

In this case, the basic guideline of the processing for correcting the provisional desired ZMP is the same as that in PCT international publication WO/02/40224A1, but it differs from the one in the application in that an object reaction force moment is taken into account. The following will specifically explain the processing in S17, focusing mainly on the different aspect. Among the variables and symbols used in this processing, regarding the variables having the meanings similar to those explained in relation to the processing for determining the divergent component at the start of a normal gait (S13), the same variables and symbols previously defined in relation to a normal gait will be used in the explanation of the processing in S17. In the following explanation, for the convenience of understanding, a correction of a component of a ZMP in the X-axis direction will be explained.

In the present embodiment, the ZMP correction amount has a trapezoidal shape, as shown in FIG. 11(*b*), the height thereof being denoted by a. The times of the break points of the trapezoid are set to match the times of the break points of the provisional desired ZMP trajectory, as illustrated. In the present embodiment, the ZMP correction amount is generated in a one-leg supporting period of a current time's gait. Further, a result obtained by coordinate-converting the initial divergent component determined in S13 described above into the value observed from the supporting leg coordinate system of the current time's gait is denoted by q". In other words, the divergent component at the start of the normal turning gait observed in the supporting leg coordinate system of the current time's gait is denoted by q". Further, the divergent component at the end of the current time's gait generated due to the provisional desired ZMP trajectory is denoted by Wzmptmp and the divergent component at the end of the current time's gait generated due to the ZMP correction amount pattern when a=1 is denoted by Wtrim.

At this time, if the terminal divergent component generated due to the desired ZMP trajectory that has been corrected is denoted by Wzmptotal, then the following Expression 14 is approximately obtained.

$$Wzmptotal = Wzmptmp + a*Wtrim \qquad \text{Expression 14}$$

Accordingly, the terminal divergent component q" of the current time's gait after the desired ZMP has been corrected is represented by the following Expression 15 similar to the aforesaid Expression 09 explained in relation to the normal gait.

$$q'' = \exp(\omega 0 k\Delta t)*q[0] + Wzmptmp + a*Wtrim + Wfeet + Wobj \qquad \text{Expression 15}$$

In Expression 15, $k\Delta t$ denotes the time of the end of a current time's gait, q[0] denotes the divergent component at the start of the current time's gait, Wfeet denotes the terminal divergent component generated by motions of both legs 2, 2 of the current time's gait, and Wobj denotes a terminal divergent component generated due to the object reaction force moment trajectory of the current time's gait.

From this Expression 15, the following Expression 16 for determining the height a of the trapezoid of the ZMP correction amount is obtained.

$$a = (q'' - \exp(\omega 0 k\Delta t)*q[0] - Wzmptmp - Wfeet - Wobj)/Wtrim \qquad \text{Expression 16}$$

Thus, in the present embodiment, the height a of the trapezoid of the ZMP correction amount is determined according to Expression 16. In this case, the initial divergent component q[0] is calculated according to the aforesaid Expression 06 from the position of the inverted pendulum (or the body position) at the start of the current time's gait and the changing velocity thereof. Further, Wzmptmp is determined in the same manner as that for determining Wzmptotal related to a normal turning gait from the provisional desired ZMP trajectory defined by the ZMP trajectory parameter provisionally determined in S15. Wtrim is determined in the same manner as that for determining Wzmptotal related to a normal turning gait from the ZMP correction amount pattern determined by setting the height a of the trapezoid to 1. Wfeet is determined according to the aforesaid Expression 08b in the same manner as that for determining Wfeet related to a normal turning gait from the foot trajectory parameter provisionally determined in S15. Wobj is determined according to the aforesaid Expression 08c in the same manner as that for determining Wobj related to a normal turning gait from the object reaction force moment trajectory parameter provisionally determined in S15.

In S17, the ZMP correction amount determined on the basis of the height a of the trapezoid determined as described above is added to a provisional desired ZMP trajectory so as to correct the ZMP trajectory parameter.

In the present embodiment, the ZMP correction amount has been analytically determined; alternatively, however, it may be determined in an exploratory manner. In this case, processing is repeated in which a current time's gait is provisionally created using a desired ZMP trajectory obtained by correcting a provisional desired ZMP by a ZMP correction amount in which the value of the trapezoid height a has been set to a proper value, then based on, for example, the difference between the divergent component at the end of the provisionally created current time's gait and the divergent component at the start of a normal gait, the value of the trapezoid height a is corrected such that the difference is reduced. And, lastly, the ZMP correction amount may be determined on the basis of the value of the trapezoid height a obtained when the divergent component at the end of the provisionally created current time's gait and the divergent component at the start of a normal gait substantially agree with each other.

After the processing in S17, the procedure proceeds to S19 wherein it is determined whether the desired ZMP determined on the basis of the corrected ZMP trajectory parameter is appropriate. Specifically, if the desired ZMP after a correction does not deviate from the ground contact surface of the supporting leg foot 22 of the current time's gait or deflected to the vicinity of a boundary of the ground contact surface, that is, if a stability allowance of the robot 1 can be secured, then it is determined that the desired ZMP is appropriate, and if not, then it is determined that the desired ZMP is inappropriate.

If the determination result of S19 is NO, then the procedure proceeds to S21 wherein an element related to a parameter other than the ZMP trajectory parameter of the current time's gait parameter, e.g., a desired object reaction force trajectory related to an object reaction force moment trajectory parameter, is corrected. In this case, the desired object reaction force trajectory is corrected such that a ZMP correction amount is minimized as much as possible (smaller than at least the ZMP correction amount determined before the desired object reaction force trajectory is corrected) when the processing of S09 to S17 is carried out again after the correction.

An example of correcting a desired object reaction force trajectory will be explained below. For instance, it is assumed that a desired object motion trajectory (position trajectory) based on a moving schedule is a trajectory in which the object 120 is decelerated in the X-axis direction from time t1 and stopped at time t3, as shown by a graph g2 of FIG. 16(*a*). A graph g3 of FIG. 16(*a*) is an example of a desired body position trajectory determined on the basis of the desired object motion trajectory. At this time, if deceleration or acceleration of the object 120 from time t1 is relatively large, then the ZMP correction amount related to the current time's gait at certain current time t2 after the time t1 may become excessive in the positive direction of the X axis, thus deviating from the ground contact surface of the supporting leg foot 22 (in this case, a determination result of S19 is NO). And, if a desired gait were continued to be generated as it is, then a desired gait in which the body 3 of the robot 1 bumps against the object 120 at certain time t4 would be undesirably generated, as illustrated in the figure.

Therefore, in such a case, the desired object reaction force trajectory is corrected such that the desired object reaction force is increased in the negative direction of the X axis during a certain period $\Delta T1$ after the current time t2, as shown in FIG. 16(*b*), in relation to the desired object reaction force trajectory provisionally determined in S03, as described above. In other words, the desired object reaction force is corrected such that an acting force to be applied to the object 120 from the robot 1 (a force obtained by reversing the sign of the desired object reaction force) is increased in the positive direction of the X axis. In this case, the magnitude of the period $\Delta T1$ during which the desired object reaction force is increased or an increment ΔF1 thereof is determined such that the ZMP correction amount determined by the processing of the aforesaid S09 to S17 on the basis of a corrected desired object reaction force is minimized as much as possible and a determination result of S19 is YES. Such ΔT1 or ΔF1 can be determined in an analytical manner or an exploratory manner.

By correcting the desired object reaction force trajectory as described above, the object reaction force moment trajectory parameter of the current time's gait parameter is determined in S15 such that a motion of the body 3 that causes the robot 1 to positively push the object 120 is implemented. As a result, the desired gait generated on the basis of the current time's gait parameter will be a gait that prevents the body 3 of the robot 1 from bumping against the object 120 while securing a stability allowance.

After carrying out the processing in S21, the processing of S09 to S17 is executed again as mentioned above. At this time, the determination result in S19 following S17 will be YES, and in this case, the procedure will then proceed to S23 in FIG. 6.

Supplementally, although not shown, if the determination result in S19 is YES, then the desired ZMP trajectory of the current time's gait defined by the ZMP trajectory parameter corrected in S17 is used to re-calculate the desired object reaction force moment trajectory of the current time's gait in the same manner as that of the aforesaid processing in S09, and the object reaction force moment trajectory parameter of the current time's gait is updated accordingly.

In S23, it is determined whether there is a change point of a desired object reaction force in the next time's gait period in a currently set desired object reaction force trajectory (the desired object reaction force trajectory set when the determination result of S19 is YES). Here, the change point of the desired object reaction force in the present embodiment is a point at which the desired object reaction force exhibits a relatively significant change before or after the time of the change point. Further, the change point is extracted as a point at which the magnitude of the first-order differential value (temporal change rate) of the desired object reaction force exceeds a predetermined threshold value or as a point at which the magnitude (absolute value) of the desired object reaction force exceeds a predetermined threshold value. Hereinafter, the time of the change point extracted as described above will be referred to as the object reaction force change time.

And, if the determination result of S23 is NO, then the procedure proceeds to S49, which will be discussed later, or if the determination result is YES, then the procedure proceeds to S25. In S25, a desired gait (the time series of an instantaneous value of a desired gait for each predetermined time interval) of the robot 1 from the current time to the aforesaid object reaction force change time is provisionally generated on the basis of a current time's gait and the currently set gait parameter of a normal turning gait that follows the current time's gait.

To be more specific, on the basis of a foot trajectory parameter in the gait parameter of the current time's gait (hereinafter referred to simply as the current time's gait parameter in some cases), the time series of the instantaneous values of desired foot position/posture of each foot 22 from the current time to the time at which the current time's gait ends is calculated. Subsequently, on the basis of the foot trajectory parameter related to a first turning gait (the first turning gait following the current time's gait) in the gait parameter of a normal turning gait (hereinafter referred to simply as the normal gait parameter in some cases), the instantaneous values of the desired foot position/posture of each foot 22 from the time at which the current time's gait ends to the object reaction force change time are calculated in the time series manner. In the processing for calculating the desired foot position/posture, the desired foot position/posture are calculated for each foot 22 by using a finite-duration setting filter proposed in U.S. Pat. No. 3,233,450 by the present applicant, as with the case explained in relation to the processing for calculating ZMPfeet[i] in the processing of S13 described above.

Further, on the basis of a ZMP trajectory parameter and an object reaction force moment trajectory parameter (the trajectory parameters after the correction of S17) of the current time's gait parameter, the instantaneous values of the desired ZMP and the instantaneous values of the desired object reaction force moment, respectively, are calculated in the time series manner until the ending time of the current time's gait. Subsequently, on the basis of a ZMP trajectory parameter and an object reaction force moment trajectory parameter related to a first turning gait (the first turning gait following the current time's gait) of the normal gait parameter, the instantaneous values of the desired ZMP and the instantaneous values of the desired object reaction force moment, respectively, are calculated in the time series manner from the ending time of the current time's gait to the object reaction force change time.

Then, as described above, while calculating the instantaneous values of the desired foot position/posture, the desired ZMP, and the desired object reaction force moment, these instantaneous values are used to perform the dynamical computation illustrated in the block diagram of FIG. 15 mentioned above such that the instantaneous values of the desired body position/posture up to the object reaction force change time satisfy the desired ZMP. Incidentally, in the present embodiment, the desired body posture is, for example, a normal vertical posture.

Thus, in S25, the instantaneous values of the desired foot position/posture, the desired ZMP, and the desired object reaction force moment in the desired gait from the current time to the object reaction force change time are calculated in the time series manner. Supplementally, it is unnecessary to calculate the time series of the instantaneous values of desired hand position/posture in S25. This is because motions of the arms 5 of the robot 1 exert small influences on a ZMP.

Hereinafter, a gait including object reaction force change time (next time's gait) will be referred to as a virtual current time's gait, the next gait will be referred to as a virtual next time's gait, and the further next gait will be referred to as a virtual next but one time's gait. The virtual current time's gait means the current time's gait obtained when the object reaction force change time is regarded as the current time.

Subsequently, the procedure proceeds to S27 wherein a virtual desired object reaction force trajectory, which is a virtual desired object reaction force trajectory after the object reaction force change time, is determined. This virtual desired object reaction force trajectory is a virtual trajectory that is different from a trajectory after the object reaction force change time in the desired object reaction force trajectory finally determined by the loop processing of S09 to S21 described above, and the virtual desired object reaction force trajectory is determined to be a trajectory in which the desired object reaction force does not change at the object reaction force change time and after the object reaction force change time, and which is continuously maintained at a value obtained immediately before the change time (e.g., time before the object reaction force change time by predetermined interval time) in the present embodiment. In other words, the virtual desired object reaction force trajectory is an object reaction force trajectory that is set, assuming a situation wherein an actual object reaction force does not change according to a desired object reaction force at the object reaction force change time because, for example, the actual position of the object 120 at the object reaction force change time has deviated from a position in a desired object motion trajectory. For example, it is assumed that, as indicated by the graph of a solid line in FIG. 17(*a*), moving velocity of the object 120 (object velocity) according to a moving schedule (current moving schedule) of the object 120 is zero until time t1 in the next time's gait, then it is increased from the time t1 to time 2, and thereafter maintained at a constant velocity from time t2. In this case, schematically, a desired object reaction force trajectory will be determined to be a trajectory in which the desired object reaction force increases to a certain value during a period from time t1 to time t2, as indicated by the graph of a solid line in FIG. 17(*b*). And, at this time, a virtual desired object reaction force trajectory is determined to be a trajectory in which the object reaction force is continuously maintained at the same value as that before time t1 without the object reaction force increasing from time t1, which is the object reaction force change time, as indicated by the graph of a chain double-dashed line in FIG. 17(*b*).

Incidentally, the virtual desired object reaction force trajectory determined as described above corresponds to the second trajectory of acting force between the robot and the object in the present invention. Hence, the processing in S27 has a function as the second acting force trajectory setting means in the present invention.

Subsequently, the procedure proceeds to S29 wherein the predicted landing position/posture and the predicted landing time of the free leg foot 22 after the object reaction force change time are provisionally determined. The predicted landing position/posture and the predicted landing time of the free leg foot 22 provisionally determined here include at least the predicted landing position/posture and the predicted landing time of the free leg foot 22 in a virtual current time's gait and a virtual next time's gait. In this case, for example, the predicted landing position/posture and time of the free leg foot 22 of the virtual current time's gait are provisionally determined to be the same as the predicted landing position/posture and time of the free leg foot 22 of the first turning gait (these are the predicted landing position/posture and time of the free leg foot 22 of the next time's gait determined in S05 in the present embodiment) of the aforesaid normal turning gait (the normal turning gait whose gait parameter has been finally determined by the loop processing of S09 to S21) that follows the current time's gait. The predicted landing position/posture and time of the free leg foot 22 of the virtual next time's gait are provisionally determined to be the same as the predicted landing position/posture and time of the free leg foot 22 of the first second turning gait of the normal turning gait (the normal turning gait whose gait parameter has been finally determined by the loop processing of S09 to S21) that follows the current time's gait. Alternatively, the predicted landing position/posture and time of the free leg foot 22 of the virtual next time's gait may be determined to be the same as the predicted landing position/posture and time of the free leg foot 22 of the next but one time's gait determined in S05 described above or may be determined on the basis of a desired object motion trajectory up to the next but one time's gait.

Subsequently, the procedure proceeds to S31 wherein a ZMP trajectory parameter that defines a desired ZMP trajectory of a virtual current time's gait after the object reaction force change time is provisionally determined. The processing in S31 provisionally determines the ZMP trajectory parameter of the virtual current time's gait after the object reaction force change time such that the desired ZMP is positioned approximately around the center of the ground contact surface (a supporting polygon in a two-leg supporting period) of the supporting leg foot 22 of the virtual current time's gait on the basis of the desired position/posture of the supporting leg foot 22 of the virtual current time's gait provisionally generated in the aforesaid S25 and the predicted landing position/posture and time of the free leg foot 22 of the virtual current time's gait. In this case, as the predicted landing position/posture and time of the free leg foot 22 of the virtual current time's gait, those provisionally determined in S29 are used when carrying out the processing of S31 for the first time after S29, or those corrected in S47 as will be described later are used when carrying out the processing of S31 after S47, which will be described later.

Subsequently, the procedure proceeds to S33 wherein the trajectory of an object reaction force moment (a trajectory until the end time of the virtual current time's gait) about a desired ZMP after the object reaction force change time (the desired ZMP defined by the ZMP trajectory parameter provisionally determined in S31) is calculated, assuming that the object reaction force after the object reaction force change time has traced the aforesaid virtual desired object reaction force trajectory determined in S27. The calculation processing is carried out in the same manner as that of the aforesaid processing in S09 on the basis of a desired object motion trajectory after the object reaction force change time (the aforesaid trajectory after the object reaction force change time of the trajectory provisionally determined in S03) and the aforesaid virtual desired object reaction force trajectory.

Subsequently, the procedure proceeds to S35 wherein the gait parameter of a virtual normal turning gait (virtual normal gait parameter) as a cyclic gait following the aforesaid virtual current time's gait is determined. More specifically, a foot trajectory parameter, a ZMP trajectory parameter, and an object reaction force moment trajectory parameter of the virtual normal turning gait are determined.

In this case, the foot trajectory parameter of the virtual normal gait parameter (including the positions/postures of the supporting leg foot 22 and the free leg foot 22, respectively, at the start and end, respectively, of a first turning gait and a second turning gait in the virtual normal gait) is determined such that the foot position/posture trajectory continues in the order of the virtual current time's gait, and the first turning gait and the second turning gait of the virtual normal turning gait and that the foot position/posture trajectory of the virtual normal turning gait satisfies a periodicity condition, as with the aforesaid processing in S11. In this case, as the predicted landing positions and the predicted landing times of the free leg foot 22 of the virtual current time's gait and the virtual next time's gait, those provisionally determined in S29 described above are used when carrying out the processing of S35 for the first time after S29, or those corrected in S47 as will be described later are used when carrying out the processing of S35 after S47, which will be described later.

Further, the ZMP trajectory parameter of the virtual normal gait parameter is determined such that desired ZMP is positioned at around the center of the ground contact surface (a supporting polygon in a two-leg supporting period) of the supporting leg foot 22 of a virtual normal gait, which is defined by a foot trajectory parameter, on the basis of the foot trajectory parameter of the virtual normal gait parameter, as with the processing in S07.

Further, the object reaction force moment trajectory parameter of the virtual normal gait parameter is determined in the same manner as that of the processing in S11 described above from an object reaction force moment trajectory of a virtual next time's gait determined in the same manner as that of the aforesaid S09 on the basis of a desired object motion trajectory and a virtual desired object reaction force trajectory of a virtual next time's gait and a ZMP trajectory defined by a ZMP trajectory parameter of a virtual next time's gait (the first turning gait of a virtual normal gait), and an object reaction force moment trajectory of a virtual next but one time's gait determined in the same manner as that of the aforesaid S09 on the basis of a desired object motion trajectory and a virtual desired object reaction force trajectory of a virtual next but one time's gait and a ZMP trajectory defined by a ZMP trajectory parameter of a virtual next but one time's gait (the first second turning gait of a virtual normal gait). Supplementally, the virtual desired object reaction force trajectories of the virtual next time's gait and the virtual next but one time's gait are steady trajectories after the object reaction force change time of a virtual current time's gait.

Subsequently, the procedure proceeds to S37 wherein an initial divergent component of a virtual normal turning gait is determined. More specifically, the initial state of the virtual normal turning gait is determined such that the initial state of a first turning gait of the virtual normal turning gait agrees with the terminal state of a second turning gait thereof. This processing is carried out in the same manner as that of the processing of S13 described above.

Subsequently, the procedure proceeds to S39 wherein the gait parameters (a foot trajectory parameter, a ZMP trajectory parameter, and an object reaction force moment trajectory parameter) of the virtual current time's gait are provisionally determined. In this processing, the foot trajectory parameter of the virtual current time's gait is determined in the same manner as that of the processing in S15 described above. Further, the ZMP trajectory parameter of the current time's gait is determined to be identical to that provisionally determined in S31 described above. The ZMP trajectory parameter of the virtual current time's gait determined here takes a provisional value. The object reaction force moment trajectory parameter of the virtual current time's gait is determined such that the desired object reaction force moment trajectory of the virtual current time's gait defined thereby agrees with the desired object reaction force moment trajectory calculated in S25 until the object reaction force change time and agrees with the object reaction force moment trajectory determined in S33 from the object reaction force change time to the end time of the virtual current time's gait.

Supplementally, the foot trajectory parameter provisionally determined in S39 corresponds to a second leg motion parameter in the present invention.

Subsequently, the procedure proceeds to S41 wherein the ZMP trajectory parameter of the virtual current time's gait provisionally determined in S39 is corrected such that the virtual current time's gait converges to the virtual normal turning gait (such that the terminal divergent component of the virtual current time's gait nearly agrees with the initial divergent component of the virtual normal turning gait). This processing is carried out in the same manner as that in the aforesaid S17.

Subsequently, the procedure proceeds to S43 wherein it is determined whether or not the desired ZMP of the virtual current time's gait defined by the ZMP trajectory parameter corrected in S41 is appropriate. This determination is made in the same manner as that in the case of S19 described above. More specifically, it is determined in S43 whether or not a dynamical restrictive condition (hereinafter referred to as the ZMP restrictive condition) is satisfied, in which the desired ZMP of the virtual current time's gait should lie at a position within the ground contact surface (in a supporting polygon during a two-leg supporting period) of the supporting leg foot 22 of the virtual current time's gait, the position being not excessively close to the boundary thereof.

Then, the procedure proceeds to S49, which will be discussed hereinafter, if the determination result in S43 is YES, or the procedure proceeds to S45 if it is NO. In S45, it is determined whether the desired ZMP of the virtual current time's gait can be appropriately corrected. More specifically, it is determined whether or not the determination result of S43 can be turned to YES (whether or not the desired ZMP of the virtual current time's gait can satisfy the aforesaid ZMP restrictive condition) when the processing from S31 is carried out again after correcting the predicted landing position/posture and the predicted landing time of the free leg foot 22 in the virtual current time's gait by the processing of S47, which will be discussed later. In this case, if, for example, the desired ZMP of the virtual current time's gait deviates from the ground contact surface of the supporting leg foot 22 of the virtual current time's gait and the amount of the deviation (e.g., the distance from the boundary of the ground contact surface) exceeds a predetermined amount, then the determination result in S45 will be NO. Or, if the number of corrections of the predicted landing position/posture and the predicted landing time of the free leg foot 22 in the virtual current time's gait by the processing in S47, which will be discussed hereinafter, exceeds a predetermined number, then the determination result in S45 will be NO.

Supplementally, the determination processing in S45 corresponds to the processing by a determining means in the present invention.

If the determination result in S45 is YES, then the procedure proceeds to S47 wherein the predicted landing position and time of the free leg foot 22 (the free leg foot 22 in the virtual current time's gait and the virtual next time's gait) after the object reaction force change time are corrected. In this case, the predicted landing position and time of the free leg foot 22 of the virtual current time's gait are corrected such that the desired ZMP defined by the ZMP trajectory parameter of the virtual current time's gait that is corrected in S41 is brought closer into the ground contact surface of the supporting leg foot 22 of the virtual current time's gait. For the correction in S47, only the predicted landing positions may be corrected without correcting the predicted landing time of the free leg foot 22 of the virtual current time's gait and the virtual next time's gait. Further, the predicted landing position of the free leg foot 22 of the virtual current time's gait may be also corrected.

After the correction in S47, the processing from S31 is carried out again. Then, if the determination result in S43 turns to be YES, the procedure proceeds to S49, which will be discussed later.

Meanwhile, in a case where the determination result in S45 is NO, that is, in a case where a correction of the desired ZMP of the virtual current time's gait cannot be made to satisfy the ZMP restrictive condition, if a situation takes place wherein an actual object reaction force does not follow a desired object reaction force trajectory finally determined by the processing of the aforesaid S01 to S21 and does not change according to the desired object reaction force trajectory at the aforesaid object reaction force change time, then it will be difficult to maintain a stable posture (entire posture) of the robot 1 after the object reaction force change time.

In such a case, therefore, the procedure returns to the aforesaid S01 to re-determine the moving schedule for the object 120 (correct the moving schedule). The moving schedule for the object 120 to be re-determined is determined such that a stable posture of the robot 1 can be maintained even if the situation takes place wherein an actual object reaction force does not change according to a desired object reaction force trajectory. In this case, the moving schedule is re-determined so as to minimize a sudden change in the desired object reaction force.

The following will explain a specific example of a case where the predicted landing position of the free leg foot 22 of the virtual current time's gait is corrected in the aforesaid S47 and a specific example of a case where the moving schedule is re-determined in S01 with reference to FIG. 17 and FIG. 18. FIG. 18 shows, by a solid-line graph, the desired object position trajectory (the position trajectory in the X-axis direction) according to the moving schedule (current moving schedule) indicated by the solid-line graph in FIG. 17(*a*). The supporting leg foot 22 and the free leg foot 22 at the end time of each of the current time's gait, the next time's gait (virtual current time's gait), and the next but one time's gait are illustrated at the locations associated with the ending time of each gait in FIG. 18. In this case, the supporting leg foot 22 and the free leg foot 22 are shown by blank rectangles and hatched rectangles, respectively. The supporting leg feet with reference numerals 22L1, 22R2, and 22L3 indicate the supporting leg feet at the ending time of the current time's gait, the next time's gait, and the next but one time's gait, and the free leg feet with reference numerals 22R1, 22L2, and 22R3 are free leg feet at the ending time of the current time's gait, the next time's gait, and the next but one time's gait. The positions of the free leg feet related to these gaits are example positions determined on the basis of the desired object position trajectory of the solid-line graph in FIG. 18. More specifically, the position of the free leg foot 22R1 related to the current time's gait is the predicted landing position of the free leg foot 22 of the current time's gait determined in S05, the position of the free leg foot 22L2 related to the next time's gait is the predicted landing position of the free leg foot 22 of the virtual current time's gait determined in S29, and the position of the free leg foot 22R3 related to the next but one time's gait is the predicted landing position of the free leg foot 22 of the virtual next time's gait determined in S29. Further, the black dot in the supporting leg foot 22L1 related to the current time's gait illustrates the position of the desired ZMP at the ending time of the current time's gait, which is defined by the ZMP trajectory parameter of the current time's gait finally determined by the processing of S01 to S21, the black dot in the supporting leg foot 22R2 related to the next time's gait illustrates the position of the desired ZMP at the end time of the virtual current time's gait, which is defined by the ZMP trajectory parameter provisionally determined first in S31, and the black dot in the supporting leg foot 22L3 related to the next but one time's gait illustrates the position of the desired ZMP at the ending time of the virtual next but one time's gait (the first turning gait of a virtual normal turning gait), which is defined by the ZMP trajectory parameter of the virtual normal turning gait determined first in S35.

When the ZMP trajectory parameter of the virtual current time's gait is corrected by the processing in the aforesaid S41, the desired ZMP defined by the corrected ZMP trajectory parameter (the desired ZMP at the ending time of the virtual current time's gait) may deviate from the ground contact surface of the supporting leg foot 22R2 of the virtual current time's gait and become the point indicated by the blank dot in FIG. 18. This is because the desired gait of the virtual current time's gait is provisionally generated in S25, assuming that an object reaction force changes as per a desired object reaction force until the object reaction force change time of the virtual current time's gait, while an object reaction force moment trajectory of a gait parameter of a virtual normal turning gait is determined, assuming that the object reaction force will not change at the object reaction force change time and follow a virtual desired object reaction force trajectory. In other words, the desired object reaction force is expected to rapidly increase at the object reaction force change time until the object reaction force change time of the virtual current time's gait, so that a desired gait (especially a desired body position trajectory) is generated in S25 such that the body 3 of the robot 1 accelerates forward. However, the object reaction force is expected to be continuously maintained to be the same as that immediately before the object reaction force change time according to the virtual desired object reaction force trajectory after the object reaction force change time, so that it is necessary to decelerate the body 3 of the robot 1 in order to converge the virtual current time's gait to the virtual normal turning gait. As a result, when the ZMP trajectory parameter of the virtual current time's gait is corrected by the processing in S41, the desired ZMP defined by the corrected ZMP trajectory parameter (the desired ZMP at the end time of the virtual current time's gait) may deviate to the front (the forward direction of the X-axis) of the robot 1 from the ground contact surface of the supporting leg foot 22R2 of the virtual current time's gait.

In such a case, the processing in the aforesaid S47 corrects the predicted landing position of the free leg foot 22 of the virtual current time's gait from the position indicated by the reference numeral 22L2 in FIG. 18 toward the front of the robot 1, as indicated by, for example, the dashed-line rectangle with a reference numeral 22L2' in the figure. When this is carried out and the processing of S31 to S41 is carried out again to correct the ZMP trajectory parameter of the virtual current time's gait, the desired ZMP defined by the corrected ZMP trajectory parameter may allow the aforesaid ZMP restrictive condition to be satisfied, thus causing the determination result in S43 to be YES.

More specifically, in this case, even if an actual object reaction force does not change as per a desired object reaction force at the object reaction force change time in the future, the stability of a posture of the robot 1 can be secured by correcting the predicted landing position of the free leg foot 22 in a gait that includes the object reaction force change time.

Meanwhile, if the ZMP trajectory parameter of the virtual current time's gait is corrected by the processing in the aforesaid S41, then the desired ZMP (the desired ZMP at the end time of the virtual current time's gait) defined by the corrected ZMP trajectory parameter may considerably deviate from the ground contact surface of the supporting leg foot 22R2 of the virtual current time's gait, as indicated by the blank triangle in FIG. 18. In such a case, it may be impossible to determine a ZMP trajectory parameter that allows the desired ZMP to satisfy the ZMP restrictive condition regardless of whatever correction of the predicted landing position of the free leg foot 22 of the virtual current time's gait or the virtual current time's gait and the virtual next time's gait may be made within a mechanically movable range of the free leg foot 22, and the determination result in S45 at this time will be NO.

In such a case, the original moving schedule for the object 120 is inappropriate for continually securing the stability of the robot 1, so that the moving schedule for the object 120 is re-determined (corrected) in S01. In this case, in the aforesaid example explained in relation to FIG. 18, the moving schedule is corrected as indicated by the dashed-line graph in FIG. 17(*a*). More specifically, the moving schedule is re-determined such that the moving velocity of the object 120 according to the moving schedule after the correction slowly increases from time t1 (the object reaction force change time), as compared with the original moving schedule indicated by the solid-line graph in FIG. 17(a), and that the moving velocity is maintained constant at a velocity that is lower than that in the original moving schedule at time t2 and after.

Thus, the object reaction force based on the corrected moving schedule is restrained to be a reaction force that is smaller than the object reaction force based on the original moving schedule during the period from time t1 to time t2, as shown by the dashed-line graph in FIG. 17(b). Hence, a sudden change in the desired object reaction force at the object reaction force change time t1 will be eased. As a result, carrying out the processing up to S43 again makes it possible to turn the determination result in S43 to YES.

In other words, even if an actual object reaction force does not change as per a desired object reaction force, the processing from S01 to S47 described above makes it possible to determine a current time's gait parameter that allows the stability of the robot 1 to be secured.

If the determination result in the aforesaid S23 is NO or if the determination result in S43 is YES, then the procedure proceeds to S49 in FIG. 7.

In this S49, based on the current time's gait parameter and the normal gait parameter as of now, the desired body position/posture trajectory from the current time to the end of the second turning gait of the normal gait (up to the third step, including the first step of the current time's gait) is calculated, and a desired hand position/posture trajectory is calculated on the basis of a desired object motion trajectory. In other words, in S49, a desired gait in the period of three steps including the current time's gait is provisionally generated.

In this case, the desired body position/posture trajectory is calculated, as explained with reference to the block diagram in the aforesaid FIG. 15, on the basis of the gait parameter of each gait in the order of the current time's gait, the first turning gait of the normal turning gait, and the second turning gait thereof. More specifically, the desired both feet position/posture trajectories are calculated on the basis of the foot trajectory parameters of the gaits, and the desired ZMP trajectory and the object reaction force moment trajectory are calculated on the basis of the ZMP trajectory parameter and the object reaction force moment trajectory parameter. The processing for calculating the desired both feet position/posture trajectories is carried out as with the case explained in relation to the processing for calculating ZMPfeet[i] in the processing of the aforesaid S13, the calculation being performed for each foot 22 by using the finite-duration setting filter proposed in U.S. Pat. No. 3,233,450 by the present applicant. Then, these desired both feet position/posture trajectories, desired ZMP trajectory, and object reaction force moment trajectory are used in the calculation processing in the block diagram of FIG. 15 to determine the desired body position/posture. In the present embodiment, the desired body posture is steadily a vertical posture. Thus, by calculating the desired body position/posture, the desired body position/posture trajectory of a desired motion of the robot 1 is calculated such that the dynamical balance condition, in which the horizontal component of a moment generated about a desired ZMP due to the resultant force of an inertial force produced by a motion of the robot 1, a desired object reaction force acting on the robot 1, and gravity becomes zero, is satisfied on a robot simplified model.

Further, the desired hand position/posture trajectory is calculated on the basis of a desired object motion trajectory as in the case where it has been determined in S09 in the order of the current time's gait, the first turning gait of a normal turning gait, and the second turning gait thereof. The desired object motion trajectory corresponding to the first turning gait and the second turning gait of the normal turning gait is the desired object motion trajectory corresponding to the next time's gait and the next but one time's gait in the desired object motion trajectory provisionally determined in S03.

Subsequently, the procedure proceeds to S51 wherein the geometric restrictive condition of the robot 1 and the object 120 is checked. Here, the geometric restrictive condition is a condition whether, for example, there is interference between the object 120 and the robot 1 (e.g., whether the body 3 comes in contact with the object 120) and whether the rotational angle of a joint of each arm 3 falls within a mechanistic limit. It can be determined whether there is the interference between the body 3 of the robot 1 and the object 120 from the desired body position/posture and the desired object motion trajectory. In addition, the rotational angle of a joint of each arm 3 can be determined from the desired body position/posture and the desired hand position/posture, so that it can be determined whether the rotational angle lies within the mechanistic limit.

The determination processing in S51 is sequentially performed on instantaneous values of a desired body posture or the like at a predetermined time interval from the current time to the end of the second turning gait. More specifically, on each instantaneous value, if the determination result in S51 is OK, then it is determined in S53 whether the check at every time from the current time to the end of the second turning gait has been completed. And, if the determination result in this S53 is NO, then the determination processing in S51 is repeated.

If the determination result in S51 is NG, then the procedure proceeds to S55 wherein at least one of the predicted landing position/posture and the desired object motion trajectory is corrected so as to satisfy the geometric restrictive condition at the time when the NG happens. An example of the correction will be explained with reference to FIG. 19.

Referring to the figure, it is assumed that the desired object motion trajectory (position trajectory) in the X-axis direction based on the moving schedule at current time t1 is the trajectory indicated by a graph g4 in the figure (hereinafter referred to as the original trajectory) and that a desired body position and a desired object position come excessively close to each other at certain time t2 in the future with consequent interference between the body 3 and the object 120, leading to a determination result of NG in S51. At this time, the desired object position at time t2 at which the interference takes place is shifted in the forward direction of the x-axis, that is, away from the robot 1, as indicated by the dashed-line arrow in the figure, and the desired object motion trajectory (position trajectory) in a period $\Delta T2$ extending before and after time t2 is changed to the corrected trajectory indicated by a graph g5. The corrected trajectory g5 is determined such that it smoothly continues to the original trajectory g4 at both ends of the period $\Delta T2$ in order to avoid a sudden change in a behavior of the robot 1. A shift amount $\Delta X$ at time t2 is determined such that the shift amount $\Delta X$ eliminates the interference between the body 3 of the robot 1 and the object 120 (such that the determination result in S51 turns to OK).

In the aforesaid example, the case where the desired object motion trajectory is corrected has been explained as an example; alternatively, however, the predicted landing position/posture of the free leg foot 22 in a gait including the time at which the determination result in S51 becomes NG may be corrected instead of correcting the desired object motion trajectory. For instance, if the interference occurs at time t2 as in the case shown in FIG. 19, then the predicted landing position/posture in the gait that includes the time t2 may be corrected to position/posture away from the object 120 in the X-axis direction. Alternatively, both the desired object motion trajectory and the predicted landing position/posture may be corrected. Alternatively, the moving schedule may be corrected.

When the correction processing in S55 is finished, the procedure returns to S05 and carries out the processing from this S05, as described above. Thus, if the aforesaid geometric restrictive condition is not satisfied, then the desired object motion trajectory or the predicted landing position/posture are corrected and eventually the foot trajectory parameter out of the current time's gait parameter is corrected. If the predicted landing position of the free leg foot 22 is corrected without correcting the desired object motion trajectory in S55, then the processing from S07 may be implemented, omitting the processing in SOS. Supplementally, the processing of S49 to S55 is not always essential and may be omitted in the present invention.

Meanwhile, if the determination result in S53 is YES, then the procedure proceeds to S57 in FIG. 8. In this S57, based on the current time's gait parameter, the current time's gait instantaneous values at the current time, excluding hand position/posture instantaneous values, are calculated such that the desired ZMP is satisfied.

This calculation processing is carried out as follows. Based on a foot trajectory parameter of the current time's gait parameter, the instantaneous values of the desired foot position/posture are calculated. In this calculation processing, the instantaneous values are calculated for each foot 22 by using the finite-duration setting filter proposed by the present applicant in U.S. Pat. No. 3,233,450 as with the case explained in relation to the processing for calculating ZMPfeet[i] in the processing of the aforesaid S13. As with the case explained in relation to the normal gait, if the predicted landing position/posture of the free leg foot 22 of the current time's gait are the same as the landing position/posture of the supporting leg foot 22 of the last time's gait, then the instantaneous values of the desired foot position/posture of the current time's gait are maintained at the initial state of the current time's gait. Alternatively, however, the instantaneous values of the foot position/posture trajectory of the free leg foot 22 of the current time's gait may be generated such that the free leg foot 22 of the current time's gait is raised once and then returned to original landing position/posture.

An instantaneous value of the desired ZMP is calculated on the basis of a ZMP trajectory parameter of the current time's gait parameter, and an instantaneous value of a desired object reaction force moment is calculated on the basis of an object reaction force moment trajectory parameter.

Further, the instantaneous values of the desired body position/posture are calculated by the aforesaid dynamical calculation in FIG. 15 from the instantaneous values of the desired foot position/posture, the instantaneous value of the desired ZMP, and the instantaneous value of the desired object reaction force moment, which have been calculated. In the present embodiment, the desired body posture is, for example, a vertical posture. However, the desired body posture need not be maintained to the vertical posture, and may be varied. When the desired body posture is varied, the robot simplified model is desirably a dynamic model that takes into account a change in the angular momentum of the robot 1 caused by a change in the posture of the body 3. For example, a dynamic model shown in FIG. 10 in PCT international publication WO/03/057422A1 proposed by the present applicant may be used.

By the processing in S57 described above, the instantaneous values of the desired foot position/posture and the desired body position/posture of the motion of the desired gait of the robot 1 are determined. In the robot 1 according to the present embodiment, each leg 2 has six degrees of freedom, so that once the desired body position/posture and the desired foot position/posture are determined, the rotational angles of the joints of each leg 2 will be uniquely determined. Supplementally, in the present embodiment, the desired body position/posture determined in S57 are further corrected by the processing of S65, which will be discussed hereinafter.

Subsequently, the procedure proceeds to S59 wherein an actual object position, which is the actual position (moved position) of the object 120 in a previous calculation processing cycle (the calculation processing cycle of the gait generating device 100), is estimated on the basis of the previous value of a last corrected desired hand position (the value in the previous calculation processing cycle). Here, the last corrected desired hand position is determined by the arm main controller 106, which will be discussed hereinafter, and it corresponds to the command value of an actual hand position of the robot 1. Hence, for example, the previous value of the last corrected desired hand position is used as the previous value of the actual hand position of the robot 1, and a position that has a predetermined relative positional relationship therewith is estimated as the actual object position. It is also possible to estimate the actual object position from a detection value of a gyro sensor or an acceleration sensor mounted on the object 120.

Subsequently, the procedure proceeds to S61 wherein an instantaneous value (current time value) of a desired object motion, an instantaneous value (current time value) of an estimated disturbance force, and an instantaneous value (current time value) of a desired object reaction force are calculated, using the object dynamic model, on the basis of the actual object position estimated as described above, a difference from a desired object position (hereinafter referred to as "the object position error"), and a current desired object motion trajectory. The desired object position out of the actual object position and the desired object position that define the object position error uses the value determined in the previous calculation processing cycle (previous value).

Referring now to the block diagram of FIG. 20, the object dynamic model used in the processing of the aforesaid S61 and the processing in S61 will be explained. FIG. 20 is a block diagram showing the calculation processing for determining a desired object position, a desired object reaction force, and an estimated disturbance force of the desired object motion in S61, the portion with reference numeral 238 in the figure providing the object dynamic model showing a relationship between forces acting on the object 120 and motions of the object 120. The object dynamic model partly differs in structure from the one shown in the aforesaid FIG. 10, so that the object dynamic model in FIG. 20 will be referred to as object dynamic model 2 to distinguish it from the object dynamic model shown in FIG. 10.

The basic structure of this object dynamic model 2 is the same as that of the object dynamic model shown in FIG. 10. The object dynamic model 2 receives, as an input, a force (more specifically, a translational force in the horizontal direction) acting on the object 120 and multiplies the input value (the value determined by a multiplier 242, which will be discussed later) by a reciprocal 1/M of a mass M of the object 120 by a multiplier 244 to determine a motional acceleration of the object 120, then the obtained result is sequentially integrated (double-integrated) by integrators 246 and 250. However, the object dynamic model 2 differs from the object dynamic model shown in FIG. 10 in that a model velocity manipulated variable is additionally input to the integrator 250 in addition to an output of the integrator 246 (an integrated value of the motional acceleration). The model velocity manipulated variable is a velocity manipulated variable determined by a model velocity manipulated variable determiner 252 according to the feed-back control law such that the difference between an actual object position and a desired object position is brought close to zero, and it is determined according to the following expression 17 in the present embodiment.

Model velocity manipulated variable=$Ke1$* Difference in object position+$\int(Ke2$* Difference in object position)$dt$    Expression 17

In other words, the model velocity manipulated variable is determined from the difference in object position according to the PI control law (proportional integration control law). Incidentally, Ke1 and Ke2 in expression 17 denote predetermined gains. The model velocity manipulated variable determiner 252 in FIG. 20 is an arithmetic processor that carries out the calculation of the right side of expression 17. More specifically, the model velocity manipulated variable determiner 252 determines the difference in object position, which is the difference between an actual object position (the current time value determined in S33 in the present calculation processing cycle) and a desired object position (the previous value determined in S35 in the previous calculation processing cycle), by a subtractor 254. Then, a result (proportional) obtained by multiplying the determined difference in object position by the gain Ke1 by a multiplier 256 and a result (integral term) obtained by integrating, by an integrator 260, a result obtained by multiplying the difference in object position by the gain Ke2 by a multiplier 258 are added by an adder 262 so as to calculate the model velocity manipulated variable. The calculated model velocity manipulated variable is added to an output of the integrator 246 by an adder 248 provided at the input side of the integrator 250 of the object dynamic model 2 and then supplied to the integrator 250. Supplementally, in the block diagram of FIG. 20, the model velocity manipulated variable is calculated and the calculated model velocity manipulated variable is additionally input to the object dynamic model 2; alternatively, however, the integrator 260 of the model velocity manipulated variable determiner 252 may be omitted, and an output of the aforesaid multiplier 258 may be additionally input to the integrator 246, while the sum of an output of the integrator 246 and an output of the multiplier 256 at this time may be input to the integrator 250 at the same time. This causes the object dynamic model 2 to provide the same output (output of the integrator 250) as that in FIG. 20.

In such object dynamic model 2, a result obtained by integrating outputs of the adder 248 by the integrator 250 is obtained as an instantaneous value of a desired object position. Further, an output of the adder 248 provides an object model velocity, which is a moving velocity of the object 120 on the object dynamic model 2.

A required value of an acting force (translational force) on the object 120, which is an input to the object dynamic model 2, is determined by multiplying the difference (desired object velocity−object model velocity), which is obtained by a subtractor 240 from a desired object velocity based on a present desired object motion trajectory (a desired object motion trajectory obtained when the determination result in S53 is YES) and an object model velocity, by a predetermined gain Kv by a multiplier 242. More specifically, the required value of a translational force to be input to the object dynamic model 2 is determined according to the feed-back control law (the proportional control law in this example) such that the difference between the object desired velocity and the object model velocity converges to zero, as with the case shown in FIG. 10. However, the object model velocity in this case is an output of the adder 248, as described above, so that it differs from the one in FIG. 10 in that a model velocity manipulated variable is taken into account. The desired object velocity is obtained as a first-order differential value of a position trajectory of the present desired object motion trajectory.

And, the value obtained by reversing the sign of the required value of the translational force determined as described above is determined as the instantaneous value of a desired object reaction force. Further, the required value of the translational force is input to the multiplier 244 of the object dynamic model 2 and the aforesaid model velocity manipulated variable is input to the adder 248. Thus, the instantaneous value of the desired object position is output from the integrator 250 of the object dynamic model 2. In other words, a desired object position is sequentially determined by dynamical calculation of the object dynamic model 2 while correcting the object model velocity as a motional state amount of the object 120 on the object dynamic model 2 by using the model velocity manipulated variable for bringing a difference between a desired object position and an actual object position close to zero.

A portion with reference numeral 264 in FIG. 20 is an estimated disturbance force determiner for carrying out the processing for determining an estimated disturbance force. An object model velocity and a required value of the translational force are supplied to the estimated disturbance force determiner 264. The object model velocity is input to a converter 266 represented by a transfer function in the form of M·s/(Tc·s+1), and the converter 266 calculates an estimated value of the translational force acting on the object 120. M in the transfer function of the converter 266 denotes the mass of the object 120, and Tc denotes a predetermined time constant. Thus, the converter 266 determines, as the estimated value of the translational force acting on the object 120, the result obtained by carrying out filtering that has the time constant Tc on a result obtained by multiplying the differential value (first-order differential value) of the object model velocity by the mass of the object 120 (this corresponds to the instantaneous value of the resultant force of all forces acting on the object 120). In other words, the estimated value calculated by the converter 266 follows a translational force that generates a motional acceleration of the object 120 on the object dynamic model 2 (a differential value of an object model velocity) with a first-order delay of the time constant Tc. Further, an instantaneous value of an estimated disturbance force is calculated by subtracting a required value of a translational force, which is an output of the multiplier 242, from the estimated value of the translational force by a subtractor 268. The instantaneous value of the estimated disturbance force determined here is used in the calculation processing in S02 (refer to FIG. 10), as described above.

An instantaneous value of a desired object posture of a desired object motion is determined such that, for example, it substantially agrees with the direction of a desired object velocity.

The above has described the calculation processing in S61. An estimated disturbance force determined by the calculation processing in the S61 is obtained by real-time estimation of an actual disturbance force that is applied from other than the robot 1 among forces acting on the actual object 120, so that using this estimated disturbance force in the calculation processing in the aforesaid S02 (inputting the estimated disturbance force to the object dynamic model in FIG. 10) makes it possible to bring a behavior (motional state) of the object 120 on the object dynamic model in the aforesaid FIG. 10 close to a behavior (motional state) of the actual object 120.

Subsequently, the procedure proceeds to S63 wherein the instantaneous values (current time values) of desired hand position/posture are determined on the basis of the instantaneous value of the desired object motion determined in S61. The instantaneous values of the desired hand position/posture are determined as with the case where the desired hand position/posture trajectory has been determined in S09.

Of the instantaneous values of the desired gait determined by the processing up to S63 described above, the desired body position/posture are determined using the aforesaid robot simplified model such that a desired ZMP is satisfied on the robot simplified model (such that the horizontal component of a moment generated about a desired ZMP due to the resultant force of an inertial force produced by a motion of the robot 1, the gravity, and an object reaction force moment becomes zero). Therefore, a desired gait determined by the processing up to S63 is a gait in which a floor reaction force moment horizontal component about a desired ZMP becomes zero on the robot simplified model.

Here, the robot simplified model does not necessarily exhibit high dynamical accuracy although it is highly advantageous in the aspect that a calculation load on the gait generating device 100 can be effectively reduced. Hence, in the present embodiment, a robot dynamic model having higher dynamical accuracy (hereinafter referred to as the full model) is further used to correct some constituent elements (specifically, desired body position/posture instantaneous values and the instantaneous value of a floor reaction force moment about a desired ZMP) of a desired gait. This correction processing is referred to as full-model correction, and this full-model correction is executed in S65 following the processing in S63.

The full-model correction is made in exactly the same manner as that explained in, for example, Japanese Patent Laid-Open Publication No. 2002-326173 previously proposed by the present applicant. Therefore, the explanation will be omitted in the present description. Alternatively, the full-model correction may be made in the same manner as that explained in, for example, PCT international publication WO 03/057427 A1 by the present applicant.

The full-model correction in S65 corrects the desired body position/posture and the floor reaction force moment about the desired ZMP. Thus, the instantaneous values of all constituent elements of a desired gait finally output from the gait generating device 100 are obtained.

The processing of S01 to S65 explained above is the processing carried out for each calculation processing cycle of the gait generating device 100.

The processing for correcting a moving schedule in S01 (this being different from the processing for correction in a case where the determination result in the aforesaid S45 is NO), the explanation of which has been delayed, will now be explained.

When the robot 1 is traveling while pushing the object 120, if a step (a projection of a floor) unexpected in a current moving schedule (e.g., a moving schedule based on the aforesaid moving requirements) is encountered or an unexpected external force is applied to the object 120 from something other than the robot 1, then the difference between a desired object motion trajectory based on a moving schedule and an actual object motion trajectory (hereinafter referred to as the actual object motion trajectory) will increase. Meanwhile, the gait generating device 100 determines a gait parameter and the like on the basis of the desired object motion trajectory and generates a gait, so that an excessive difference between the desired object motion trajectory and an actual object motion trajectory makes it difficult to generate a gait that allows continued stability of the robot 1 to be secured. Therefore, in S01 in the present embodiment, if the difference increases to a certain level (or if it is predicted to increase), then the moving schedule determined in S01 is corrected in real time.

The following will explain a specific example of the processing with reference to FIGS. 21(a) and (b). For example, it is assumed that the current (before-correction) moving schedule is a schedule for moving the object 120 at a constant velocity in the forward direction of the X-axis. At this time, the desired object position trajectory of the desired object motion trajectory (the time series of instantaneous values) calculated in S61 as described above on the basis of the moving schedule before the correction (hereinafter referred to as "the before-correction moving schedule") will be the trajectory as indicated by a graph g6 in FIG. 21(a). Here, it is assumed that at time t1, the actual object 120 is caught by a step (a projection) of a floor that is not predicted in the before-correction moving schedule, causing the object 120 to stop. At this time, the trajectory of the actual object position (the time series of the actual object position estimated in S59) will be the trajectory as indicated by a graph g7 in FIG. 21(a). In this case, after time t1, the difference between the desired object position based on the before-correction moving schedule and the actual object position will increase as time elapses.

In S01, therefore, the object position effort (the difference between an actual object position and a desired object position) determined in S61 of, for example, the previous calculation processing cycle, that is, the magnitude (absolute value) of the object position error determined by a subtractor 254 in FIG. 20, is compared with a predetermined value. And, if the magnitude of the object position error has become larger than the predetermined value (time t2 in FIG. 21(a)), then the before-correction moving schedule is corrected so as to restrain an increase in the object position error, as indicated by a graph g8 in FIG. 21(a). The moving schedule that has been corrected will be hereinafter referred to as "the corrected moving schedule." In the example shown in FIG. 21(a), the corrected moving schedule will be a moving schedule in which, after time t2, the moving velocity of the object 120 gradually decelerates substantially to zero. The corrected moving schedule is desirably determined such that a desired object motion defined thereby smoothly continues without developing a sudden change with respect to a before-correction moving schedule.

Correcting the moving schedule as described above makes it possible to generate a gait that allows continued stability of the robot 1 to be secured without causing an excessive increase in a desired object reaction force.

Furthermore, in the processing of S01 in the present embodiment, after the moving schedule is corrected as described above, when the actual object position follows better the desired object position trajectory based on the aforesaid corrected moving schedule and the difference between the desired object motion trajectory and the actual object motion trajectory reduces to a certain degree, the moving schedule is corrected to bring the corrected moving schedule close to the before-correction moving schedule. This moving schedule that has been corrected will be hereinafter referred to as a re-corrected moving schedule.

An explanation will be given by taking, as an example, the case where the corrected moving schedule has been determined as shown in FIG. 21(a). When the object 120 rides over the step (time t3 in FIG. 21(b)), the actual object position trajectory will approach the desired object position trajectory g8 based on the corrected moving schedule, as indicated by the graph g7 in FIG. 21(b).

At this time, in S01, when the object position error reduces to be less than the predetermined value (time t4 in FIG. 21(b)), the corrected moving schedule is re-corrected such that the moving velocity of the object 120 approaches the moving velocity of the object 120 based on the initial before-correction moving schedule, as indicated by a graph g9 in FIG. 21(b), thus determining a re-corrected moving schedule. In the example of FIG. 21(b), the re-corrected moving schedule will be a moving schedule in which, after time t4, the moving velocity of the object 120 is gradually increased until the moving velocity substantially agrees with a moving velocity based on the initial before-correction moving schedule. The re-corrected moving schedule is desirably determined such that a desired object motion defined thereby smoothly continues without developing a sudden change with respect to the corrected moving schedule.

In the example described above, the moving velocity of the object 120 based on the re-corrected moving schedule has been brought close to the moving velocity based on the before-correction moving schedule; alternatively, however, it is also possible to bring a desired object position trajectory based on the re-corrected moving schedule close to an object position trajectory based on the before-correction moving schedule.

Supplementally, the processing for correcting the moving schedule in S01 as described above corresponds to the processing for correcting the moving schedule in the eighth invention of the present invention.

The above has provided the details of the processing by the gait generating device 100 in the present embodiment.

The processing carried out by devices other than the gait generating device 100 of the control unit 60 will now be explained. As previously mentioned, the processing will be only schematically explained, because it is the same as that proposed in the first embodiment in Japanese Patent Laid-Open Publication H10-230485 (the aforesaid patent document 1).

In the desired gait generated by the gait generating device 100, a desired body position/posture trajectory, a desired ZMP trajectory, and a desired object reaction force trajectory are input to the object reaction force balance controller 102. The object reaction force balance controller 102 calculates a compensating total floor reaction force for object reaction force balance control to correct a desired floor reaction force moment about a desired ZMP so as to eliminate (bring close to zero) the difference between a desired object reaction force and an actual object reaction force, which is the reaction force that the actual robot 1 receives from the object 120, and determines corrected desired body position/posture obtained by correcting the desired body position/posture in a desired motion. The processing by the object reaction force balance controller 102 will be described hereinafter.

Further, a desired foot position/posture trajectory, a desired ZMP trajectory, and a desired total floor reaction force trajectory of the desired gait are input to the leg main controller 104. In addition, the leg main controller 104 receives corrected desired body position/posture and a compensating total floor reaction force for object reaction force balance control from the object reaction force balance controller 102. The leg main controller 104 controls the joint actuators (electric motors) of the legs 2 and 2 such that compliance control processing causes motions (excluding motions of the arms 5 and 5) and a floor reaction force of the desired gait to be followed. More specifically, the leg main controller 104 calculates a restoring total floor reaction force to be generated at the desired ZMP in order to restore a detection value (actual body posture) of the posture sensor 54 to the corrected desired body posture, and corrects the desired foot position/posture such that an actual total floor reaction force moment component (this is determined from detection values of the six-axis force sensors 50 of the legs 2, 2) acting on the desired ZMP agrees with the moment component of the resultant force of the above restoring total floor reaction force, the desired total floor reaction force, and the compensating total floor reaction force for object reaction force balance control. The corrected desired foot position/posture are referred to as the corrected desired foot position/posture. Then, the leg main controller 104 controls the joint actuators of the two legs 2 and 2 (outputs motor drive commands of the legs 2 to the joint actuators) such that actual joint displacements follow the desired joint displacements of the two legs 2 and 2 determined from the above corrected desired foot position/posture and the corrected desired body position/posture.

Further, a desired hand position/posture trajectory and a desired object reaction force trajectory of the desired gait are input to the arm main controller 106. Further, the arm main controller 106 receives the corrected desired body position/posture from the object reaction force balance controller 102. The arm main controller 106 controls the joint actuators (electric motors) of the arms 5 and 5 by compliance control processing to cause the desired hand position/posture trajectory and the desired object reaction force trajectory to be followed. More specifically, the desired hand position/posture are corrected on the basis of the difference between a detection value (actual object reaction force) of the six-axis force sensor 52 and the desired object reaction force. The corrected desired hand position/posture are referred to as the final corrected desired hand position/posture. Then, the arm main controller 106 controls the joint actuators of the two arms 5 and 5 (outputs motor drive commands of the arms 5 to the joint actuators) such that actual joint displacements follow the desired joint displacements of the two arms 5 and 5 determined from the above final corrected desired hand position/posture and the corrected desired body position/posture.

The processing by the object reaction force balance controller 102 will be more specifically explained below. FIG. 22 is a block diagram functionally showing the processing by the object reaction force balance controller 102.

In the object reaction force balance controller 102, first, the object reaction force moment error, which is the difference between the desired object reaction force moment about the desired ZMP caused by the desired object reaction force and an actual object reaction force moment about the desired ZMP caused by an actual object reaction force, is calculated by a moment error calculator 270. In this case, the desired object reaction force moment is calculated from the desired object reaction force and the desired ZMP output from the gait generating device 100 and the final corrected desired hand position/posture (more specifically, the values in the previous control processing cycle) determined in the arm main controller 106. The actual object reaction force moment is calculated from a detection value (actual object reaction force) of the six-axis force sensor 52, the desired ZMP, and the final corrected desired hand position/posture (more specifically, the values in the previous control processing cycle).

Based on the object reaction force moment error, a center-of-gravity position perturbation amount calculator 272 calculates a desired center-of-gravity perturbation amount, which is the desired perturbation amount of the total center-of-gravity position of the robot 1. The desired center-of-gravity position perturbation amount has a meaning as the perturbation amount of the total center-of-gravity of the robot 1 to eliminate on a long-term basis the object reaction force moment error by the gravity acting on the robot 1, and it is determined to be, for example, a value that is proportional to the object reaction force moment. Subsequently, a subtractor 274 calculates the difference between a total center-of-gravity position model perturbation amount, which is the perturbation amount of the total center-of-gravity of the robot 1 on a perturbation dynamic model calculated using the perturbation dynamic model, which will be discussed hereinafter, and the aforesaid desired center-of-gravity position perturbation amount. From this difference, a compensating total floor reaction force moment for object reaction force balance control, which is the moment manipulated variable about the desired ZMP, to converge the difference to zero is calculated by a feed-back control law 276, e.g., PD control law. Furthermore, the sum of the compensating total floor reaction force moment for object reaction force balance control and the aforesaid object reaction force moment error is calculated by an adder 278. Then, an output of the adder 278 is supplied to a perturbation dynamic model 280, which represents a relationship between the perturbation of the total center-of-gravity of the robot 1 and the perturbation of the moment about the desired ZMP and a relationship between the perturbation of the total center-of-gravity and the perturbation of body position/posture, and the perturbation amounts of the body position/posture are calculated in the perturbation dynamic model.

In this case, the perturbation dynamic model is a model that describes the relationship (dynamical relationship) between the perturbation of the total center-of-gravity of the robot 1 and the perturbation of the moment about the desired ZMP by the following expression 18.

$$m\text{total} * hG * d2\Delta xG/dt2 = \Delta xG * m\text{total} * g + \Delta Mx \quad \text{Expression 18}$$

where hG denotes the height from the desired ZMP to the total center-of-gravity, $\Delta xG$ denotes the amount of perturbation in the horizontal direction of the total center-of-gravity, and $\Delta Mx$ denotes the horizontal component of the moment about the desired ZMP. Other variables are the same as those defined in relation to the aforesaid robot simplified model. Expression 18 is an expression on a sagittal plane; a relational expression on a lateral plane may be obtained by reversing the sign of the second term of the right side of expression 18.

This expression 18 is an expression indicating a dynamical behavior of an inverted pendulum which has a mass point of the total mass mtotal of the robot 1 and in which the horizontal component of the moment generated about the desired ZMP, which is the supporting point of the mass point, becomes $\Delta Mx$.

Further, the relationship between the perturbation amount $\Delta xG$ of the total center-of-gravity position of the robot 1 and the perturbation amount of a body position (hereinafter denoted by $\Delta xb$) is represented by the following expression 19.

$$\Delta xb = k * \Delta xG \quad \text{Expression 19}$$

where k denotes a certain proportional constant. Hence, $\Delta xb$ is considered to be proportional to $\Delta xG$. For a perturbational motion, expression 19 may be considered to approximately hold.

Accordingly, in the perturbation dynamic model 280, the total center-of-gravity perturbation amount $\Delta xG$ is calculated by using an output of the adder 278 as $\Delta Mx$ of the right side of expression 18, and further, the body position perturbation amount is determined according to expression 19 from the aforesaid $\Delta xG$. In the present embodiment, the corrected desired body posture of the corrected desired body position/posture is supposed to agree with the desired body posture and the perturbation amount of the body posture is supposed to be zero.

The object reaction force balance controller 102 calculates the corrected desired body position/posture by adding the body position perturbation amount output from the perturbation dynamic model 280 to the desired body position/posture (output of the gait generating device 100) by an adder 282.

The above has described the specific calculation processing by the object reaction force balance controller 102.

By the operations in the first embodiment explained above, especially the processing by the gait generating device 100, a current time's gait is generated such that the current time's gait converges to a normal gait, taking an object reaction force into account. Thus, an operation, such as pushing the object 120, by the robot 1 can be smoothly performed while securing continued stability of the robot 1.

Especially in the processing of S23 to S27, when there is a change point of a desired object reaction force within the period of a next time's gait, a case is assumed where an object reaction force does not change as per a desired object reaction force trajectory at object reaction force change time, and it is checked whether a next time's gait (virtual current time's gait) that converges to a normal turning gait while satisfying a ZMP restrictive condition in such a case can be generated or not. And, if it is not possible to generate such a next time's gait, then a moving schedule is corrected and a current time's gait parameter is re-determined. Then, the operation of the robot 1 is controlled according to an instantaneous value of a desired gait calculated on the basis of the current time's gait parameter. Therefore, even if an object reaction force does not change according to a desired object reaction force trajectory, a desired gait can be generated such that continued stability of the robot 1 can be secured.

Second Embodiment

A second embodiment of the present invention will now be explained with reference to FIG. 23 to FIG. 25. In the explanation of the second embodiment, like constituent parts or like functional parts as those of the first embodiment will be assigned like reference numerals as those in the first embodiment and the explanations thereof will be omitted.

FIG. 23 is a flowchart illustrating a part of the processing by a gait generating device 100 in the second embodiment, the part being the processing of a portion corresponding to the processing in FIG. 5 related to the first embodiment. As shown in FIG. 23, the second embodiment differs from the first embodiment only in the processing carried out when a determination result in S19 is NO.

More specifically, in the first embodiment, if the determination result in S19 is NO, then a desired object reaction force trajectory has been corrected; instead, in the second embodiment, the predicted landing position/posture or the predicted landing time of the free leg foot 22 is corrected in S21'. This means that the foot trajectory parameter of the current time's gait parameter is corrected. In this case, the predicted landing position/posture or the predicted landing time is corrected such that a ZMP correction amount is minimized when the processing of S07 to S17 is carried out again after the correction (at least smaller than the ZMP correction amount determined before the predicted landing position/posture or the predicted landing time is corrected). Then, after the correction, the processing from S07 is carried out again. Except for this, the second embodiment is the same as the first embodiment.

An example of a specific correction in S21' will be explained below. It is assumed that, for example, the predicted landing position/posture of the free leg foot 22 of a current time's gait and the predicted landing position/posture of the free leg foot 22 of a next time's gait have been determined as indicated by the solid lines in FIG. 24 at this moment. In the illustrated example, it is assumed that a robot 1 has walked straight at a substantially fixed length of stride in the X-axis direction of a current time's gait supporting leg coordinate system.

It is further assumed that the robot 1 approaches to an object 120 until the current time's gait, and in the middle of the next time's gait, the robot 1 starts the operation of pushing the object 120 in the forward direction of the X-axis. In this case, as shown in FIG. 25($a$), a desired object reaction force trajectory will be, for example, a stepped trajectory that rises in the middle of the next time's gait.

At this time, when the processing up to S17 is carried out while maintaining the predicted landing position/posture as indicated by the solid line in FIG. 24, the ZMP correction amount (the component in the X-axis direction) determined by the processing in S17 will be relatively large, as indicated by the solid line in FIG. 25($b$), and a determination result in S19 may become NO.

In this case, the processing in S21' makes a correction such that, for example, the predicted landing position/posture of the free leg foot 22 of the next time's gait approaches the supporting leg foot 22L of the current time's gait in the X-axis direction, as indicated by the dashed line in FIG. 24. In other words, the predicted landing position/posture of the free leg foot 22L are corrected such that the length of stride of the next time's gait is further reduced. When the processing from S05 is carried out again after correcting the predicted landing position/posture of the next time's gait as described above, the ZMP correction amount determined in S17 will be reduced, as indicated by the dashed line in FIG. 25($b$). As a result, the determination result in S19 becomes YES. Supplementally, when the predicted landing position/posture of the free leg foot 22L of the next time's gait are corrected as shown in FIG. 24, the position of the free leg foot at the end of a second turning gait of a normal gait will also approach the position of the free leg foot at the start of the second turning gait (the predicted landing position of a free leg foot 22R of the current time's gait) by the technique for determining a foot trajectory parameter of a normal gait described above.

In the aforesaid example, the predicted landing position/posture of the free leg foot 22L of the next time's gait have been corrected; if, however, there is an allowance to correct the predicted landing position/posture of the free leg foot 22R of the current time's gait, then they may be corrected instead. Alternatively, the predicted landing positions/postures of both the current time's gait and the next time's gait may be corrected.

Further, in the aforesaid example, the predicted landing positions/postures have been corrected; alternatively, however, the predicted landing time of the free leg foot 22 of at least one of the current time's gait and the next time's gait may be corrected. In the situation shown in FIG. 25, for example, the predicted landing time of the next time's gait may be delayed.

The above has explained the second embodiment of the present invention. The second embodiment also provides the same operations and advantages as those of the first embodiment. In the second embodiment, the predicted landing position/posture or the predicted landing time of the free leg foot 22 has been corrected if the determination result in S19 is NO; alternatively, the desired object reaction force trajectory in addition thereto may be corrected, as with the first embodiment.

In the first and the second embodiments explained above, the case where the object 120 is pushed and moved by the robot 1 has been taken as an example and explained; however, the present invention can be applied also to, for example, a case where the object 120 is moved by pulling it or a case where the object 120 is moved by lifting it.

Further, in the embodiments described above, when determining a current time's gait parameter, a gait parameter for a normal gait, which is a cyclic gait, has been determined and then a current time's gait parameter has been determined such that the current time's gait is converged to the normal gait (such that the divergent component at the end of the current time's gait agrees with the divergent component at the start of the normal gait); this, however, is not essential to the present invention. Basically, according to the present invention, an operation of a robot may be controlled by a technique that is different from the techniques explained in the aforesaid embodiments as long as the operation of the robot can be controlled so as to allow a desired action force between a robot and an object that is finally determined (a desired object reaction force in the aforesaid embodiments) and a desired moving position of the object (a desired object motion trajectory in the aforesaid embodiments) to be satisfied.

INDUSTRIAL APPLICABILITY

As described above, when causing a robot, such as a bipedal mobile robot, to perform an operation for moving an object, the present invention is usefully applied to enable the robot to smoothly perform the operation while securing the stability of the robot.

BRIEF DESCRIPTION OF THE DRAWINGS

FIG. 13(a) is a diagram showing an example of an object floor reaction force moment trajectory of a current time's gait, and FIG. 13(b) is a diagram showing an example of an object reaction force moment trajectory of a normal gait determined in S11 of FIG. 5.

FIG. 23 is a flowchart showing the processing by an essential section of a gait generating device in a second embodiment of the present invention.

FIG. 24 is a diagram for explaining the processing in S21' of FIG. 23.

FIGS. 25(a) and (b) are diagrams for explaining the processing in S21' of FIG. 23.

Figure 1:
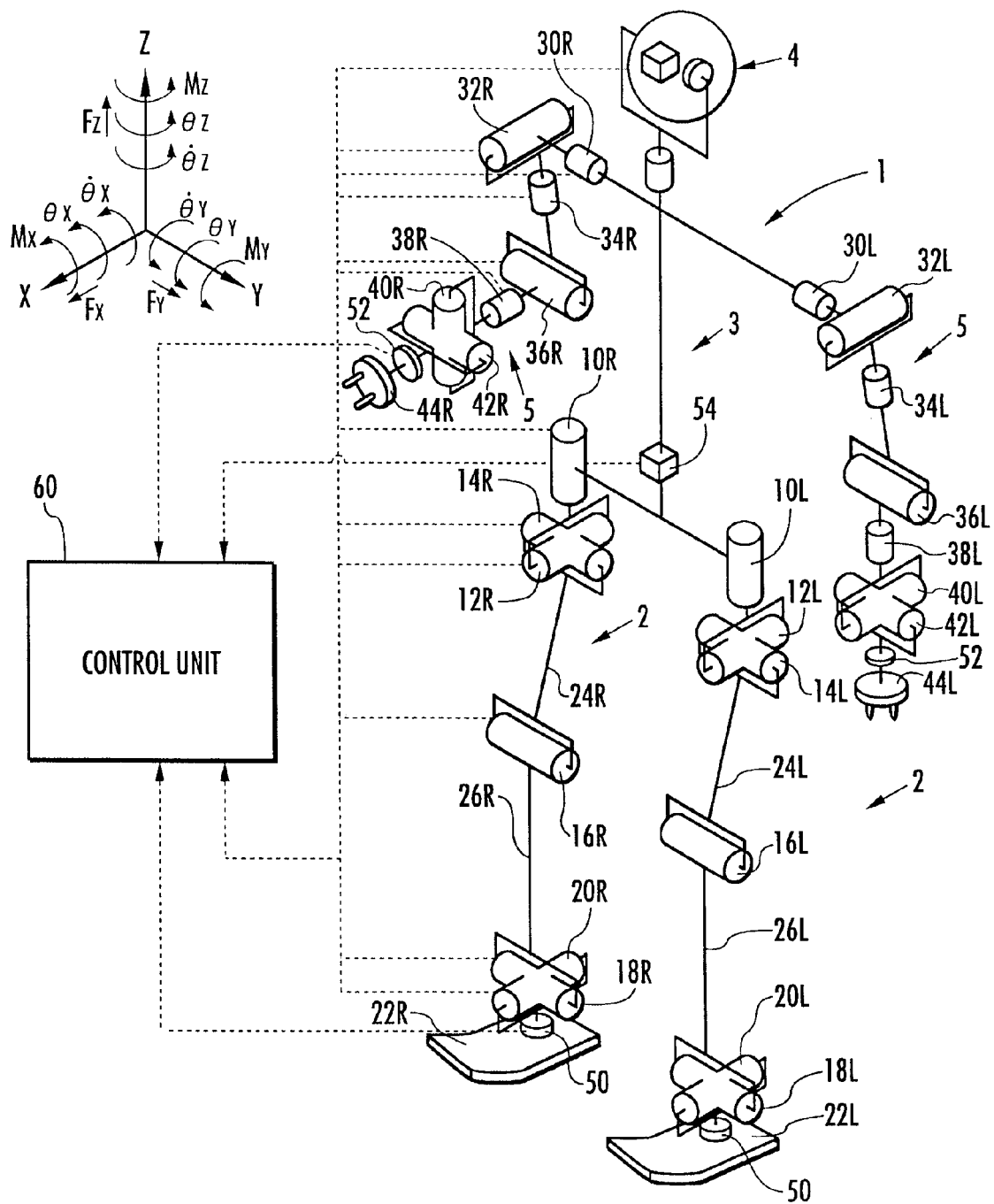
FIG. 1 is a diagram showing a schematic construction of a bipedal mobile robot as a legged mobile robot in embodiments of the present invention.
Figure 2:
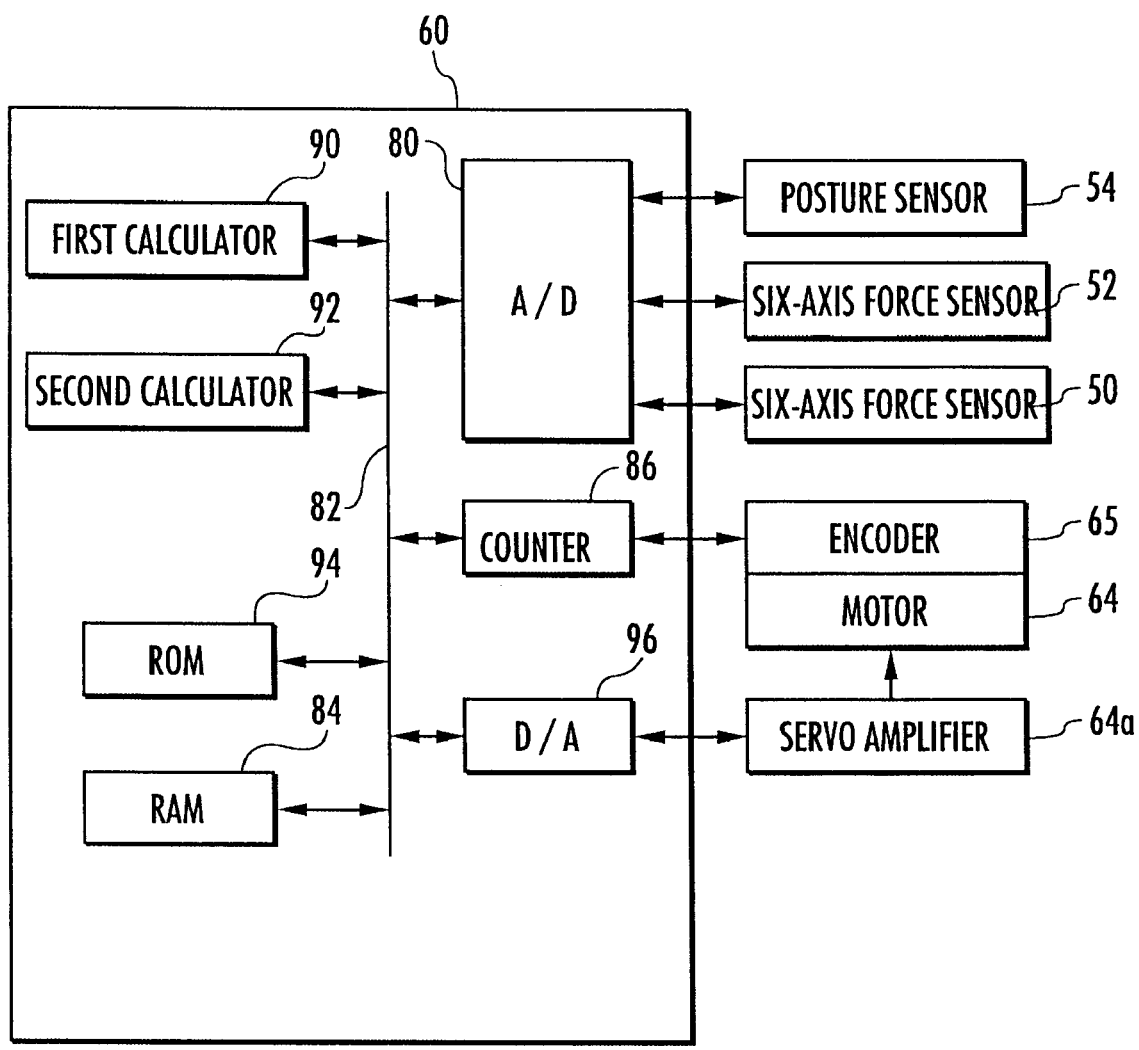
FIG. 2 is a block diagram showing a construction of a control unit provided in the robot shown in FIG. 1.
Figure 3:
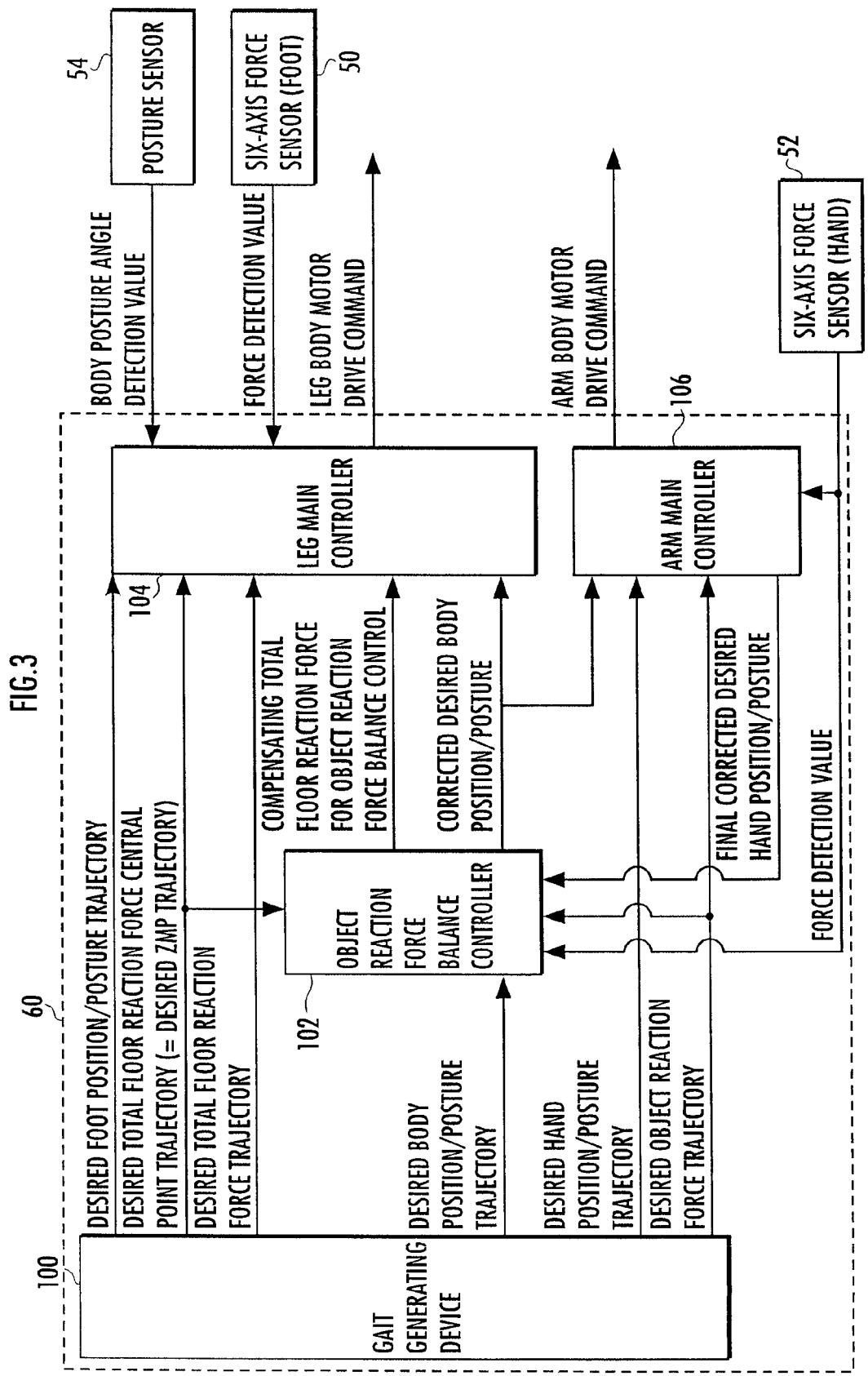
FIG. 3 is a block diagram showing a functional construction of an essential section of the control unit shown in FIG. 2.
Figure 4:
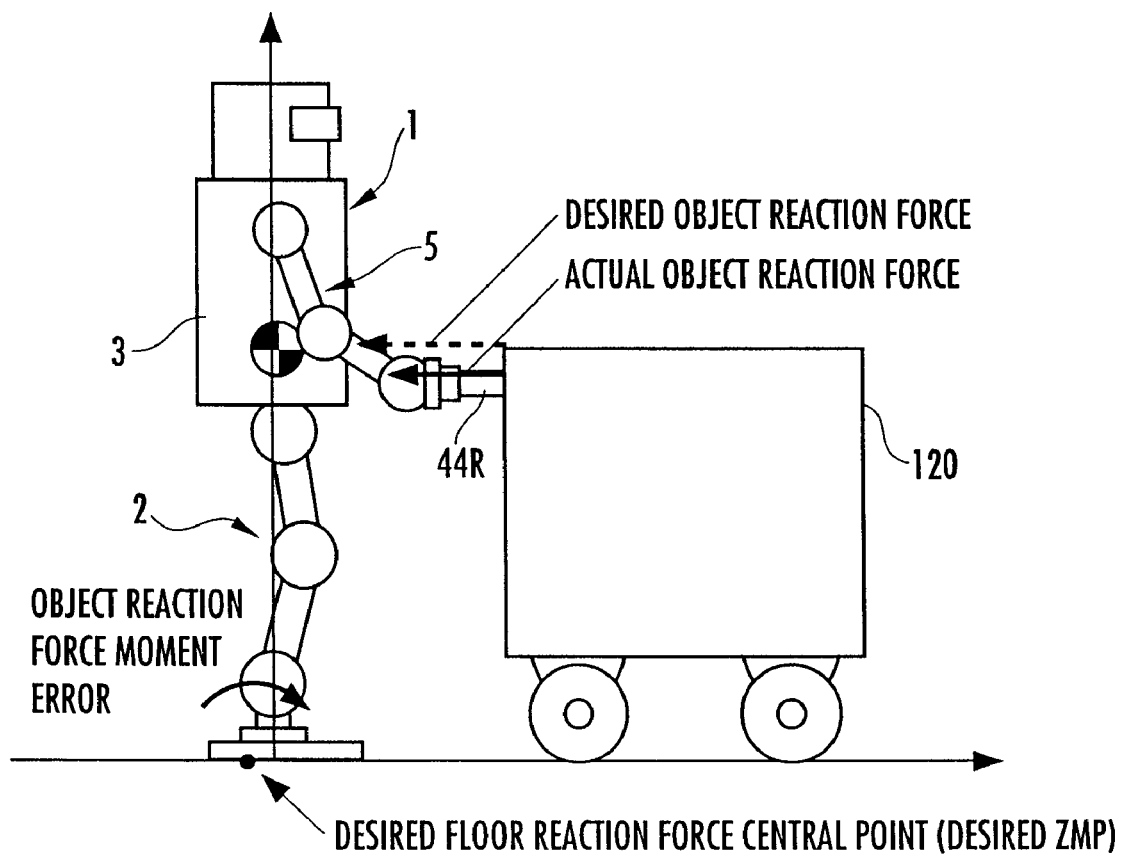
FIG. 4 is a diagram showing a relationship between the robot and an object in the embodiments.
Figure 5:
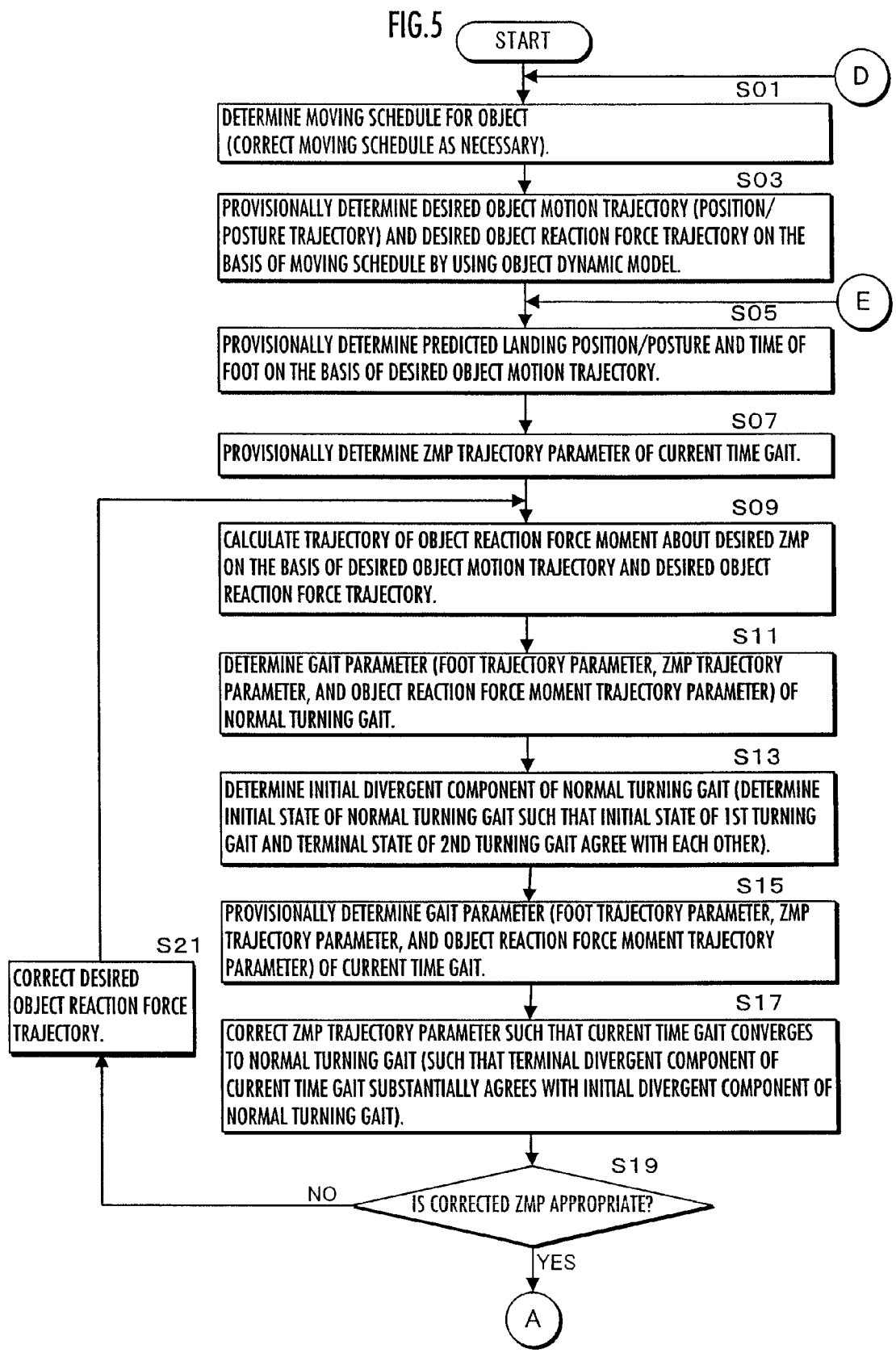
FIG. 5 is a flowchart showing the calculation processing of a gait generating device in a first embodiment.
Figure 6:
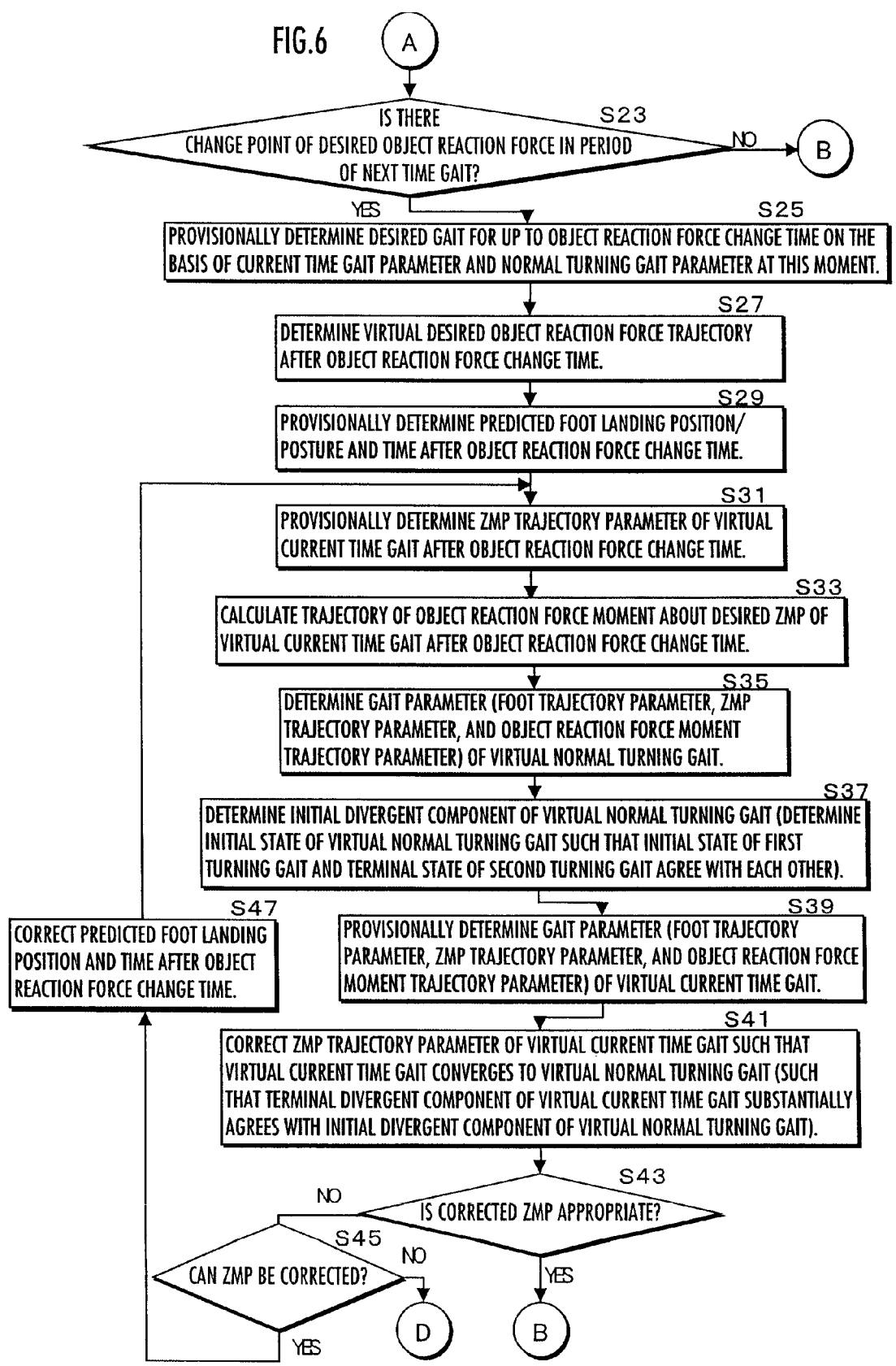
FIG. 6 is a flowchart showing the calculation processing of the gait generating device in the first embodiment.
Figure 7:
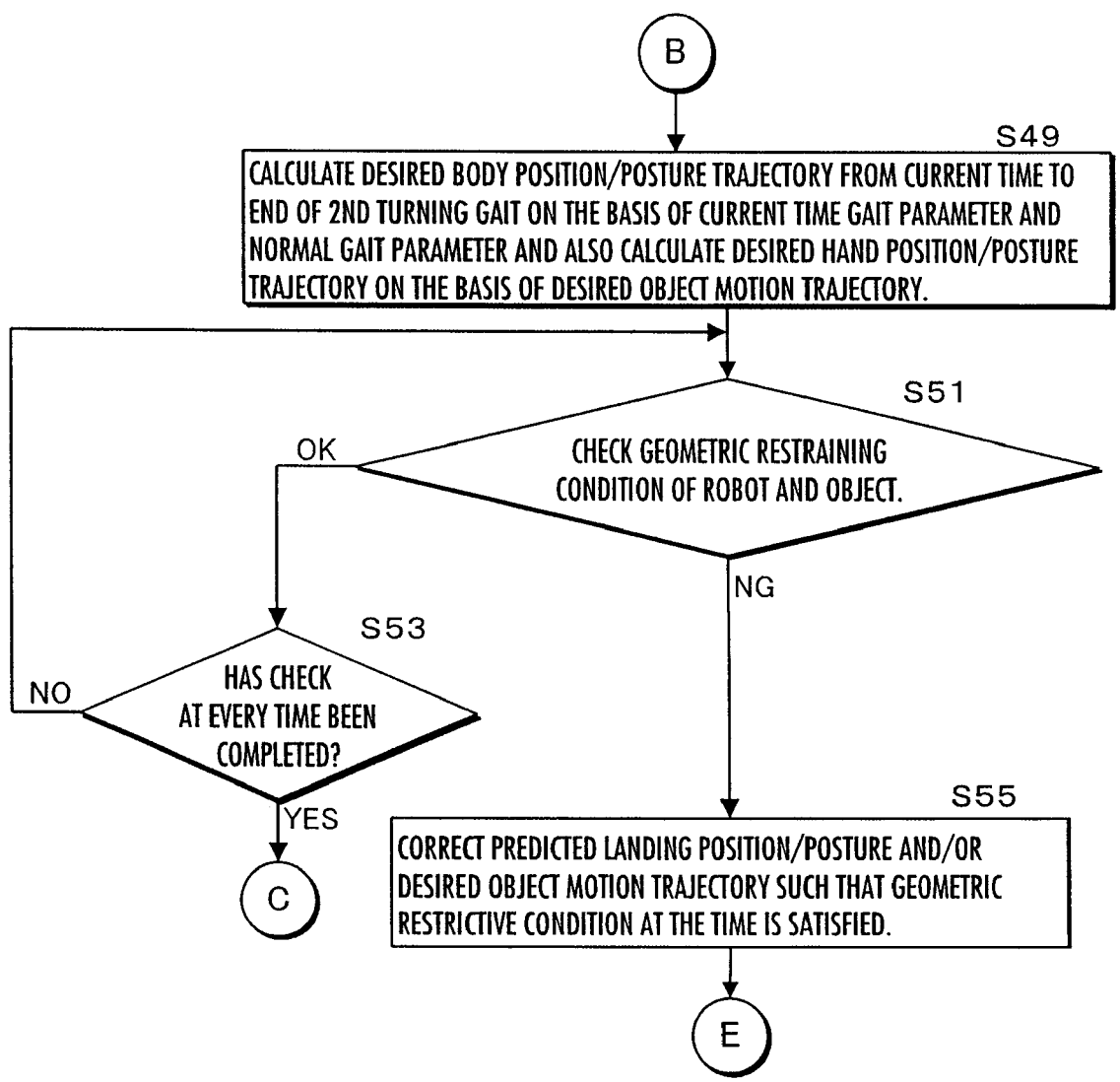
FIG. 7 is a flowchart showing the calculation processing of the gait generating device in the first embodiment.
Figure 8:
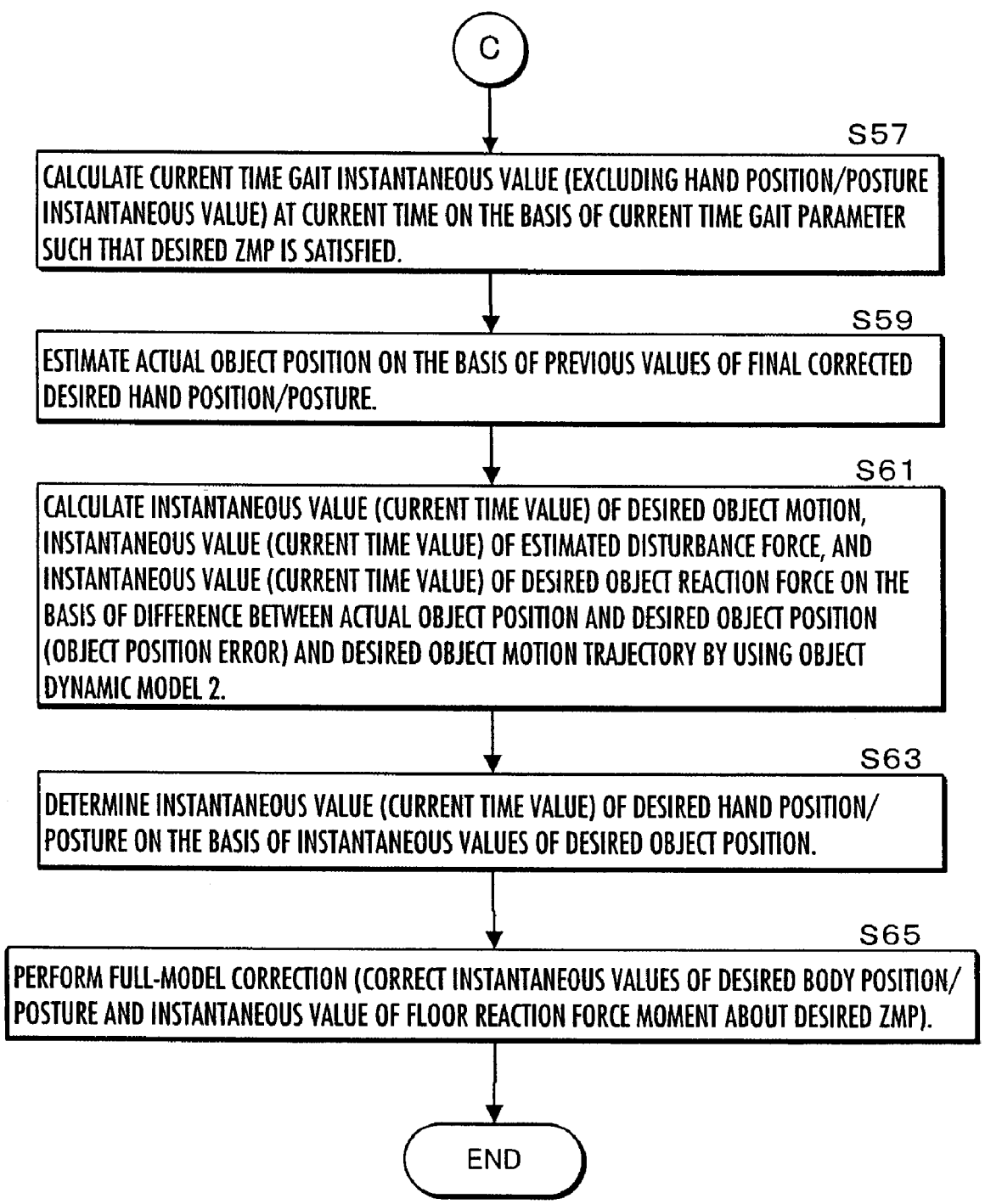
FIG. 8 is a flowchart showing the calculation processing of the gait generating device in the first embodiment.
Figure 9:
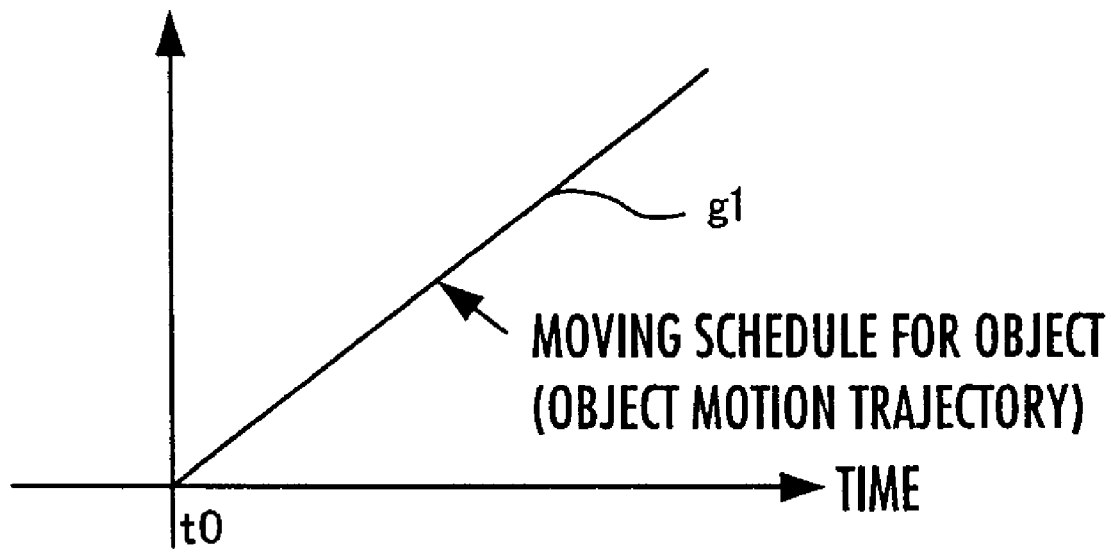
FIG. 9 is a diagram showing an example of a moving schedule determined in S02 of FIG. 5.
Figure 10:
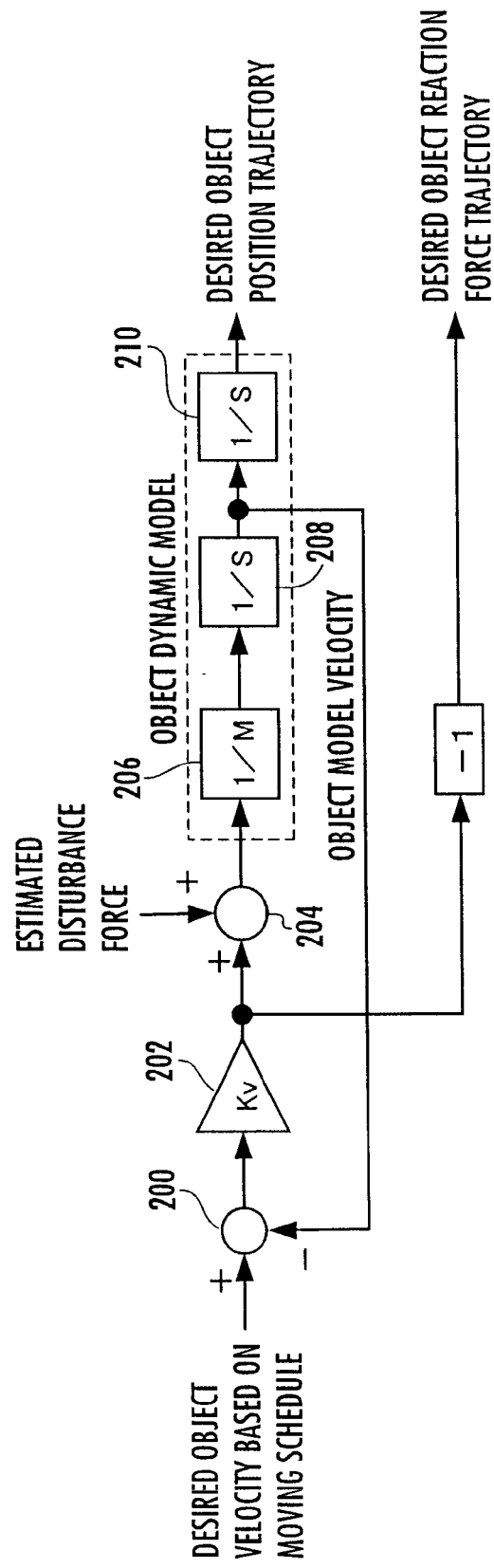
FIG. 10 is a block diagram showing the processing in S02 of FIG. 5.
Figure 11:
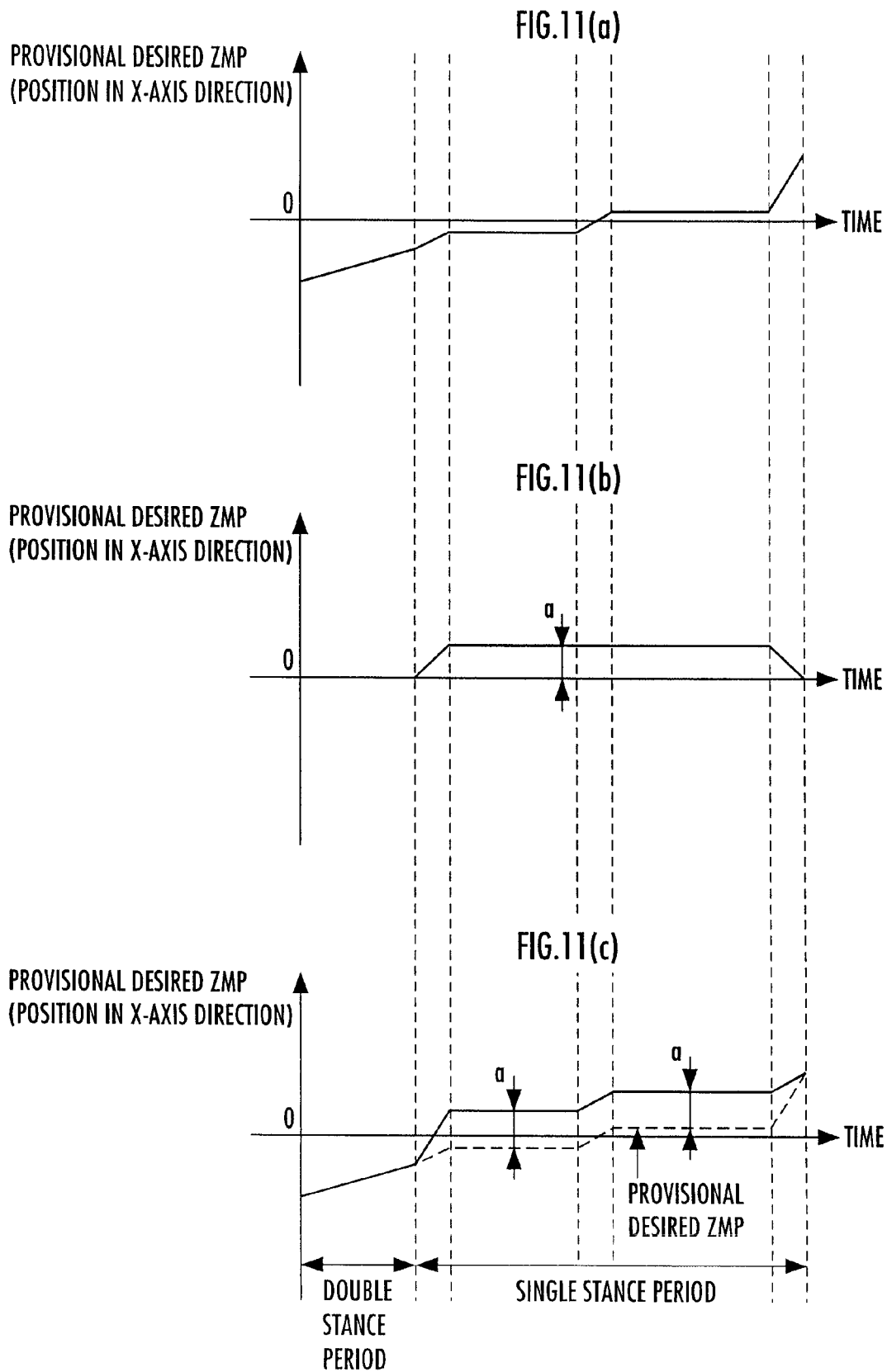
FIG. 11($a$) is a diagram showing an example of a provisional desired ZMP trajectory related to S07 of FIG. 5, FIG. 11($b$) is a diagram showing an example of a ZMP correction amount determined in S17 of FIG. 5, and FIG. 11($c$) is a diagram showing an example of a desired ZMP trajectory corrected in S17.
Figure 12:
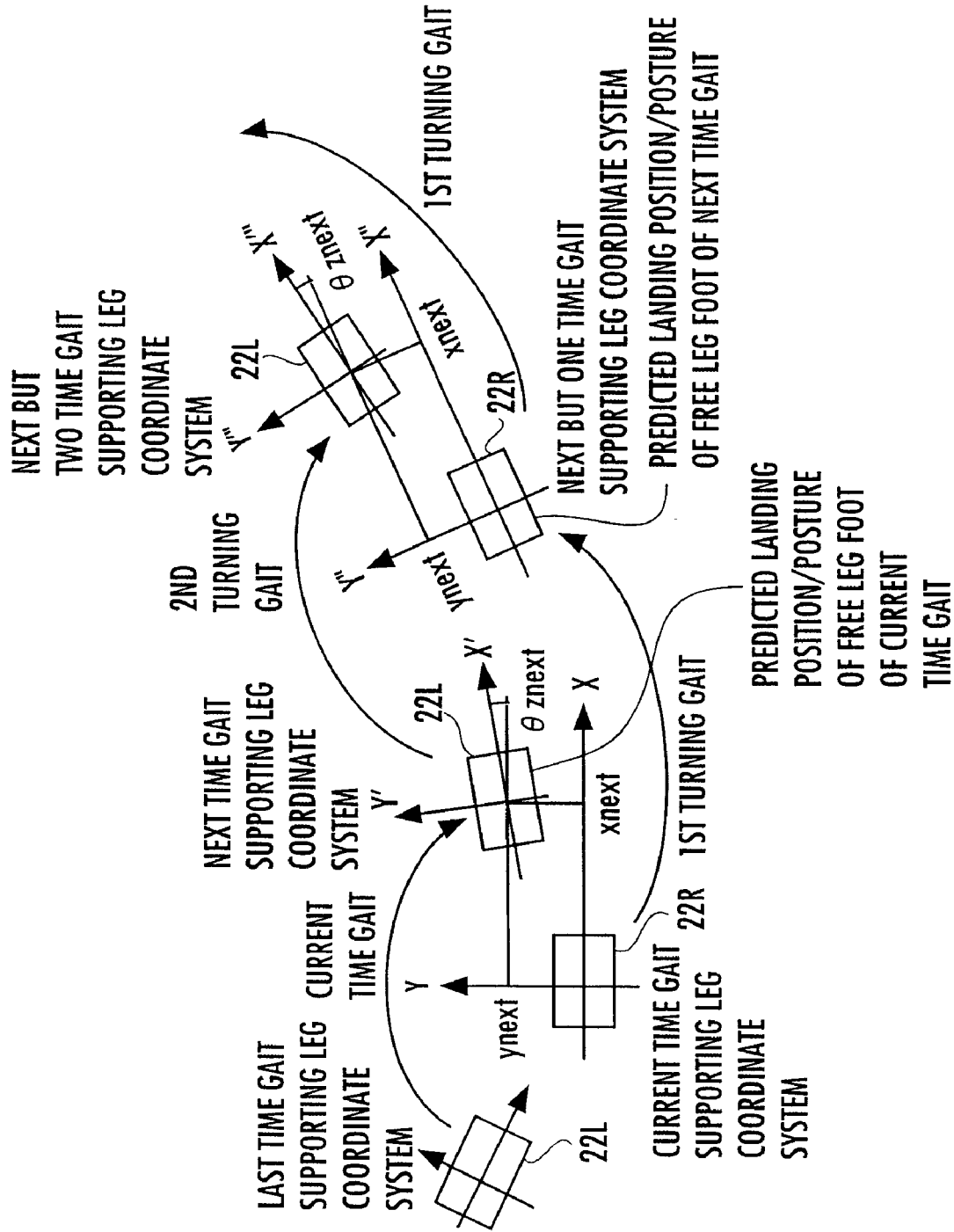
FIG. 12 is a diagram showing an example of a foot trajectory parameter determined in S11 of FIG. 5.
Figure 14:
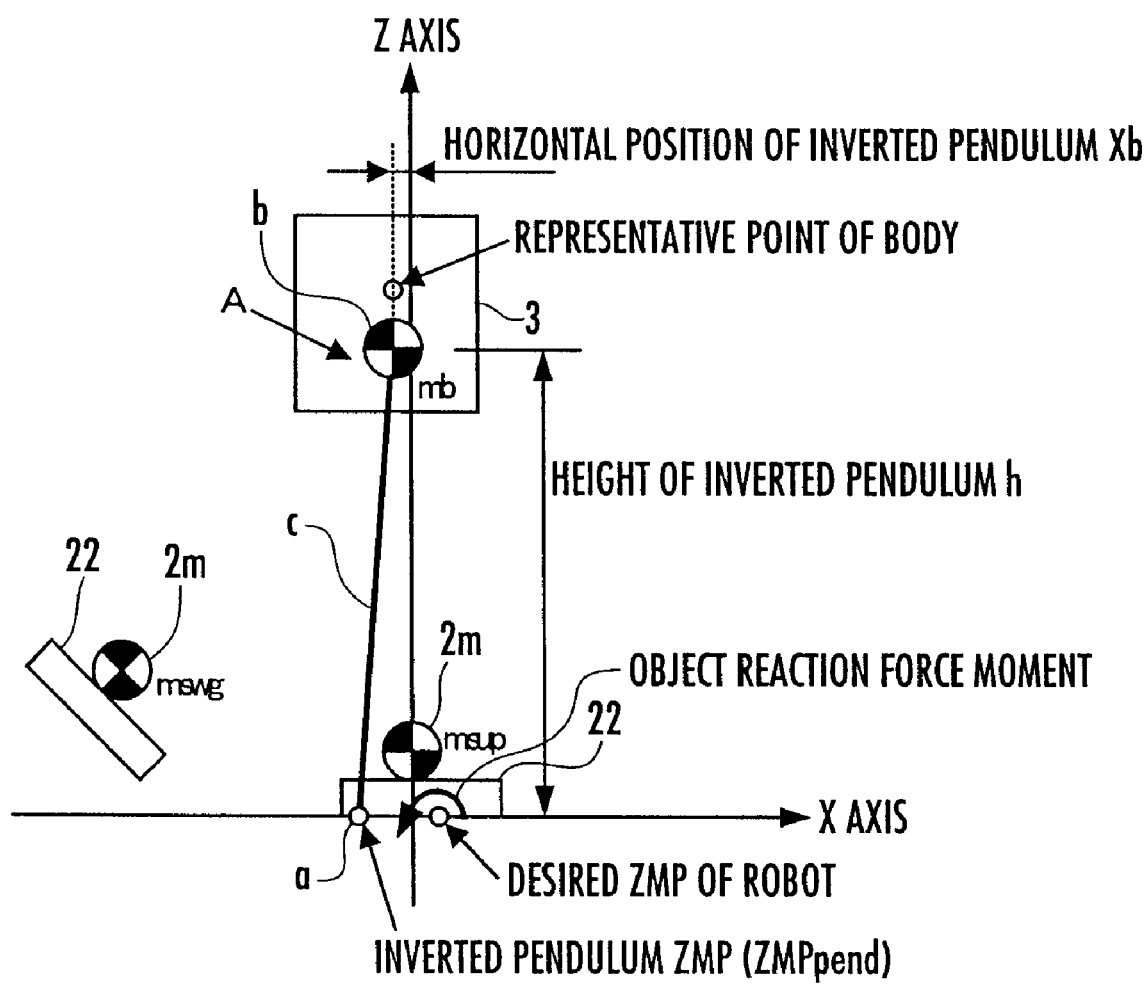
FIG. 14 is a diagram showing an example of a robot dynamic model used in the embodiments.
Figure 15:
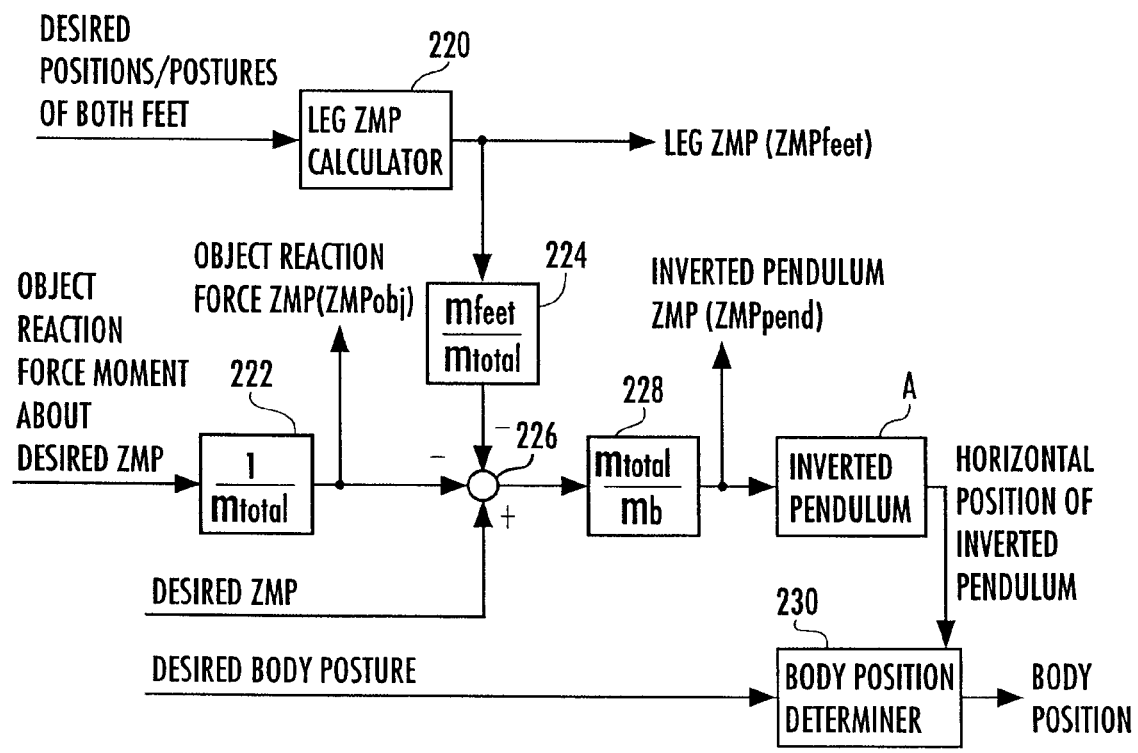
FIG. 15 is a block diagram showing the processing for determining a body position by using the robot dynamic model shown in FIG. 14.
Figure 16A:
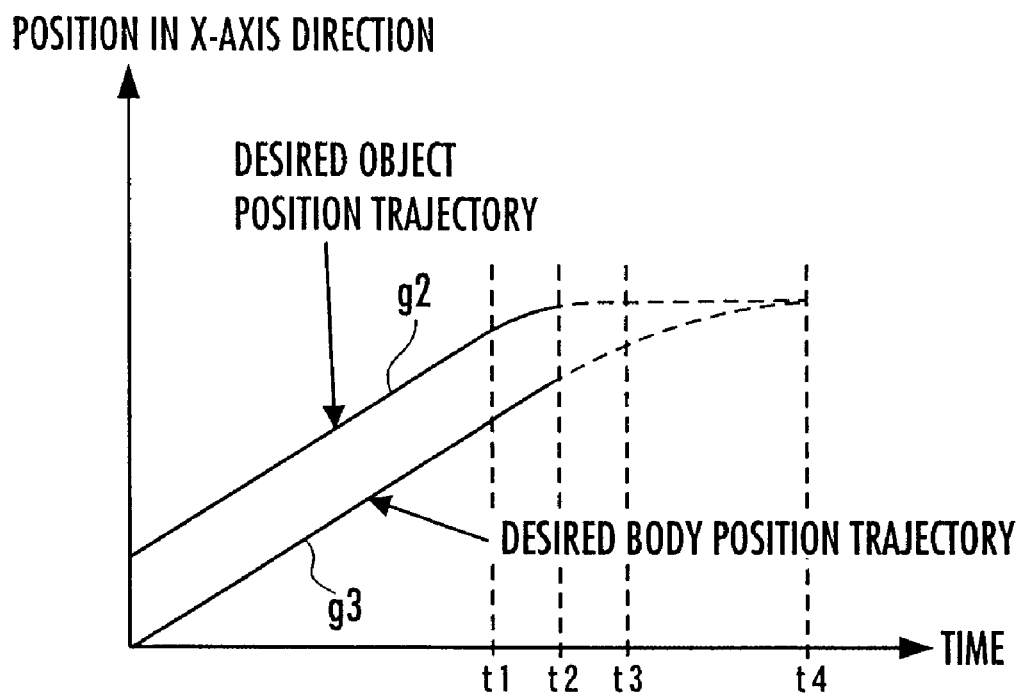
FIGS. 16(a) and (b) are diagrams for explaining the processing in S21 of FIG. 5.
Figure 16B:
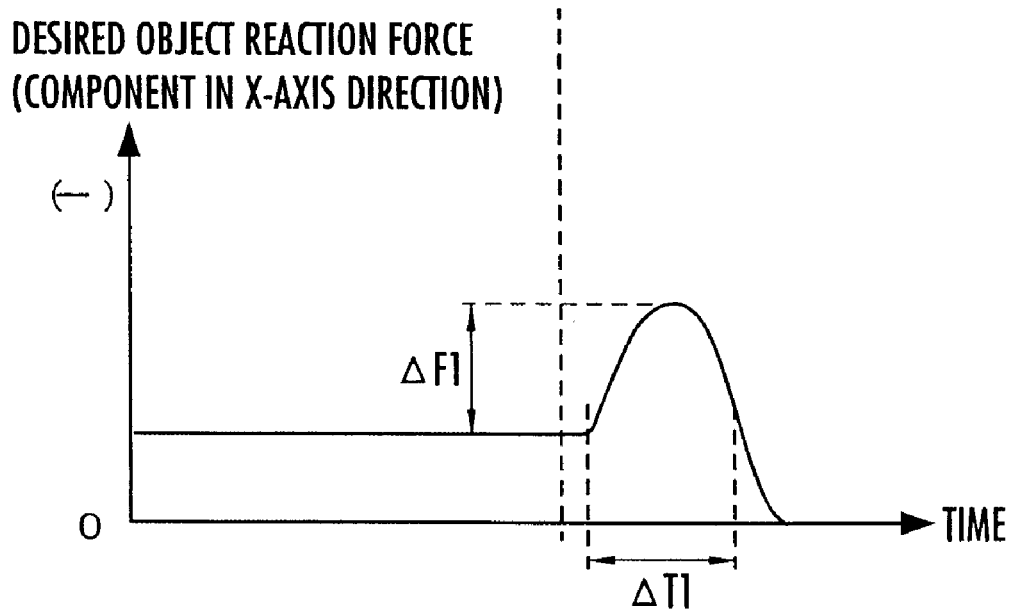
Figure 17A:
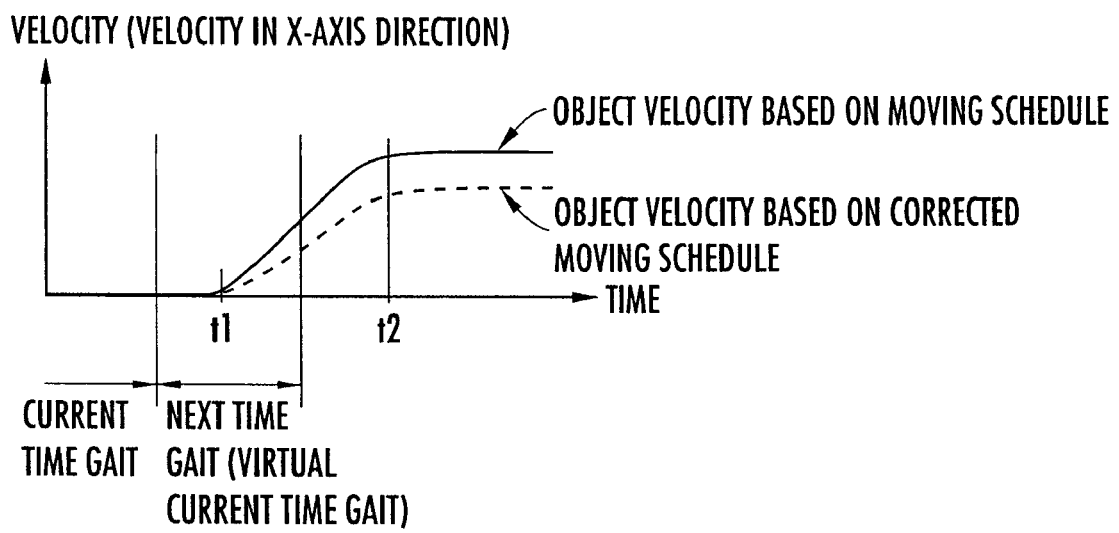
FIG. 17(a) is a graph illustrating a temporal change of an object velocity based on a moving schedule.
Figure 17B:
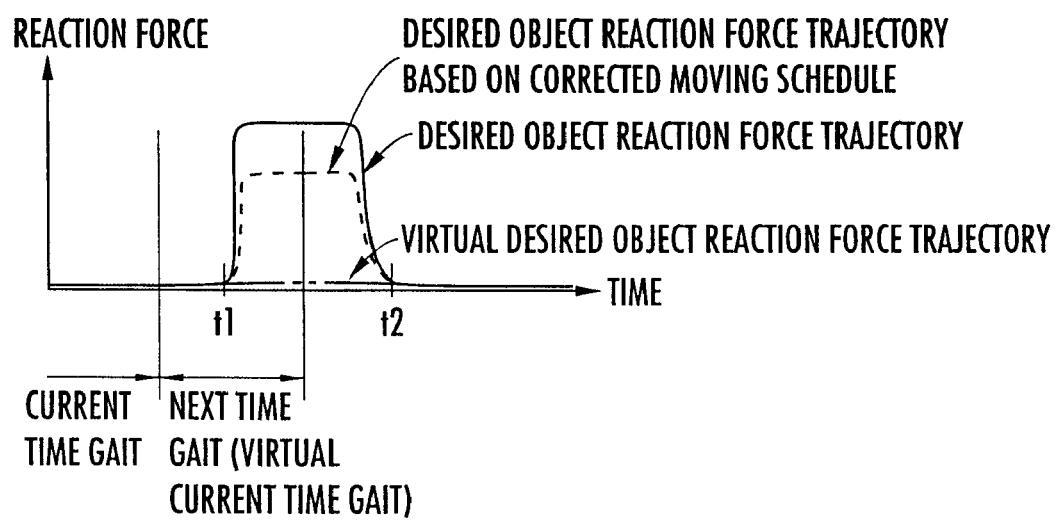
FIG. 17(b) is a graph illustrating a temporal change of an object reaction force corresponding to FIG. 17(a).
Figure 18:
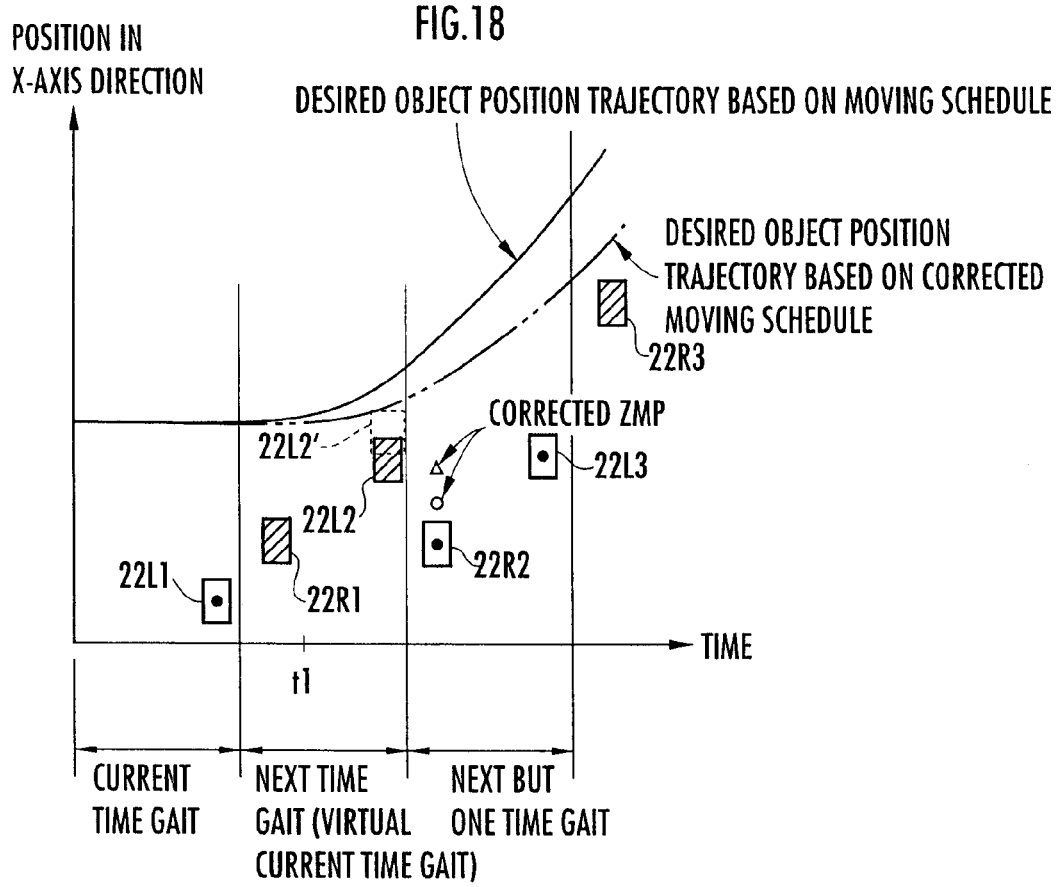
FIG. 18 is a diagram for explaining an example of the processing in S47 in FIG. 6 and an example of the processing for correcting a moving schedule if a determination result in S45 is NO.
Figure 19:
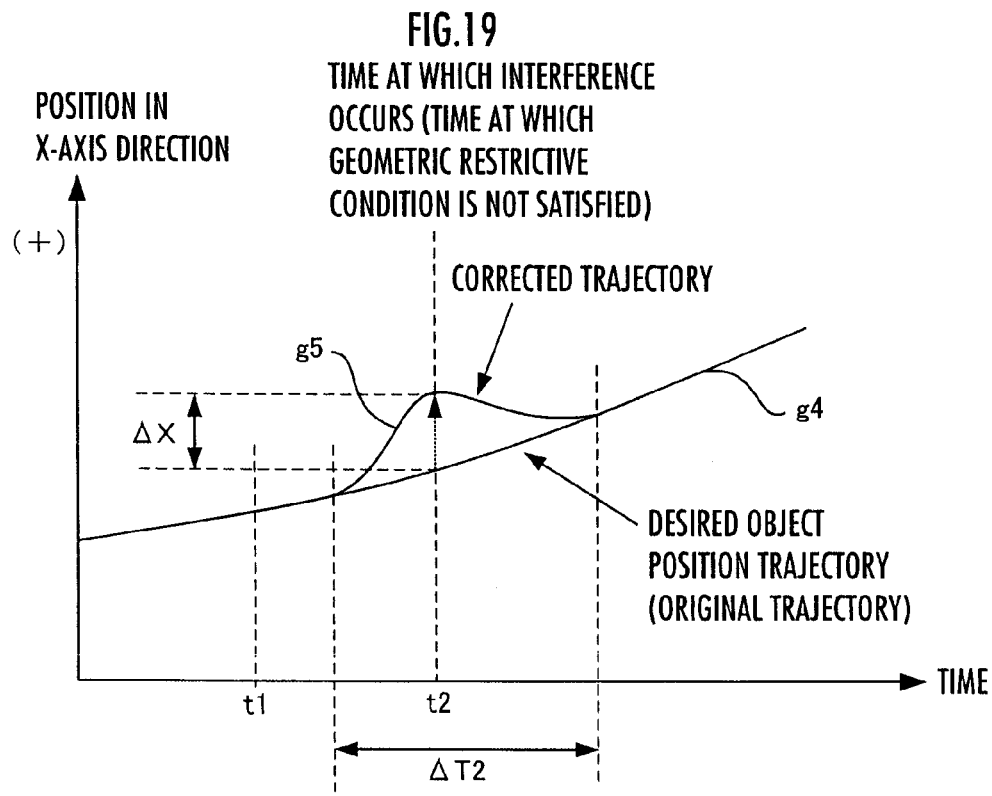
FIG. 19 is a diagram for explaining the processing in S55 of FIG. 7.
Figure 20:
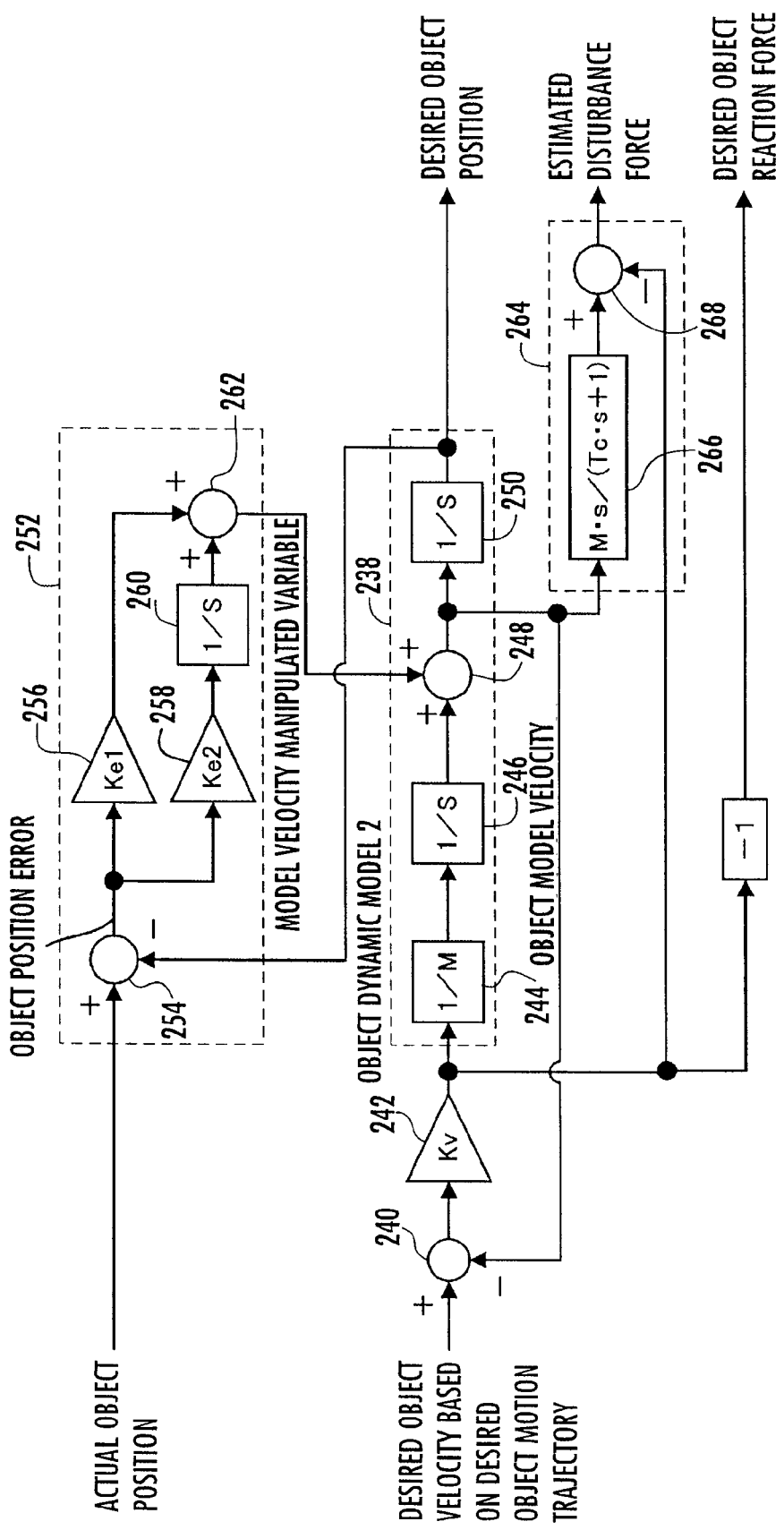
FIG. 20 is a block diagram showing the processing in S61 of FIG. 8.
Figure 21A:
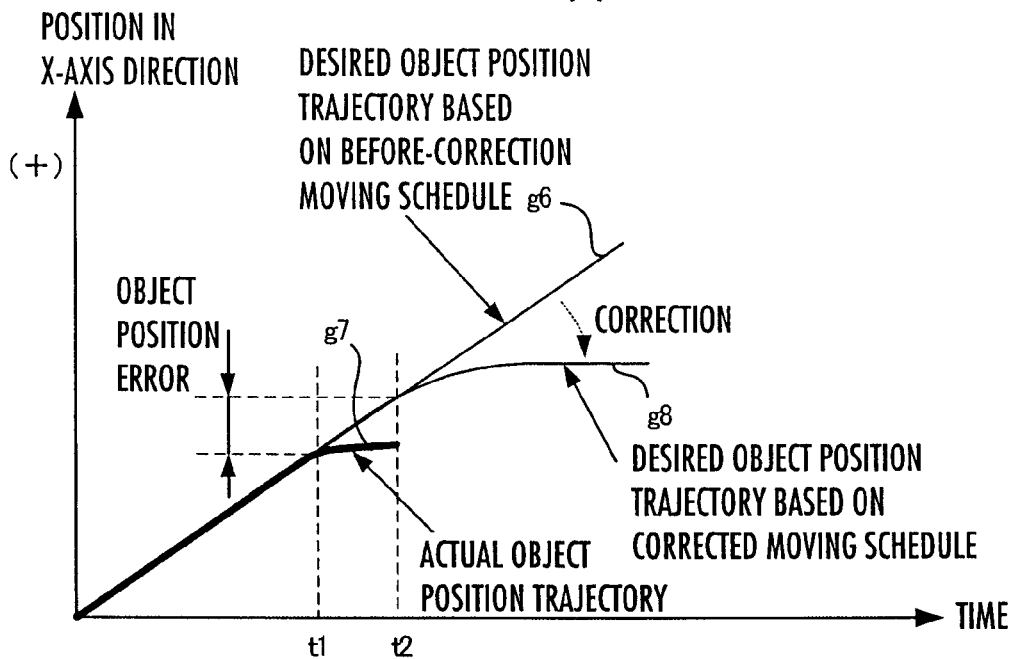
FIGS. 21(a) and (b) are diagrams for explaining the processing for correcting a moving schedule in S01 of FIG. 5.
Figure 21B:
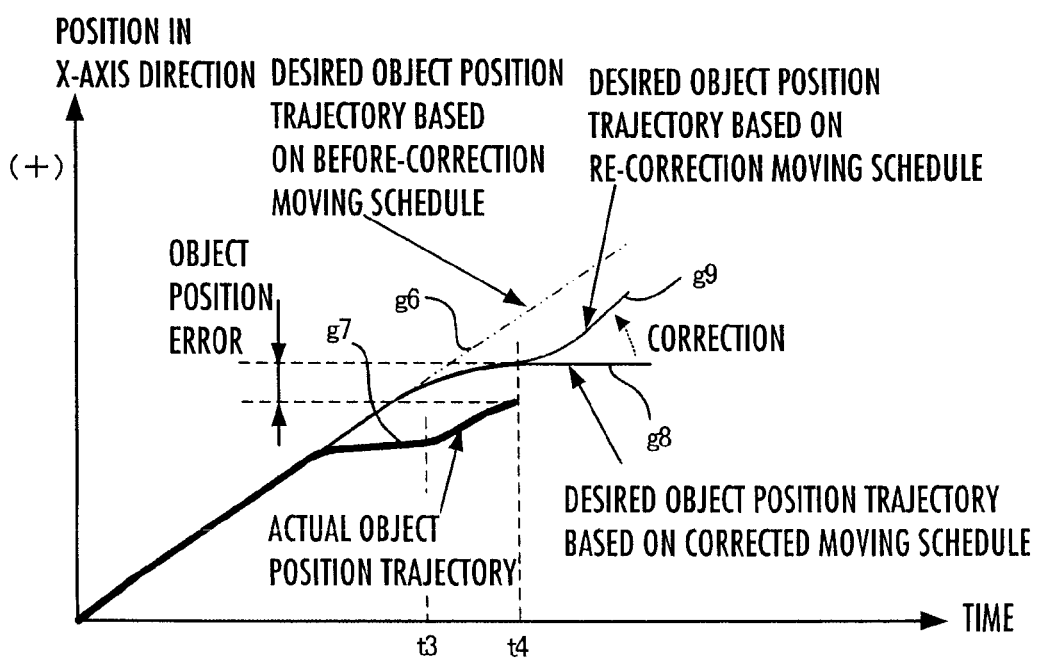
Figure 22:
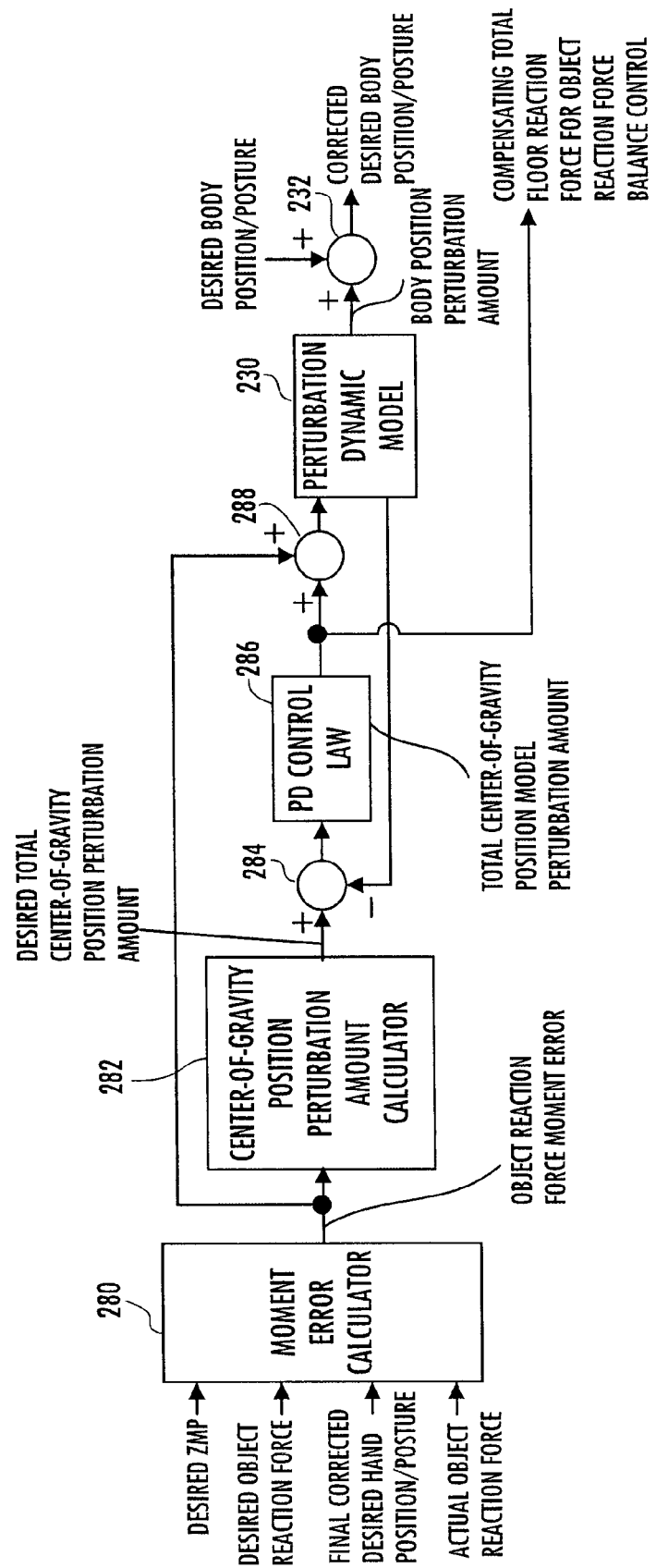
FIG. 22 is a block diagram showing the processing by an object reaction force balance controller shown in FIG. 3.

The invention claimed is:

1. A gait generating device for generating a desired gait of a legged mobile robot, which is equipped with a plurality of legs extended from a body thereof, to cause the robot to perform an operation of moving an object, the gait generating device, comprising:

a first acting force trajectory determining means for provisionally determining, when generating a new desired gait, a first trajectory of a desired acting force between a robot and an object, which is a trajectory of a desired value of an acting force between the robot and the object in the new desired gait, on the basis of at least a moving schedule for the object;

a first leg motion parameter determining means for provisionally determining a first leg motion parameter, which defines a motion of a leg of the robot in the new desired gait, on the basis of at least the moving schedule for the object;

a second acting force trajectory setting means for setting a second trajectory of a desired acting force between the robot and the object, which is a trajectory of a desired value of an acting force between the robot and the object after a predetermined time point, assuming that, with respect to the provisionally determined first trajectory of a desired acting force between the robot and the object, an actual trajectory of an acting force between the robot and the object has changed to a trajectory that is different from the first trajectory of a desired acting force between the robot and the object after a predetermined time point in the future; and a discriminating means for discriminating whether or not a second leg motion parameter that enables a desired gait of the robot after the predetermined time point to satisfy a predetermined dynamical restrictive condition can be set if a desired gait of the robot up to the predetermined time point is generated using the first leg motion parameter and the first trajectory of the desired acting force between the robot and the object and if a desired gait of the robot after the predetermined time point following the desired gait up to the predetermined time point is generated using the second leg motion parameter and the second acting force between the robot and the object, taking the second leg motion parameter, which is a leg motion parameter defining the motion of a leg of the robot after the predetermined time point, as a variable that can be variably set;

wherein in the case where the discriminating means determines that the desired gait of the robot after the predetermined time point permits setting of the second leg motion parameter that allows the predetermined dynamical restrictive condition to be satisfied, then the new desired gait is generated using the first leg motion parameter and the first trajectory of the desired acting force between the robot and the object, or in the case where the discriminating means determines that the desired gait of the robot after the predetermined time point does not permit setting of the second leg motion parameter that allows the predetermined dynamical restrictive condition to be satisfied, then the moving schedule for the object is corrected and the first leg motion parameter and the first trajectory of the desired acting force between the robot and the object are re-determined using at least the corrected moving schedule, and the new desired gait is generated using the first leg motion parameter and the first trajectory of the desired reaction force between the robot and the object, which have been re-determined.

2. The gait generating device of a legged mobile robot according to claim 1, wherein the predetermined time point is a time point at which the magnitude of the acting force of the first trajectory of a desired acting force between the robot and the object provisionally determined by the first acting force trajectory determining means or the magnitude of the changing velocity of the acting force exceeds a predetermined threshold value, and the second trajectory of a desired acting force between the robot and the object is a trajectory in which the magnitude of an acting force between the robot and the object or the magnitude of the changing velocity of the acting force after the predetermined time point takes a value that is smaller than the predetermined threshold value.

3. The gait generating device of a legged mobile robot according to claim 1, wherein the predetermined dynamical restrictive condition includes at least a condition in which a ZMP determined by a resultant force of an inertial force produced by a motion of a desired gait of the robot, the gravity acting on the robot, and an acting force applied to the robot from the object lies within a predetermined permissible range.

4. The gait generating device of a legged mobile robot according to claim 2, wherein the predetermined dynamical restrictive condition includes at least a condition in which a ZMP determined by a resultant force of an inertial force produced by a motion of a desired gait of the robot, the gravity acting on the robot, and an acting force applied to the robot from the object lies within a predetermined permissible range.

* * * * *